(12) United States Patent
Renninger

(10) Patent No.: US 11,909,165 B2
(45) Date of Patent: Feb. 20, 2024

(54) DRIVEN-CAVITY FEMTOSECOND SOURCES

(71) Applicant: University of Rochester, Rochester, NY (US)

(72) Inventor: William Renninger, Rochester, NY (US)

(73) Assignee: UNIVERSITY OF ROCHESTER, Rochester, NY (US)

(*) Notice: Subject to any disclaimer, the term of this patent is extended or adjusted under 35 U.S.C. 154(b) by 0 days.

(21) Appl. No.: 17/605,353

(22) PCT Filed: Apr. 21, 2020

(86) PCT No.: PCT/US2020/029094
§ 371 (c)(1),
(2) Date: Oct. 21, 2021

(87) PCT Pub. No.: WO2020/219433
PCT Pub. Date: Oct. 29, 2020

(65) Prior Publication Data
US 2022/0190541 A1    Jun. 16, 2022

Related U.S. Application Data

(60) Provisional application No. 62/838,361, filed on Apr. 25, 2019.

(51) Int. Cl.
*H01S 3/00* (2006.01)
*G02B 6/02* (2006.01)
(Continued)

(52) U.S. Cl.
CPC ........ *H01S 3/0057* (2013.01); *G02B 6/02214* (2013.01); *G02B 6/2934* (2013.01);
(Continued)

(58) Field of Classification Search
CPC .. H01S 3/0057; H01S 3/0085; H01S 3/06725; H01S 3/06791; H01S 3/1109;
(Continued)

(56) References Cited

U.S. PATENT DOCUMENTS 4,738,503 A * 4/1988 Desurvire ............ G02B 6/2861
359/333
2002/0071454 A1 6/2002 Lin
(Continued)

FOREIGN PATENT DOCUMENTS

| CN | 105896249 | 8/2016 |
| WO | 2020219433 | 10/2020 |

OTHER PUBLICATIONS

Wang et al., "Universal Mechanism for the Binding of Temporal Cavity Solitons", Optical Society of America, vol. 4, No. 8, Aug. 2017, pp. 855-863 (Year: 2017).*
(Continued)

*Primary Examiner* — Xinning(Tom) Niu
(74) *Attorney, Agent, or Firm* — Kilpatrick Townsend & Stockton LLP

(57) ABSTRACT

Optical pulse sources. In one example, the pulse source includes an optical fiber ring resonator with at least one normal dispersion fiber segment characterized by a positive group velocity dispersion (GVD) per unit length and at least one anomalous dispersion fiber segment characterized by a negative GVD per unit length. In another example, the pulse source includes an optical fiber ring resonator with one or more fiber segments having a positive net group velocity dispersion (GVD); and an intracavity spectral filter optically coupled to the one or more fiber segments. The pulse source is configured to generate one or more optical solitons in the optical fiber ring resonator.

22 Claims, 35 Drawing Sheets

(51) Int. Cl.
G02B 6/293 (2006.01)
H01S 3/067 (2006.01)
H01S 3/1109 (2023.01)

(52) U.S. Cl.
CPC ........ *H01S 3/0085* (2013.01); *H01S 3/06725* (2013.01); *H01S 3/06791* (2013.01); *H01S 3/1109* (2013.01); *H01S 2301/085* (2013.01)

(58) Field of Classification Search
CPC ............. H01S 2301/085; H01S 3/1303; H01S 3/0078; H01S 3/1305; G02B 6/02214; G02B 6/2934
See application file for complete search history.

(56) References Cited

U.S. PATENT DOCUMENTS

| | | | | |
|---|---|---|---|---|
| 2003/0156605 | A1* | 8/2003 | Richardson | H01S 3/06791 372/25 |
| 2004/0114641 | A1* | 6/2004 | Wise | H01S 3/1109 372/6 |
| 2005/0169324 | A1* | 8/2005 | Ilday | H01S 3/1115 372/18 |
| 2006/0120418 | A1* | 6/2006 | Harter | H01S 3/06712 372/30 |
| 2010/0220751 | A1* | 9/2010 | Chong | H01S 3/1118 372/6 |
| 2012/0327960 | A1* | 12/2012 | Wise | H01S 3/06791 372/6 |
| 2019/0356106 | A1* | 11/2019 | Nicholson | H01S 3/06725 |

OTHER PUBLICATIONS

Anderson et al., "Observations of Spatiotemporal Instabilities of Temporal Cavity Solitons", Optica, vol. 3, No. 10, Sep. 21, 2016, pp. 1071-1074.
Bao, "Stretched Cavity Soliton in Dispersion-managed Kerr Resonators", Physical Review A, vol. 92, Aug. 2015, pp. 023802-1-023802-7.
Chembo et al., "On the Generation of Octave-Spanning Optical Frequency Combs Using Monolithic Whispering-Gallery-Mode Microresonators", Optics Letters, vol. 35, No. 16, Aug. 15, 2010, pp. 2696-2698.
Chembo et al., "Spatiotemporal Lugiato-Lefever Formalism for Kerr-Comb Generation in Whispering-Gallery-Mode Resonators", Physical Review A, vol. 87, May 2013, pp. 1-4.
Chen et al., "Dispersion-Managed Mode Locking", Journal of the Optical Society of America B, vol. 16, No. 11, Nov. 1999, pp. 1999-2004.
Chong et al., "All-Normal-Dispersion Femtosecond Fiber Laser", Optics Express, vol. 14, No. 21, Oct. 16, 2006, 6 pages.
Chong et al., "Properties of Normal-Dispersion Femtosecond Fiber Lasers", Journal of the Optical Society of America B, vol. 25, No. 2, Feb. 2008, pp. 140-148.
Cole et al., "Solitons Crystals in Kerr Resonators", Nature Photonics, vol. 11, Oct. 2017, pp. 671-676.
Del'Haye et al., "Octave Spanning Tunable Frequency Comb From a Microresonator", Physical Review Letters, vol. 107, Aug. 5, 2011, pp. 063901-1-063901-4.
Del'Haye et al., "Optical Frequency Comb Generation from a Monolithic Microresonator", Nature, vol. 450, Dec. 20, 2007, pp. 1214-1217.
Diddams, "The Evolving Optical Frequency Comb [Invited]", Journal of the Optical Society of America B, vol. 27, No. 11, Nov. 2010, pp. B51-B62.
Ferdous et al., "Spectral Line-By-Line Pulse Shaping of On-Chip Microresonator Frequency Combs", Nature Photonics, vol. 5, Oct. 9, 2011, pp. 770-776.

Fernandez et al., "Chirped-Pulse Oscillators: A Route to High-Power Femtosecond Pulses Without External Amplification", Optics Letters, vol. 29, No. 12, Jun. 15, 2004, pp. 1366-1368.
Fulop et al., "Long-Haul Coherent Communications using Microresonator-based Frequency Combs", Optics Express, vol. 25, No. 22, Oct. 30, 2017, 11 pages.
Gaeta et al., "Photonic-Chip-Based Frequency Combs", Nature Photonics, vol. 13, Mar. 2019, pp. 158-169.
Gaeta et al., "Photonuc-Chip-Based Frequency Combs", Nature Photonics, vol. 13, Feb. 21, 2019, pp. 158-169.
Garbin et al., "Experimental and Numerical Investigations of Switching Wave Dynamics in a Normally Dispersive Fibre Ring Resonator", The European Physical Journal D, vol. 71, No. 240, Sep. 19, 2017, pp. 1-8.
Godey et al., "Stability Analysis of the Spatiotemporal Lugiato-Lefever Model for Kerr Optical Frequency Combs in the Anomalous and Normal Dispersion Regimes", Physical Review A, vol. 89, Jun. 16, 2014, pp. 063814-1-063814-21.
Haelterman et al., "Dissipative Modulation Instability in a Nonlinear Dispersive Ring Cavity", Optics Communications, vol. 91, Aug. 1992, pp. 401-407.
Herr et al., "Temporal Solitons in Optical Microresonators", Nature Photonics, vol. 8, Dec. 22, 2013, pp. 145-152.
Huang et al., "Mode-locked Ultrashort Pulse Generation From On-Chip Normal Dispersion Microresonators", Physical Review Letters, Feb. 4, 2015, pp. 1-36.
Jang et al., "All-Optical Buffer Based on Temporal Cavity Solitons Operating at 10 Gb/S", Optics Letters, vol. 41, No. 19, Oct. 1, 2016, pp. 4526-4529.
Jang et al., "Dynamics of Mode-Coupling-Assisted Microresonator Frequency Combs", 2016 Conference on Lasers and Electro-Optics (CLEO), Jun. 5-10, 2016, 2 pages.
Jang et al., "Temporal Tweezing of Light Through the Trapping and Manipulation of Temporal Cavity Solitons", Nature Communications, Jun. 24, 2015, pp. 1-7.
Jang et al., "Ultraweak Long-Range Interactions of Solitons Observed Over Astronomical Distances", Nature Photonics, vol. 7, Jul. 7, 2013, pp. 657-663.
Kippenberg et al., "Dissipative Kerr Solitons in Optical Microsonators", Science, vol. 361, Aug. 10, 2018, 13 page.
Kippenberg et al., "Microresonator-Based Optical Frequency Combs", Science, vol. 332, No. 6029, Apr. 29, 2011, pp. 555-559.
Leo et al., "Temporal Cavity Solitons in One-Dimensional Kerr Media as Bits in an All-Optical Buffer", Nature Photonics, vol. 4, No. 7, May 23, 2010, pp. 471-476.
Levy et al., "CMOS-Compatible Multiple-Wavelength Oscillator for On-Chip Optical Interconnects", Nature Photonics, vol. 4, Dec. 20, 2009, pp. 37-40.
Liang et al., "Generation of a Coherent Near-infrared Kerr Frequency Comb in a Monolithic Microresonator With Normal GVD", Optics Letters, vol. 39, No. 10, May 15, 2014, pp. 2920-2923.
Lilienfein et al., "Temporal Solitons in Free-Space Femtosecond Enhancement Cavities", Nature Photonics, vol. 13, Mar. 2019, pp. 214-219.
Lobanov et al., "Frequency Combs and Platicons in Optical Microresonators with Normal GVD", Optics Express, vol. 23, No. 6, Jan. 2015, 9 pages.
Loh et al., "Phase and coherence of optical microresonator frequency combs", Physical Review A, vol. 89, May 9, 2014, pp. 053810-1-053810-9.
Lugiato et al., "Spatial Dissipative Structures in Passive Optical Systems", Physical Review Letters, vol. 58,. No. 21, May 25, 1987, pp. 2209-2211.
Malinowski et al., "Optical Frequency Comb Generation by Pulsed Pumping", APL Photonics, vol. 2, No. 6, May 17, 2017, 7 pages.
Mollenauer et al., "The Soliton Laser", Optics Letters, vol. 9, No. 1, Jan. 1984, pp. 13-15.
Mollenauer et al., "The Soliton Laser: Erratum", Optics Letters, vol. 9, No. 3, Mar. 1984, p. 105.
Nakazawa et al., "Modulational Instability Oscillation in Nonlinear Dispersive Ring Cavity", Physical Review A, vol. 38, No. 10, Nov. 15, 1988, pp. 5193-5197.

(56) References Cited

OTHER PUBLICATIONS

Nielsen et al., "Invited Article: Emission of Intense Resonant Radiation by Dispersion-Managed Kerr Cavity Solitons", APL Photonics, vol. 3, No. 2, Nov. 15, 2018, 12 pages.
Obrzud et al., "Temporal Solitons in Microresonators Driven by Optical Pulses", Nature Photonics, vol. 11, Sep. 2017, pp. 600-607.
Okawachi et al., "Octave-Spanning Frequency Comb Generation in a Silicon Nitride Chip", Optics Letters, vol. 36, No. 17, Sep. 1, 2011, pp. 3398-3400.
Parra-Rivas et al., "Origin and Stability of Dark Pulse Kerr Combs in Normal Dispersion Resonators", Optics Letters, vol. 41, May 16, 2016, 6 pages.
Pasquazi et al., "Micro-Combs: A Novel Generation of Optical Sources", Physics Report, vol. 729, Jan. 2018, pp. 1-81.
Pawliszewska et al., "Dispersion-Managed Ho-Doped Fiber Laser Mode-Locked With a Graphene Saturable Absorber", Optics Letters, vol. 43, No. 1, Jan. 1, 2018, pp. 38-41.
Application No. PCT/US2020/029094 , International Search Report and Written Opinion, dated Jul. 10, 2020, 13 pages.
Razzari et al., "CMOS-Compatible Integrated Optical Hyperparametric Oscillator", Nature Photonics, vol. 4, Dec. 20, 2009, pp. 41-45.
Renninger et al., "Closed-Form Solutions and Scaling Laws for Kerr Frequency Combs", Scientific Reports, Apr. 25, 2016, pp. 1-9.
Renninger et al., "Dissipative Solitons in Normal-Dispersion Fiber Lasers", Physical Review A, vol. 77, Feb. 12, 2008, pp. 023814-1-023814-4.
Renninger et al., "Exact Solutions and Scaling Laws for Kerr Frequency Combs", OSA, Department of Applied Physics, May 2015, 2 pages.
Renninger et al., "Giant-Chirp Oscillators for Short-Pulse Fiber Amplifiers", Optics Letters, vol. 33, No. 24, Dec. 15, 2008, pp. 3025-3027.
Renninger et al., "Pulse Shaping and Evolution in Normal-Dispersion Mode-Locked Fiber Lasers", IEEE Journal of Selected Topics in Quantum Electronics, vol. 18, No. 1, Jan.-Feb. 2012, pp. 389-398.
Renninger et al., "Self-Similar Pulse Evolution in an All-Normal-Dispersion Laser", Physical Review A, vol. 82, Aug. 2010, pp. 021805-1-021805-4.
Savchenkov et al., "Tunable Optical Frequency Comb With a Crystalline Whispering Gallery Mode Resonator", Physical Review Letters, vol. 101, No. 9, Aug. 29, 2008, pp. 093902-1-0930902-4.
Shao et al., "Cavity-Assisted Modulation Instability Lasing of a Fiber Ring Laser", Applied Physics B: Lasers and Optics, vol. 125, No. 1, Dec. 7, 2018, 9 pages.
Spencer et al., "An Optical-Frequency Synthesizer using Integrated Photonics", Nature, vol. 557, Apr. 25, 2018, pp. 81-85.
Steinmetz et al., "Laser Frequency Combs for Astronomical Observations", Science, vol. 321, No. 5894, Sep. 5, 2008, pp. 1335-1337.
Tamura et al., "77-Fs Pulse Generation From a Stretched-Pulse Mode-Locked All-Fiber Ring Laser", Optics Letters, vol. 18, No. 13, Jul. 1, 1993, pp. 1080-1082.
Trocha et al., "Ultrafast Optical Ranging using Microresonator Soliton Frequency Combs", Science, vol. 359, No. 6378, Feb. 23, 2018, pp. 887-891.
Udem et al., "Optical Frequency Metrology", Nature, vol. 416, Mar. 14, 2002, pp. 233-237.
Wang et al., "Stimulated Raman Scattering Imposes Fundamental Limits to the Duration and Bandwidth of Temporal Cavity Solitons", Physical Review Letters, vol. 120, Jan. 31, 2018, pp. 053902-1-053902-6.
Wang et al., "Universal Mechanism for the Binding of Temporal Cavity Solitons", Available Online at URL: https://arxiv.org/, Mar. 30, 2017, 10 pages.
Xue et al., "Mode-Locked Dark Pulse Kerr Combs in Normal-Dispersion Microresonators", Nature Photonics,, Aug. 10, 2015, pp. 594-600.
Xue et al., "Normal-Dispersion Microcombs Enables by Controllable Mode Interactions", Laser & Photonics Review, vol. 9, No. 4, Mar. 2015, pp. L23-L28.
Xue et al., "Normal-Dispersion Microresonator Kerr Frequency Combs", Nanophotonics, vol. 5, No. 2, Jun. 2016, pp. 244-262.
Yang et al., "Microresonator Soliton Dual-Comb Spectroscopy", Science, vol. 354, No. 6312, Nov. 4, 2016, 2 pages.

* cited by examiner

DRIVEN-CAVITY FEMTOSECOND SOURCES

CROSS-REFERENCES TO RELATED APPLICATIONS

This application is a U.S. National Stage of PCT Application No. PCT/US20/29094, filed Apr. 21, 2020, which claims the benefit of and priority to U.S. Provisional Application No. 62/838,361, filed Apr. 25, 2019, entitled "DRIVEN-CAVITY FEMTOSECOND SOURCES," the entire contents of which are incorporated herein by reference for all purposes.

FIELD OF INVENTION

This disclosure relates to pulse optical sources, more particularly to ultrashort pulse optical sources.

BACKGROUND

Ultrashort pulsed lasers are multi-disciplinary tools that have enabled powerful new technologies, with prominent examples in metrology, materials processing, telecommunications, chemistry, and energy research. Perhaps the largest impact has been for biomedical applications. For example, multiphoton microscopy (among a list of other short-pulse enhanced imaging techniques) has led to notable results in neuroscience, immunology, embryology and cancer research. In ophthalmology, novel corneal surgery and photo-therapies for cataracts have changed how people think about vision correction.

Femtosecond sources also enable precise and high efficiency photoporation for DNA transfection and injection of other materials into cells for targeted bio-sensing. Overall, short-pulse sources enable a degree of precision and control across several disciplines that could not be achieved previously.

Femtosecond optical sources use the nonlinear principles of soliton formation to turn noisy atomic laser light into coherent short pulses of optical energy. However, the need for a broadband laser medium in current femtosecond optical sources dramatically limits the available wavelengths and performance, drives up the cost, and makes novel techniques unfeasible. Current mode-locked laser based sources are fundamentally limited by wavelength, repetition rate, and pulse pattern.

Femtosecond pulses for typically used applications require a laser gain material featuring atomic transitions (in crystals, glass, liquids, gases . . . etc.) that can support the large bandwidth associated with such short pulses. In addition, it may be desired that a list of other parameters are ideal, such as the quantum efficiency, crosssections, purity, thermal conductivity, photodarkening, reliability, doping concentration and atomic lifetimes. Lastly, it may also be desired that the system is reasonably priced. To the best of the author's knowledge, only a couple of know systems come close to these minimum requirements. The most common example, the titanium-doped sapphire (Ti:sapphire) laser, is a free-space aligned system that operates around 0.8 µm in wavelength. More recently, rare-earth doped optical fiber lasers are finding increasingly widespread use because their minimal design makes them ideally robust, and their cheap diode-pump requirements combined with the low cost of fiber makes their price tag low. Matured systems include erbium-doped lasers at 1.5 µm and the slightly more efficient ytterbium-doped lasers at 1.0 µm. However, while this narrow selection of laser wavelengths has revealed the promise of femtosecond techniques, a majority of applications are in critical need of new sources. In particular each application requires a specific wavelength for optimum operation.

Some of these new wavelengths can be generated with various nonlinear frequency conversion methods. However, the complexity of these systems makes them prohibitively expensive (>$300,000) and difficult to maintain in a consistent state of operation. While sufficient for laboratory demonstrations of new technologies, more wide-spread access is restricted. In fact, the Ti:sapphire laser itself is still too expensive for more far-reaching applications.

Finally, beyond the need for new wavelengths, new repetition rates, pulse patterns and pulse energies are needed. The pulse pattern plays a major role in most applications, such as in machining and imaging. In traditional lasers, these parameters are also severely constrained by the gain material. Ideally, each application should be matched to a low-cost femtosecond source with a customized energy, pulse pattern, pulse duration and operation wavelength, which will require a completely new type of source.

SUMMARY

This patent describes several examples of optical pulse sources.

In one example, an optical pulse source includes: a drive unit configured to provide pump light at a drive power; an optical fiber ring resonator optically coupled to the drive unit for receiving the pump light, the optical fiber ring resonator including: at least one normal dispersion fiber segment characterized by a positive group velocity dispersion (GVD) per unit length; and at least one anomalous dispersion fiber segment characterized by a negative GVD per unit length; in which a drive power of the pump source, a net GVD of the optical fiber ring resonator, and a frequency detuning parameter of the optical fiber ring resonator are configured to generate one or more optical solitons in the optical fiber ring resonator; and an output optically coupled to the optical fiber ring resonator for out-coupling a portion of each of the one or more optical solitons.

The optical pulse source may also include a feedback control circuit coupled to the drive unit and the optical fiber ring resonator, in which the feedback control circuit is configured to cause a frequency of the pump light to be locked with respect to a resonance frequency of the optical fiber ring resonator.

The optical pulse source may also include a feedback control circuit coupled to the drive unit and the optical fiber ring resonator, in which the feedback control circuit is configured to cause a resonance frequency of the optical fiber ring resonator to be locked with respect to a frequency of the pump light.

The optical pulse source may also include at least one normal dispersion fiber segment and a length of the at least one anomalous dispersion fiber segment are configured to provide the net GVD of the optical fiber ring resonator.

The net GVD may range from about −1000 $fs^2$ to about −50,000 $fs^2$.

The one or more optical solitons may have a full-width half-maximum temporal duration ranging from about 50 fs to about 10 ps, or from about 50 fs to about 500 fs, or from about 50 fs to about 100 fs.

The optical fiber ring resonator may also include an optical isolator.

The optical isolator may be an optical fiber isolator or a free-space isolator.

The drive unit may include a pump light source.

The pump light source may be a continuous-wave (CW) laser source.

The drive unit may include an optical amplifier configured to amplify optically coupled to the pump light source.

The optical amplifier may be an erbium-doped fiber amplifier (EDFA).

The drive unit may also include an intensity modulator optically coupled to the pump light source and configured to modulate an intensity of the pump light into a pulse train.

The optical pulse source may also include a spectral filter optically coupled to the output.

The spectral filter may be a fiber Bragg grating (FBG), or a birefringence-based spectral filter, or an interference-based spectral filter.

The optical fiber ring resonator may include at least one free-space air gap.

The at least one normal dispersion fiber segment and the at least one anomalous dispersion fiber segment may be polarization-maintaining optical fibers.

The optical pulse source may also include an optical compression component coupled to the output and configured to compress the portion of each of the one or more optical solitons temporally.

The optical compression component may be a pair of gratings, or a pair of prisms, or an optical fiber compression component.

The negative GVD per unit length of the at least one anomalous dispersion fiber segment may range from about $-1000$ fs$^2$ to $-50,000$ fs$^2$, or from about $-1000$ fs$^2$ to $-10,000$ fs$^2$, or from about $-1000$ fs$^2$ to $-5,000$ fs$^2$.

The drive power may range from about 10 mW to about 1 kW.

The frequency detuning parameter may range from about $-0.5$ radians to about $-3$ radians per roundtrip.

In another example, an optical pulse source includes: a drive unit configured to provide pump light at a drive power; an optical fiber ring resonator optically coupled to the drive unit for receiving the pump light, the optical fiber ring resonator including: one or more fiber segments having a positive net group velocity dispersion (GVD); and an intracavity spectral filter optically coupled to the one or more fiber segments; in which a drive power of the pump source, the net GVD of the one or more fiber segments, and a frequency detuning parameter of the optical fiber ring resonator are configured to generate one or more optical solitons in the optical fiber ring resonator; and an output optically coupled to the optical fiber ring resonator for out-coupling a portion of each of the one or more optical solitons.

The optical pulse source may also include a feedback control circuit coupled to the drive unit and the optical fiber ring resonator, in which the feedback control circuit is configured to cause a frequency of the pump light to be locked with respect to a resonance frequency of the optical fiber ring resonator.

The optical pulse source may also include a feedback control circuit coupled to the drive unit and the optical fiber ring resonator, wherein the feedback control circuit is configured to cause a resonance frequency of the optical fiber ring resonator to be locked with respect to a frequency of the pump light.

The intracavity spectral filter may be a fiber Bragg grating (FBG), or a birefringence-based spectral filter, or an interference-based spectral filter.

The intracavity spectral filter may be characterized by a full-width at half-maximum bandwidth ranging from about 0.1 nm to about 200 nm.

The one or more fiber segments may be several fiber segments, including: at least one normal dispersion fiber segment characterized by a positive group velocity dispersion (GVD) per unit length; and at least one anomalous dispersion fiber segment characterized by a negative GVD per unit length.

Each of the one or more optical solitons may have a full-width half-maximum temporal duration ranging from about 50 fs to about 10 ps, or from about 50 fs to about 500 fs, or from about 50 fs to about 100 fs.

The drive unit may include a pump light source.

The pump light source may be a continuous-wave (CW) laser source.

The drive unit may also include an optical amplifier.

The drive unit may also include an intensity modulator optically coupled to the pump light source and configured to modulate an intensity of the pump light into a pulse train.

The one or more fiber segments may include polarization-maintaining optical fibers.

The optical pulse source may also include an optical compression component coupled to the output and configured to compress the portion of each of the one or more optical solitons temporally.

The optical compression component may include a pair of gratings, or a pair of prisms, or an optical fiber compression component.

The optical fiber ring resonator may also include an optical isolator.

The optical isolator may be an optical fiber isolator or a free-space isolator.

The optical pulse source may also include a second spectral filter optically coupled to the output.

The second spectral filter may be a fiber Bragg grating (FBG), or a birefringence-based spectral filter, or an interference-based spectral filter.

The optical fiber ring resonator may include at least one free-space air gap.

The drive power may range from about 10 mW to about 1 kW.

DETAILED DESCRIPTION

Figure 1:
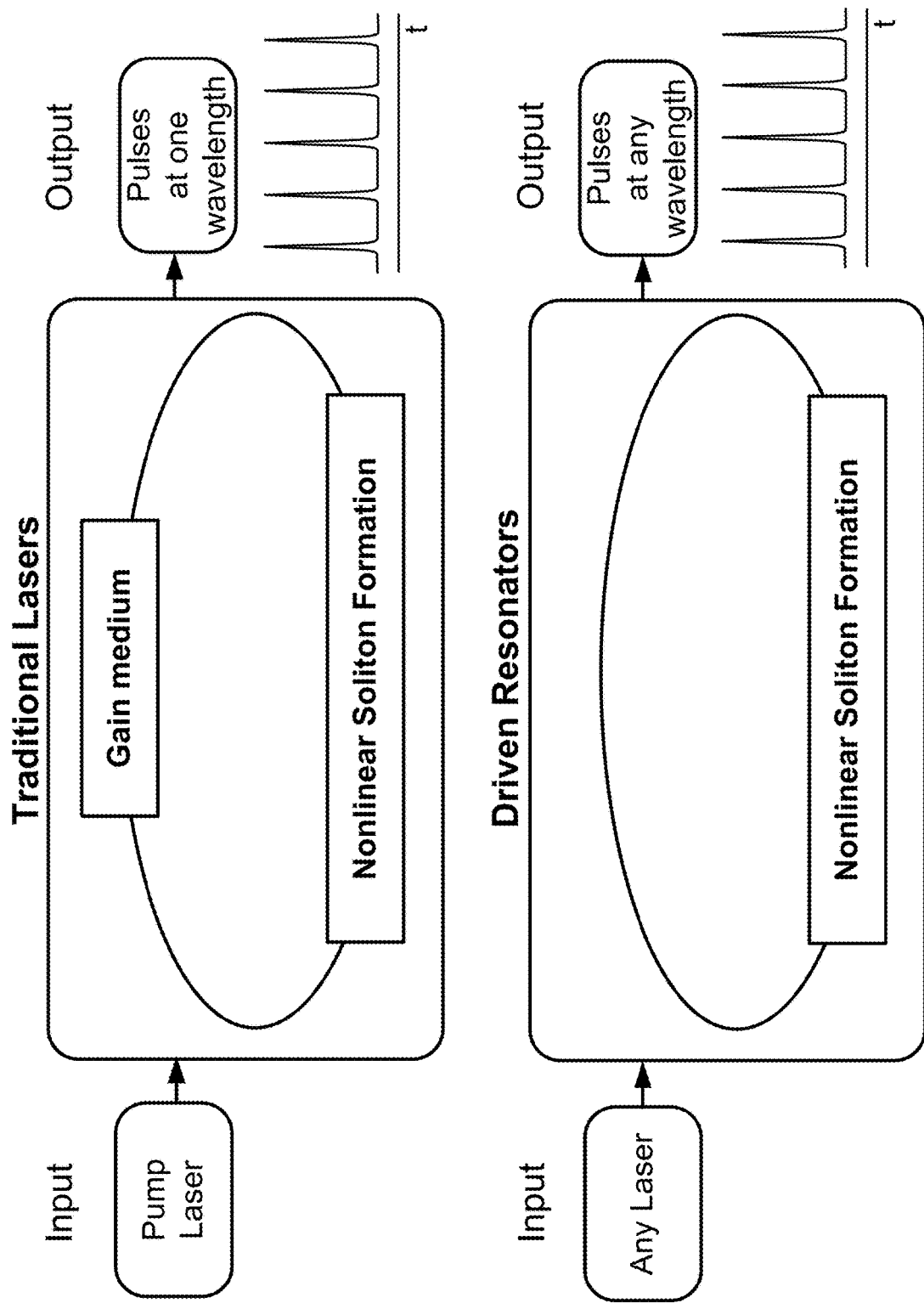
FIG. 1 schematically illustrates a comparison of a traditional laser and a driven resonator according to some embodiments.

Embodiments of the present invention provide nonlinear techniques to generate femtosecond solitons directly from continuous-wave lasers, separating ultrashort pulse source design from the limitations of the laser medium. The resulting low-cost, field-ready sources with customizable performance parameters may enable wide-spread access to transformative technologies.

In some embodiments, a model for femtosecond sources is provided. The model is based on driven cavities that may be implemented without a broadband laser. A broadband laser gain has been used in the past because it is a straightforward way to compensate for the total losses in a cavity. This is where the limitations, mentioned above in the background section, are introduced. However, a laser gain is not the only way to compensate for the cavity losses. It is also possible to introduce a single continuous wave (CW) laser drive into the cavity to add the needed energy. Unlike in conventional lasers in which broadband loss is compensated for by broadband gain, here, a single-frequency CW drive may compensate the broadband loss. This may be achieved through a nonlinear process in which the energy from the drive is redistributed in frequency to match the loss. This process may occur in parallel with the formation of a special type of stable "soliton" pulse solution to the nonlinear equation used to describe the cavity.

By properly designing the cavity, the loss may be compensated, and useful ultrashort soliton pulses may form. Proper cavity design may account for one or more of the following factors: drive power, frequency detuning, fiber(s) length, fiber(s) dispersion, fiber(s) mode area, loss, drive pulsing configuration, and spectral filter. Configuring the system with the right combination of these factors (over an infinite arrangements that would not form useful pulses) is important for achieving new performances for at least some of the examples disclosed herein.

A type of soliton has been explored recently for timing applications in microresonators [1] and for intriguing data storage and temporal tweezing studies in fiber resonators [2,3]. But current systems are not designed with traditional applications in mind and have long pulses with low energies. This disclosure describes a driven-cavity short-pulse approach to application-ready ultrashort pulse sources. This direction has not been pursued in the past, probably because of the complex and previously not well understood nonlinear dynamics of the system. Techniques utilized for advancing laser systems from less useful low energy solitons to high performance solitons such as the dissipative [4] and self-similar [5] solitons used in fiber lasers [6] provide potential approaches of soliton engineering for driven resonators, enabling a powerful new paradigm for application-ready femtosecond sources without a gain material.

New opportunities may be available if a gain material is not needed. Wavelength may no longer be restricted because diode lasers provide cheap and convenient CW sources over most spectral windows. Therefore, the driven soliton source may enable direct generation of femtosecond pulses at any wavelength. Combined with a low-cost and robust fiber waveguide design and the ability to control the seed location and pattern in the driven resonator, the approach described herein may provide designs of low-cost femtosecond sources with pulse pattern and operation wavelength tailor-made for the designated application.

FIG. 1 illustrates a comparison of an example of a traditional laser with an example of a driven resonator according to some embodiments, demonstrating the inputs, outputs, and differing components. A traditional femtosecond laser (shown in the upper portion of FIG. 1) is pumped with a wavelength that is determined by the gain medium. The result is a femtosecond pulse centered at the unique lasing wavelength. In contrast, a driven resonator (shown in the lower portion of FIG. 1) may be driven by any wavelength and can therefore generate femtosecond pulses over a much wider range of wavelengths.

Figure 2:
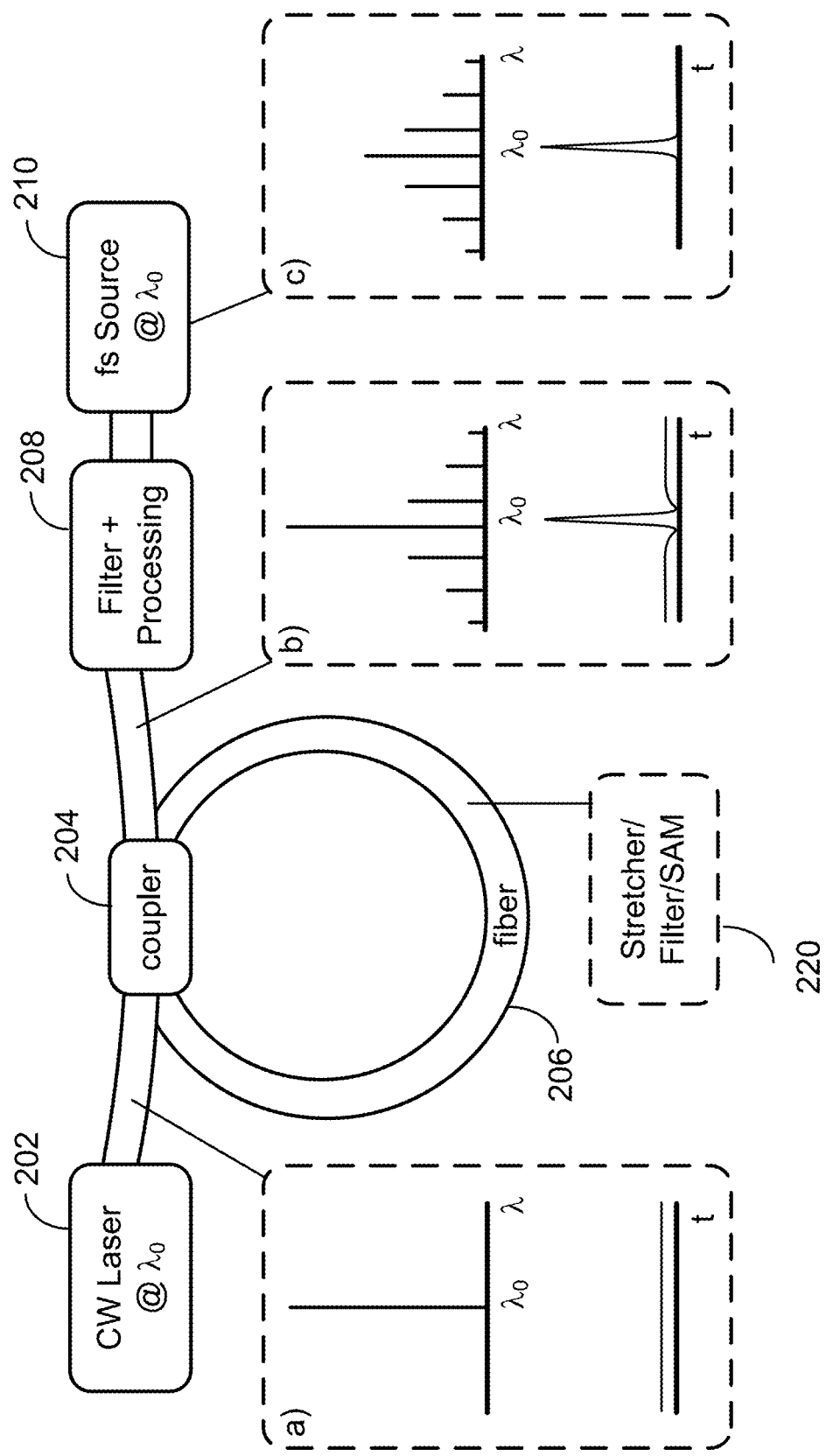
FIG. 2 schematically illustrates an example of a driven femtosecond fiber resonator design according to some embodiments.

FIG. 2 shows another example of a driven femtosecond fiber resonator design according to some embodiments. (The term resonator is also referred to herein as cavity.) In FIG. 2, a pump source 202 (e.g., a CW laser) pumps an optical fiber ring resonator 206 through an optical coupler 204. Femtosecond pulses may be generated through optical soliton formation in the optical fiber ring resonator 206. After spectral filtering and processing through the spectral filter and processing components 208, a pristine femtosecond pulse train may be generated at the output 210 at the laser drive wavelength. The inset (a) illustrates the spectral and temporal properties of the pump light emitted by the pump source 202 and pumped into the optical fiber ring resonator 206. The inset (b) illustrates the spectral and temporal properties of the optical solitons in the optical fiber ring resonator 206. The inset (c) illustrates the spectral and temporal properties of the optical solitons at the output 210 after spectral filtering and processing. In some embodiments, the optical fiber ring resonator 206 may include some optional components 220, such as a stretcher, a filter, and a saturable absorber.

Embodiments of the present invention provide techniques for nonlinear design of the driven resonator for optical soliton formation, providing for high energy femtosecond pulses, including short pulses and chirped pulses.

Figure 3A:
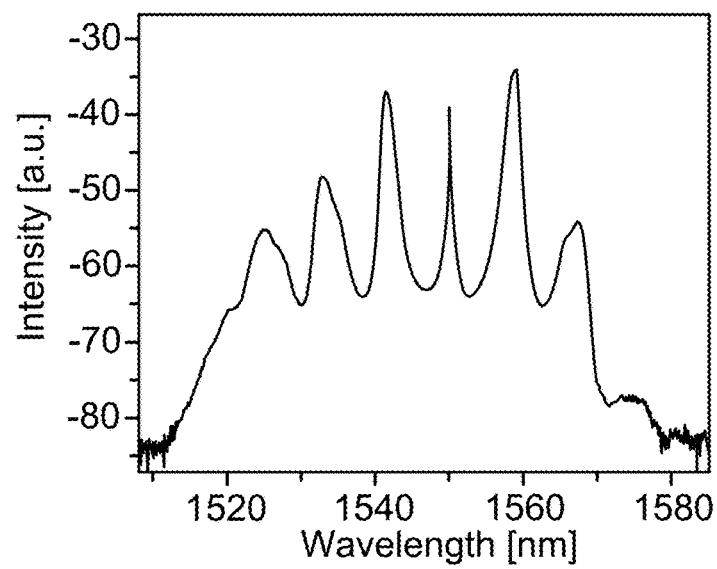
FIGS. 3A-3C show some exemplary spectral data for solitons generated by a driven resonator according to some embodiments.
Figure 3B:
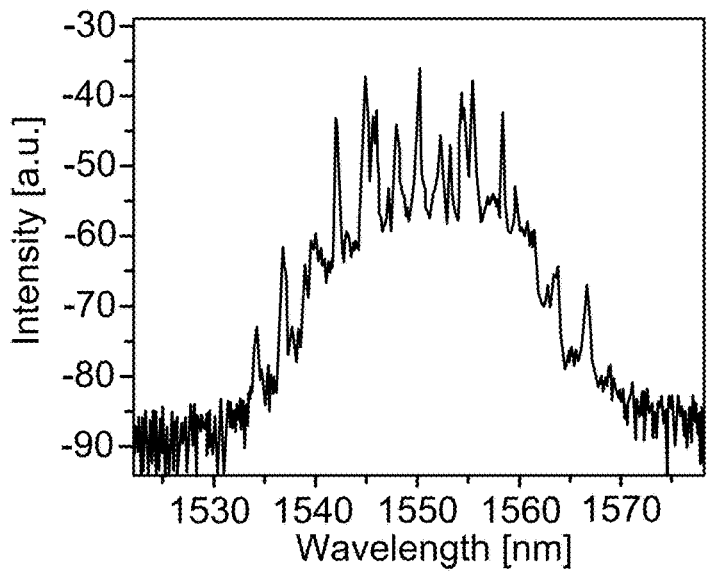
Figure 3C:
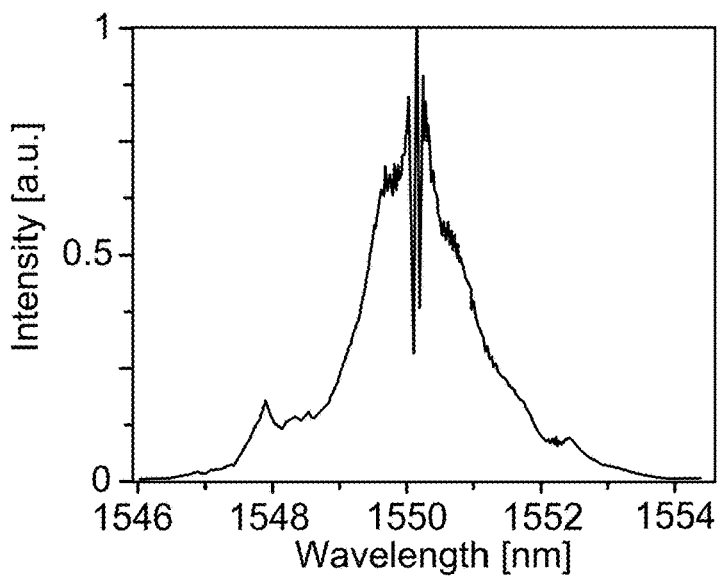

FIGS. 3A-3C show spectral data from experimentally observed optical solitons from a driven resonator according to some embodiments. FIG. 3A shows spectrum of a "stretched-pulse" optical soliton, with short pulse durations. FIGS. 3B and 3C show spectra of pulses from a normal dispersion optical fiber resonator, including the "chirped" pulse shown in FIG. 3C. Since similar optical solitons in mode-locked lasers have enabled important advances for traditional gain-medium based laser systems, these new results represent an important milestone for the more versatile driven-cavity system.

Example I—Stretched-Pulse Solitons in Driven Optical Fiber Resonators

Micro-resonator-based optical frequency combs are well-suited for applications such as timekeeping, spectroscopy, metrology, and coherent communications. A broadband frequency comb can be generated in a cavity driven by a continuous-wave (CW) laser through parametric four-wave mixing gain and self-organization processes. In particular, optical solitons generated in these cavities through the balance of group-velocity dispersion (GVD) and Kerr nonlinearity may enable nearly ideal broadband and fully coherent frequency combs [7].

The nonlinear dynamics of driven cavities was studied previously in fiber cavities, and recently, stable optical solitons have been observed in these systems as well [3]. Highly desirable sources are developed based on related optical solitons in fiber lasers. Embodiments described in this disclosure demonstrate that driven fiber cavities may also generate useful pulses in a versatile new platform for short-pulse applications.

In mode-locked fiber lasers, broadband solitons are generated in cavities with alternating segments of fiber with opposite signs of dispersion [8]. Operation with total dispersion close to zero may enable short pulses and the periodic stretching and compressing of the pulses. The short durations of the stretched pulses may reduce the average intracavity pulse peak power. This "stretched-pulse" regime has been predicted in a dispersion-mapped micro-resonator cavity [9], but no experiments have been reported. While optical solitons have been observed in fiber cavities with a dispersion map [10], broadband stretched-pulse operation has not been observed. Embodiments described in this disclosure provide numerical and experimental observations and discoveries of broadband stretched-pulse optical solitons from a driven fiber resonator.

Theory

Optical solitons may form in a driven cavity through the stable balance of nonlinearity and dispersion. In addition, cavity losses may be compensated with a continuous wave (CW) laser that is appropriately frequency detuned from the resonance frequency of the cavity. A numerical model is developed incorporating these effects with the damped and detuned nonlinear Schrödinger equation according to some embodiments. In one example, a resonator may include one segment of anomalous dispersion fiber and another segment of normal dispersion fiber. The term anomalous dispersion fiber may refer to a fiber with a negative group velocity dispersion (GVD). The term normal dispersion fiber may refer to a fiber with a positive GVD. CW drive and the fiber component losses may be incorporated as lumped elements after the fiber sections. The wave equation may be solved using a standard split-step Fourier transform propagation algorithm. For a given cavity dispersion map, the drive power and frequency detuning may determine the behavior of the optical solutions.

Figure 4A:
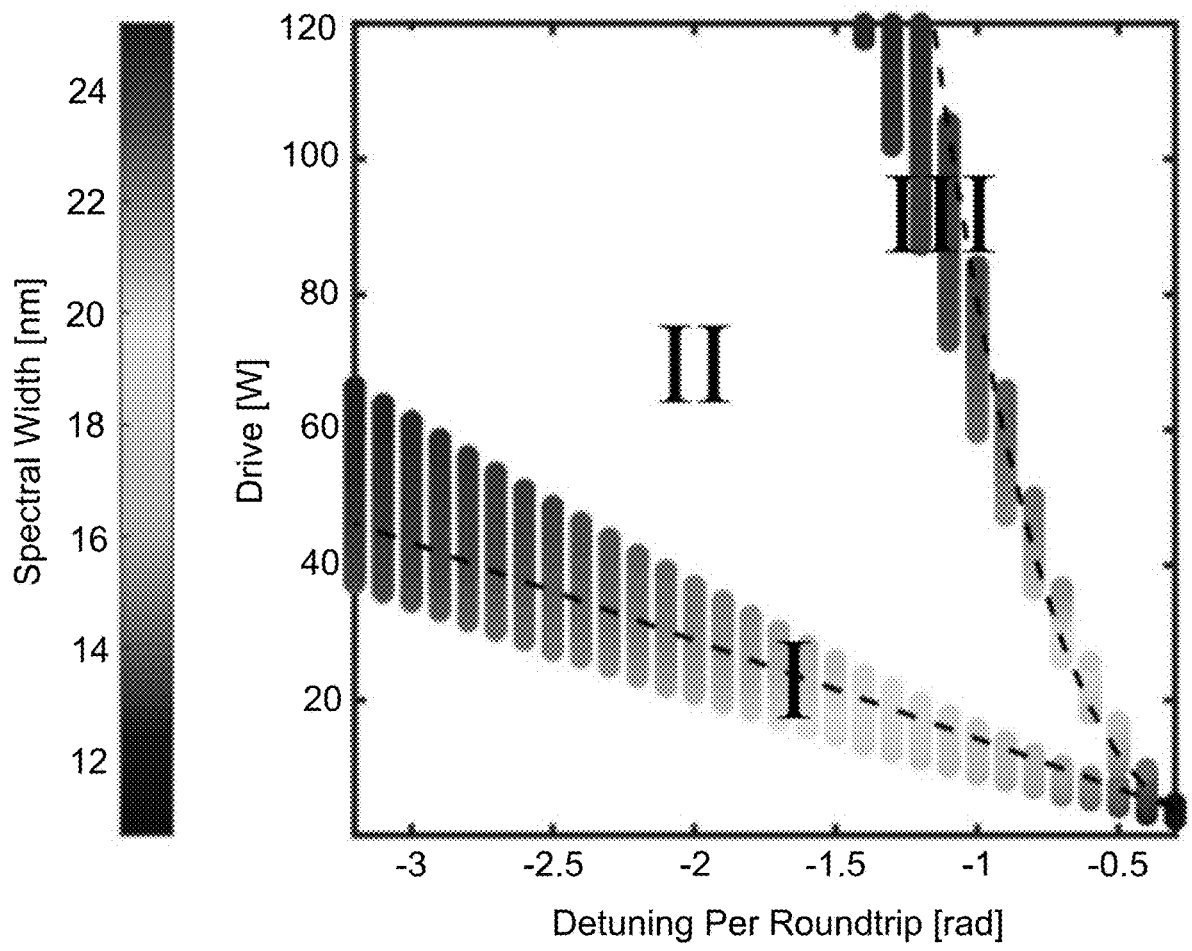
FIG. 4A charts stable solutions from numerical simulations with varying drive power and detuning for a fiber cavity with a total length of 10 m and net GVD of $-8000$ fs$^2$ according to some embodiments. Regions of note are indicated with Roman numerals.
Figure 4C:
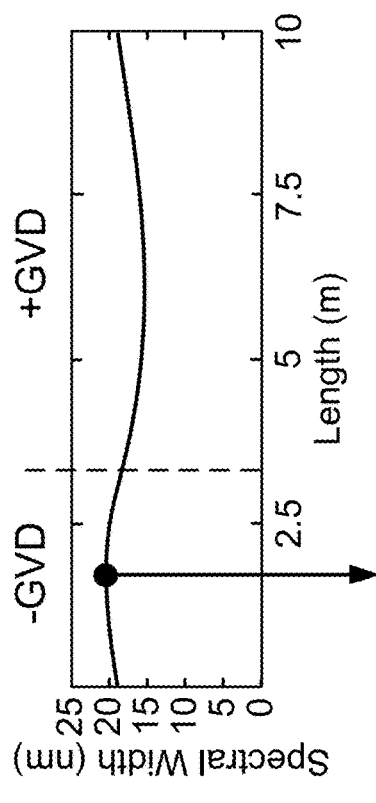
FIGS. 4B and 4C show temporal and spectral width evolution, respectfully, in the cavity with drive power of 15 W and detuning of $-1.5$ rad, according to some embodiments.
Figure 4B:
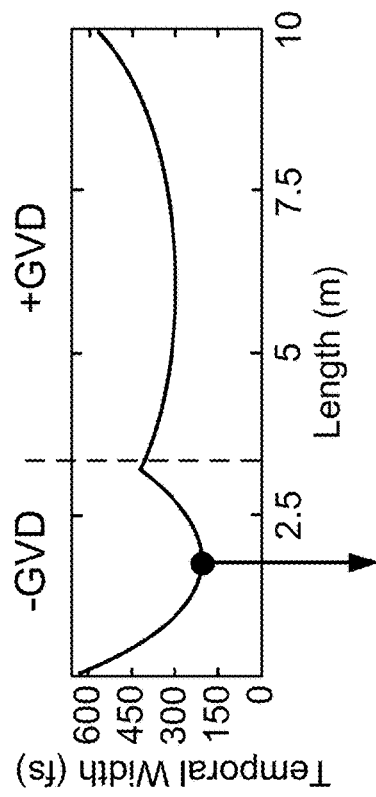
Figure 4E:
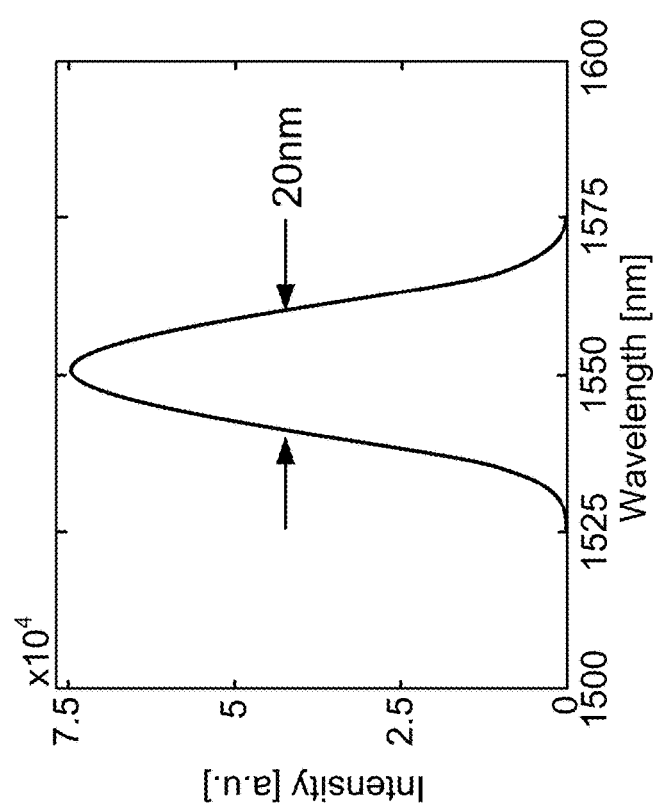
FIGS. 4D and 4E shows temporal and spectral intensity profiles, respectfully, of the shortest pulse in the cavity according to some embodiments.
Figure 4D:
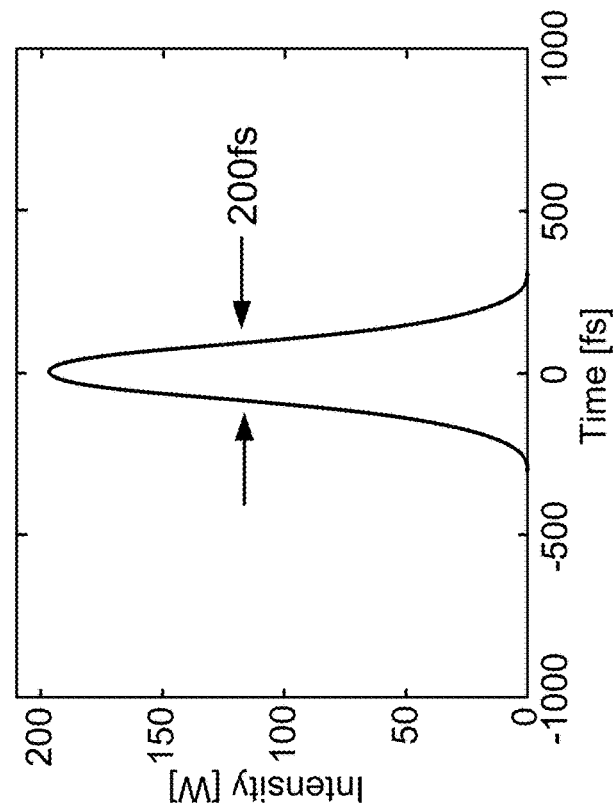

According to some embodiments, simulations run over a parameter grid defined by the drive power and frequency detuning reveal stable optical soliton solutions in two characteristic branches, as illustrated in FIG. 4A. Well-behaved optical soliton solutions may be found in regions I and III, and more complicated optical solutions may exist in region II, including noisy and breathing solitons, in addition to continuous wave solutions. FIGS. 4B-4E illustrate an exemplary solution from region I, exhibiting stable Gaussian pulses. As illustrated in FIG. 4B, the pulse duration may stretch and compress twice in the cavity, similar to stretched-pulse solitons in dispersion-managed mode-locked lasers [8, 9]. As illustrated FIG. 4D, the pulse in this 10-m cavity may have a full-width at half-maximum duration of 200 fs at its minimum dechirped duration in the cavity. In this example, the spectral width of the pulses may depend on the drive power and frequency detuning, in addition to the cavity length and total group-velocity dispersion. (The term "total group-velocity dispersion" or "total GVD" is also referred to herein as net group-velocity dispersion or net GVD. The term "total GVD" or "net GVD" is also referred to herein as group delay dispersion or GDD.)

Experimental Results

Figure 5A:
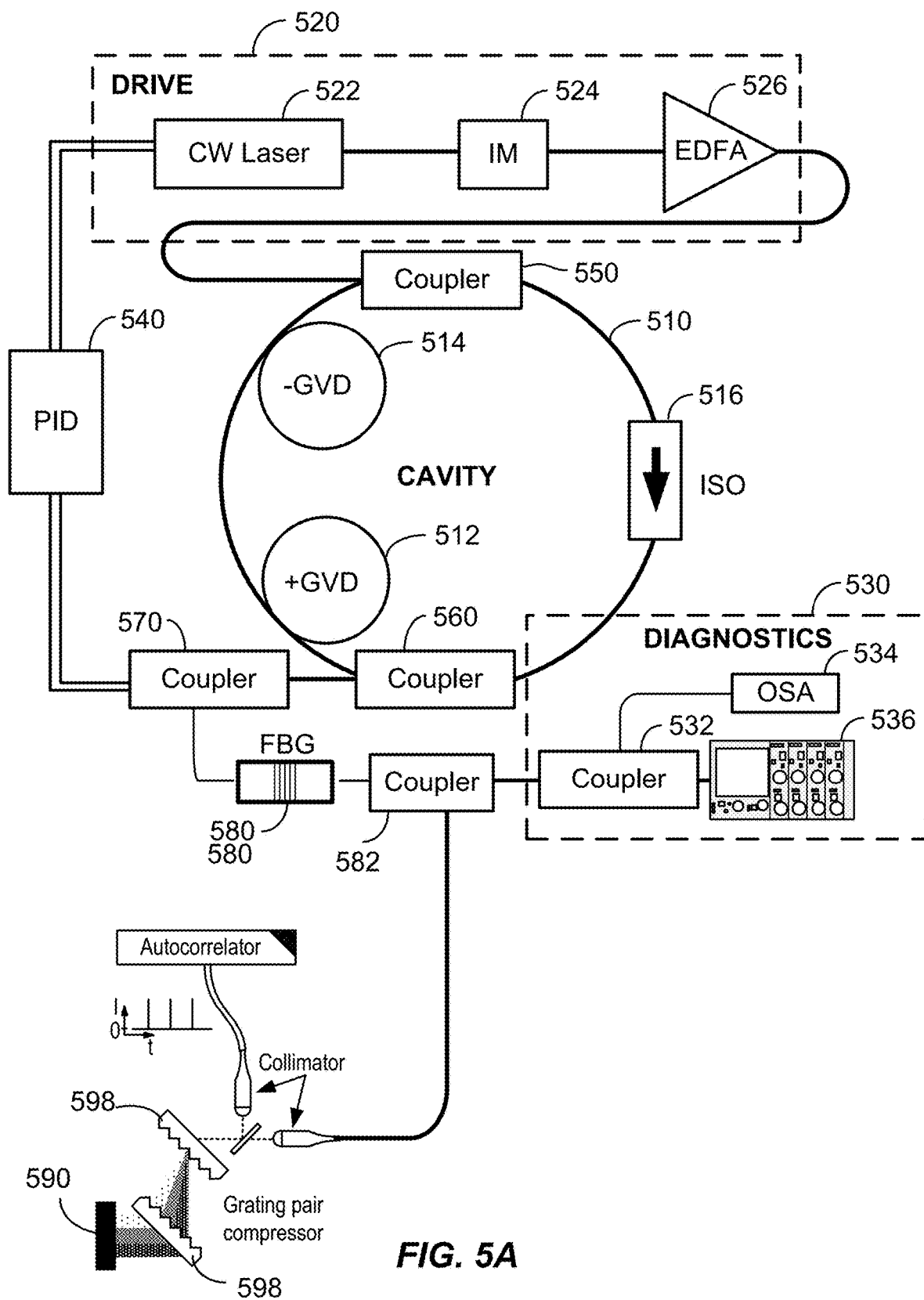
FIG. 5A shows a simplified block diagram of a driven-cavity optical pulse source according to some embodiments.

FIG. 5A shows a simplified block diagram of a driven-cavity optical pulse source according to some embodiments. The design of various parameters of the driven-cavity pulse source may be guided by numerical simulations. The driven-cavity pulse source may include an optical fiber ring cavity 510 (the term "cavity" may also be referred to as "resonator), a drive 520, and diagnostics 530. The optical fiber ring cavity 510 may comprise one segment 512 of standard single mode optical fiber with anomalous dispersion (e.g., with negative GVD) and another segment 514 of dispersion-shifted optical fiber with normal dispersion (e.g., with positive GVD). In some embodiments, the optical fiber ring cavity 510 may include two or more fiber segments with anomalous dispersion, and/or two or more fiber segments with normal dispersion. In some embodiments, there may be a free-space air gap between adjacent fiber segments. The optical fiber ring cavity 510 may include an optical isolator 516 to ensure unidirectional operation and to prevent stimulated Brillouin scattering. The optical isolator 516 may be an optical fiber isolator or a free-space optical isolator according to some embodiments.

In some embodiments, pump light generated by the drive 520 may be optically coupled into the optical fiber ring cavity 510 via an optical coupler 550. The frequency of the drive may locked with respect to the cavity resonance frequency with a feedback control circuit 540 (e.g., a proportional-integral-derivative controller, or PID controller). The feedback control circuit 540 may be configured to change the frequency of the pump source 522 (e.g., a CW laser) given the output CW power as an error signal. Changes in the frequency set-point may correspond to changes in the frequency detuning parameter. The effective drive power may be enhanced by intensity modulating the power of the pump source 522 into ns pulses (also referred to as a pulse train) using an intensity modulator (IM) 524 [6]. An optical amplifier 526 (e.g., an erbium-doped fiber amplifier or EDFA) may be used to amplify the amplitude of the pulses.

In some embodiments, a portion of each of the optical solitons formed in the optical fiber ring cavity 510 may be coupled out by using an optical coupler 560. A portion of the out-coupled light may be input to the feedback control circuit 540, and another portion of the out-coupled light may be input to a spectral filter 580 via an optical coupler 570 (e.g., a fiber beam splitter or an optical circulator). The spectral filter 580 may comprise a fiber Bragg grating (FBG), a birefringence-based spectral filter, an interference-based spectral filter, or the like. The spectral filter 580 may filter out the residual drive light from the output light.

A portion of the light after the spectral filter 580 may be coupled to the output 580 via an optical coupler 582. In some embodiments, the optical pulses (the optical solitons) may be compressed with an optical compression component 598. The optical compression component 598 may comprise a pair of gratings, a pair of prisms, an optical fiber compressor, or the like. Another portion of the light after the spectral filter 580 may be coupled to the diagnostics 530. For example, the diagnostics 530 may include an optical spectral analyzer (OSA) 534 for frequency domain analysis, and an oscilloscope 536 for time domain analysis. An optical coupler 532 (e.g., a fiber beam splitter) may be used to split the output light to the OSA 534 and the oscilloscope 536.

Figure 5B:
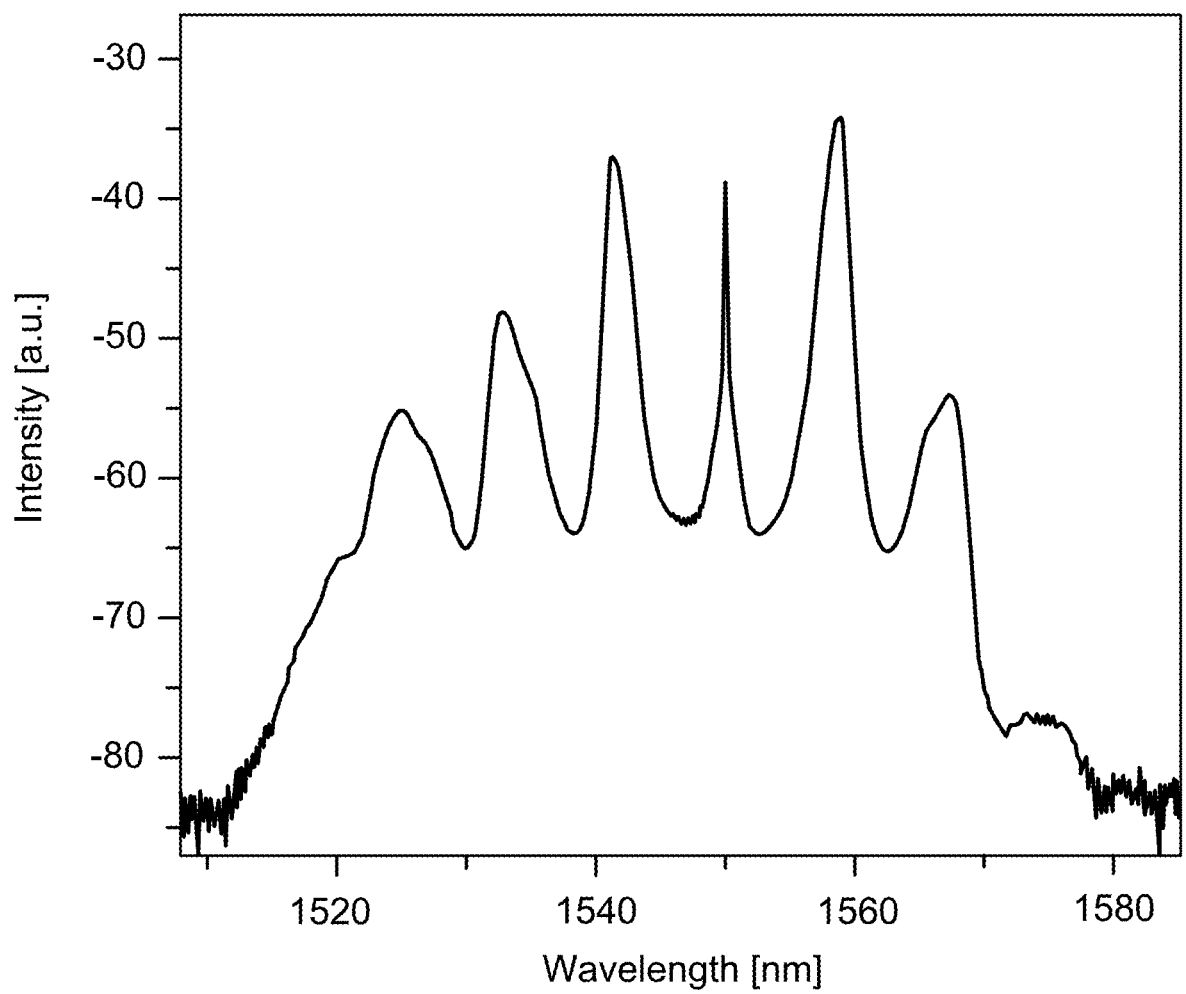
FIG. 5B shows an exemplary broadband output optical spectrum according to some embodiments.
Figure 5C:
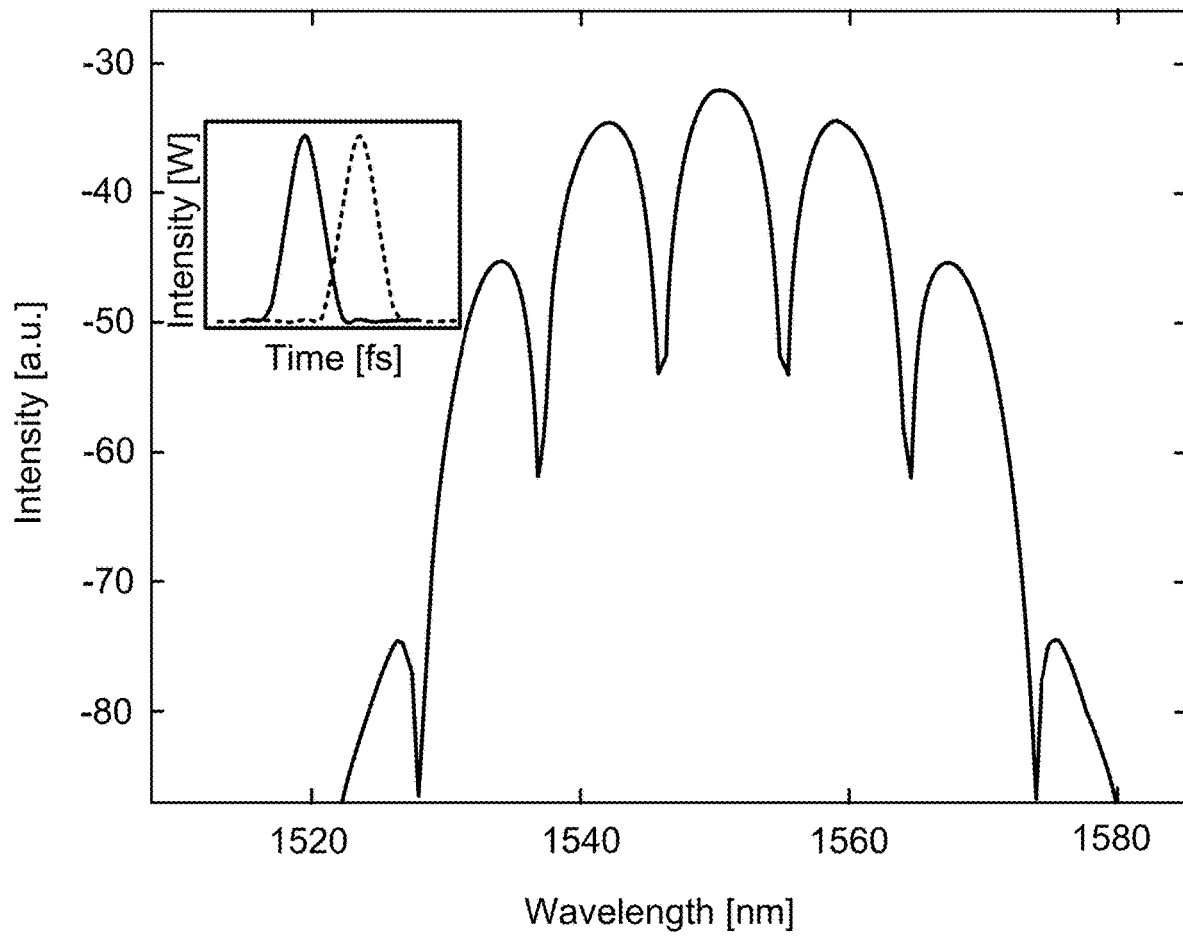
FIG. 5C shows an exemplary simulated spectral interference pattern corresponding to the closely separated stretched-pulse soliton temporal intensity profile shown in the inset, according to some embodiments.

In some embodiments, the net dispersion may be reduced from large net anomalous toward net zero dispersion by introducing an increasing length of normal dispersion fiber. (The term net dispersion may also be referred to herein as total dispersion.) Stable optical soliton solutions may be observed in each cavity, with the spectral bandwidth broadening as the net dispersion approaches zero. In some embodiments, a broad spectral bandwidth may be observed corresponding to a pulse with 200-fs duration, as illustrated in FIG. 5B. With this short pulse duration, the pulses are expected to breathe by more than a factor of two in the cavity. Without specific control of the temporal initial conditions in the optical fiber ring cavity 510, multiple pulses may arise in driven optical cavities [3]. The periodic structure observed on the spectrum is characteristic of such multiple pulses in the cavity with a small temporal separation. FIG. 5C shows an exemplary simulated spectral interference pattern corresponding to the closely separated stretched-pulse soliton temporal intensity profile shown in the inset, according to some embodiments. As illustrated, the simulated spectral interference pattern is in good agreement to the experimental results given a 900-fs temporal separation (9 nm spectral separation). With the addition of a pulse addressing beam, a single stretched-pulse soliton may be observable, as demonstrated in the numerical simulations.

Thus, according to some embodiments, broadband stretched-pulse solitons may be observed in a dispersion-mapped fiber cavity driven by a continuous-wave laser, in agreement with numerical simulations. Broadband soliton generation from driven fiber cavities may be a valuable new resource for short-pulse applications.

Example II—Highly-Chirped Solitons in Driven Fiber Resonators

As noted above, micro-resonator-based optical frequency combs may be ideal for applications such as timekeeping, spectroscopy, metrology, and coherent communications. In continuous-wave (CW) laser driven micro-resonators, frequency combs are generated through parametric four-wave mixing gain and self-organization processes. In particular, soliton formation through the balancing of anomalous group-velocity dispersion and Kerr nonlinearity may enable nearly ideal coherent frequency combs [7]. In addition to anomalous dispersion solitons, a variety of other stable soliton solutions may be observed in different parameter regimes, such as switching waves, dark solitons, soliton crystals, and Turing patterns [12]. In general, the performance of the frequency comb may be determined by the quality of these solutions.

In related mode-locked solid-state and fiber lasers, similar anomalous dispersion solitons may enable commercially available tools that are used extensively for ultrashort-pulse applications. More recently, chirped pulses have been discovered in mode-locked lasers featuring normal group-velocity dispersion [13, 14]. These highly-chirped pulses form through the balance of normal dispersion and nonlinearity as well as dissipative spectral filtering. While normal dispersion micro-resonators have been investigated [15], even in the case with effective spectral filtering [16], an analogous highly-chirped regime has not been observed in driven nonlinear optical cavities.

The nonlinear dynamics of driven cavities was first examined in fiber cavities, and recently, stable anomalous dispersion solitons have been observed [3], in addition to other patterns like switching-waves and Turing patterns. Fiber resonators represent an excellent platform to study chirped pulses because they allow for large powers and an array of pulse shaping tools. In some embodiments, it has been discovered that the spectral filter needed to stabilize chirped pulses in mode-locked lasers can be applied to fiber resonators as well. Embodiments described in this disclosure examines highly-chirped solitons in large normal dispersion fiber optical cavities with an intracavity spectral filter.

Theory

Figure 6A:
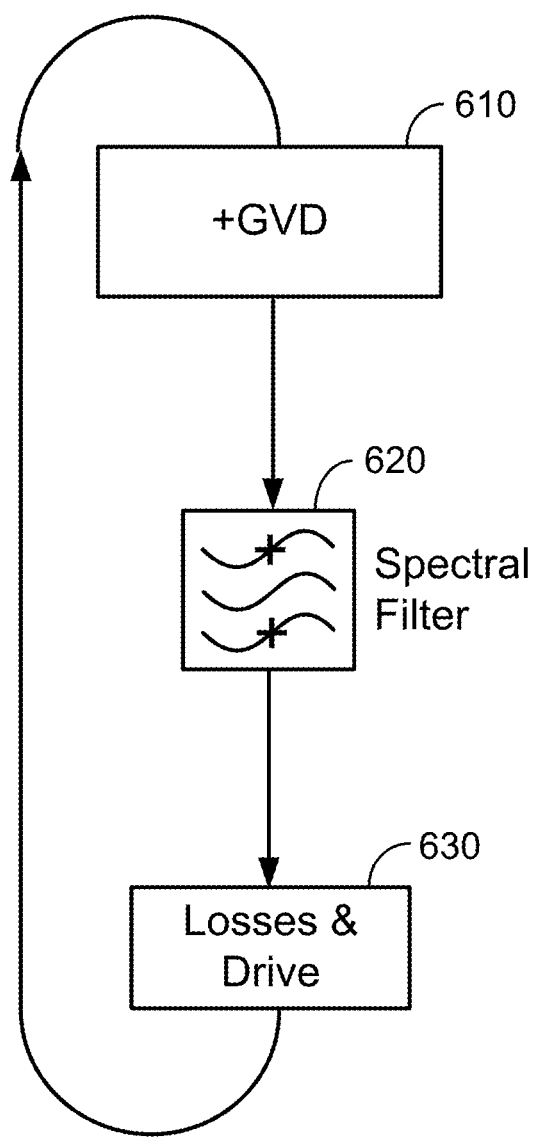
FIG. 6A shows a simplified block diagram of an optical pulse source according to some embodiments.

A search was done for chirped pulses in driven fiber resonators with numerical simulations, using chirped-pulse modelocked lasers for guidance. Simulations may account for dispersion, nonlinearity, and spectral filtering, in addition to loss and a frequency-detuned drive. FIG. 6A shows a simplified block diagram of an optical pulse source according to some embodiments. The optical pulse source includes fiber sections 610, a spectral filter 620, and a losses and drive 630. The fiber sections may be modeled with the damped and detuned nonlinear Schrödinger equation. The spectral filtering 620, continuous-wave drive and additional losses 630 may be added as lumped elements after the fiber sections 610. The pulse propagation in the fiber section 610 may be evaluated with a split-step Fourier method and the field is propagated around the cavity until it converges to a steady-state.

Figure 6B:
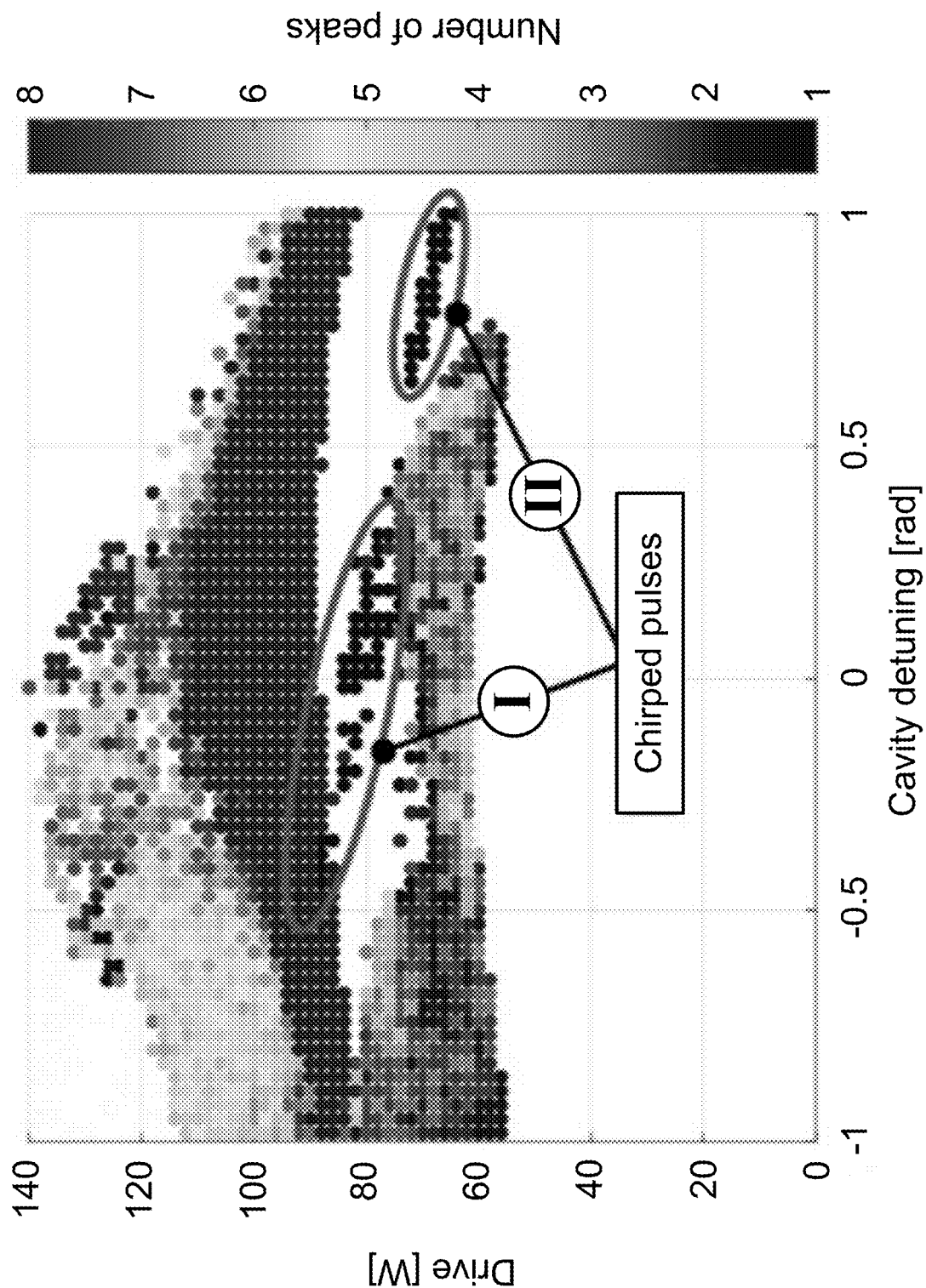
FIG. 6B shows numerical simulation results from an example of a large normal dispersion fiber cavity illustrated in FIG. 6A, indicating the number of peaks of the converged temporal intensity profile vs. drive power and detuning, according to some embodiments.
Figure 6C:
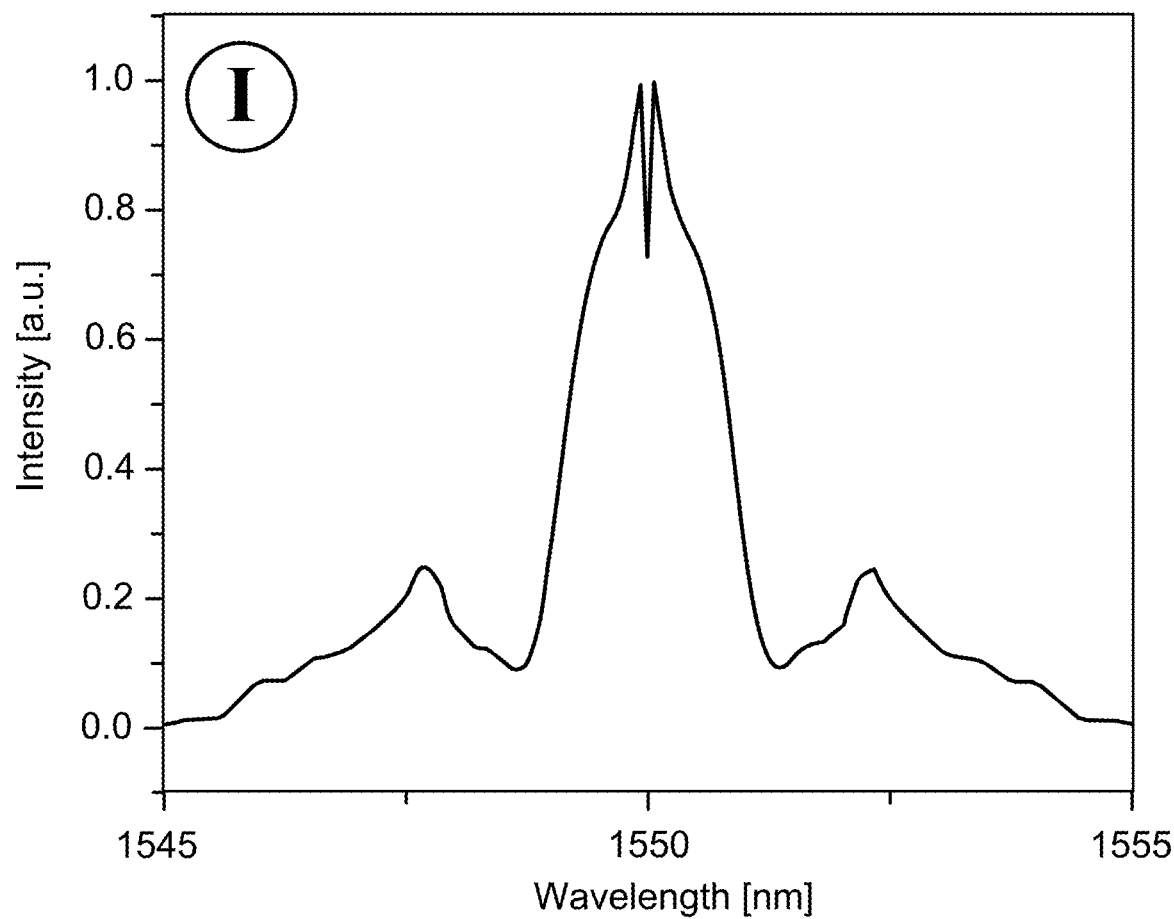
FIG. 6C shows an exemplary spectrum from Region I in FIG. 6B, according to some embodiments.
Figure 6D:
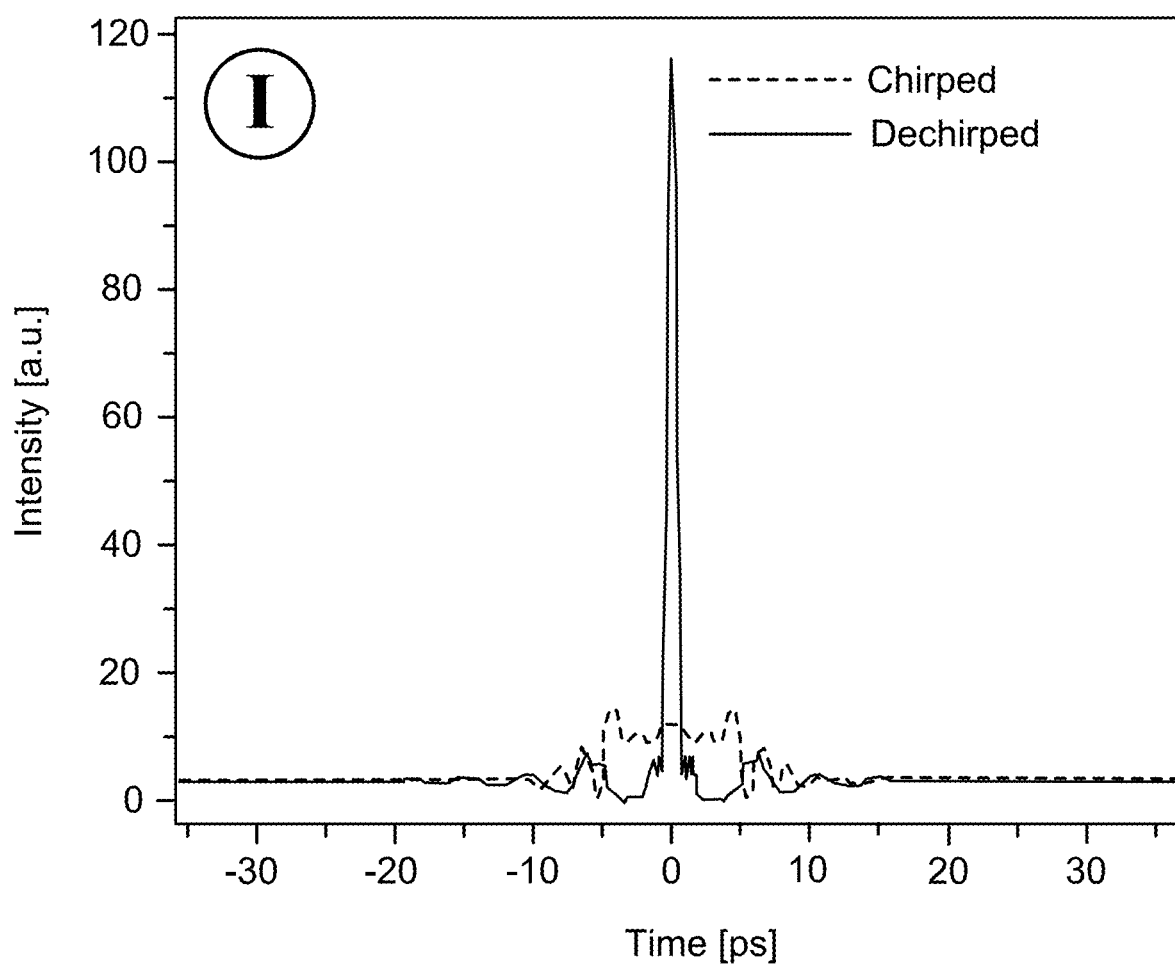
FIG. 6D shows exemplary chirped and dechirped pulses from Region I in FIG. 6B, according to some embodiments.
Figure 6E:
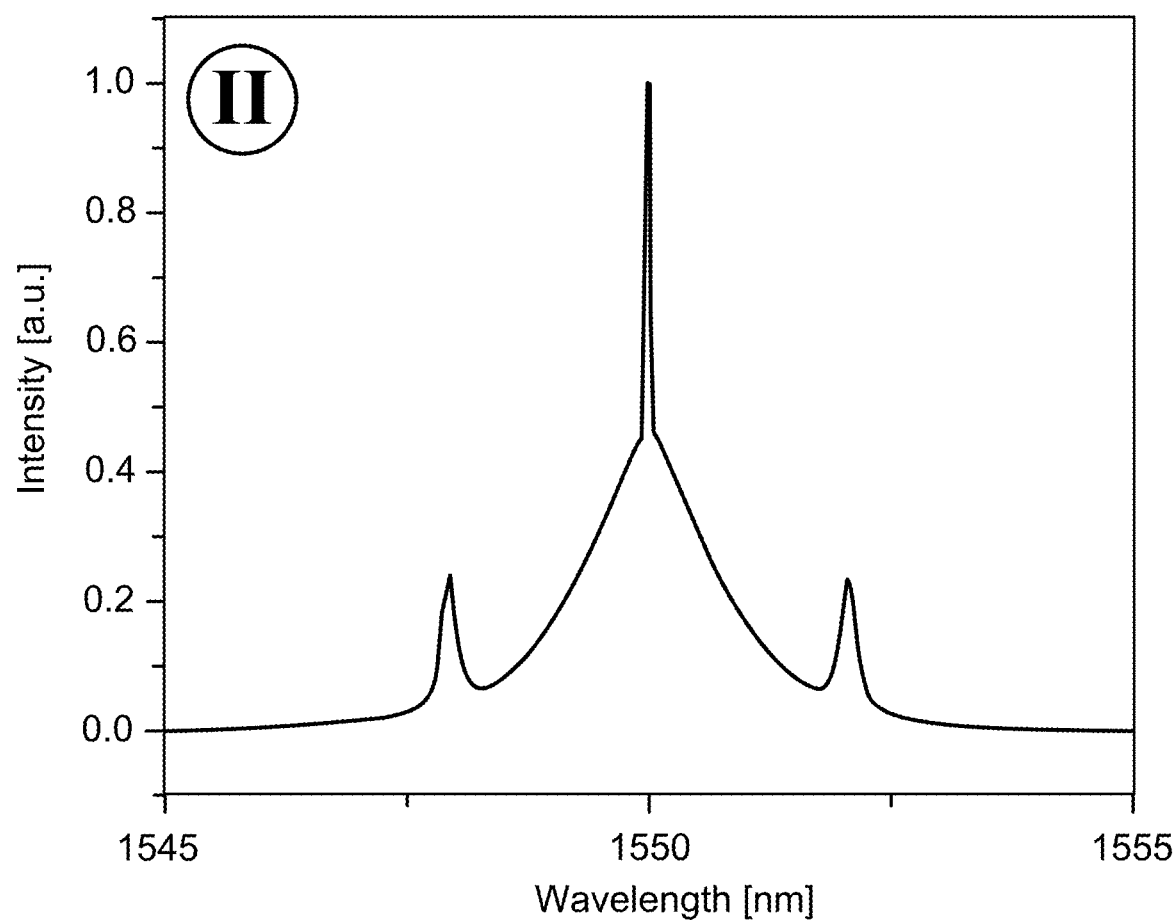
FIG. 6E shows an exemplary spectrum from Region II in FIG. 6B, according to some embodiments.
Figure 6F:
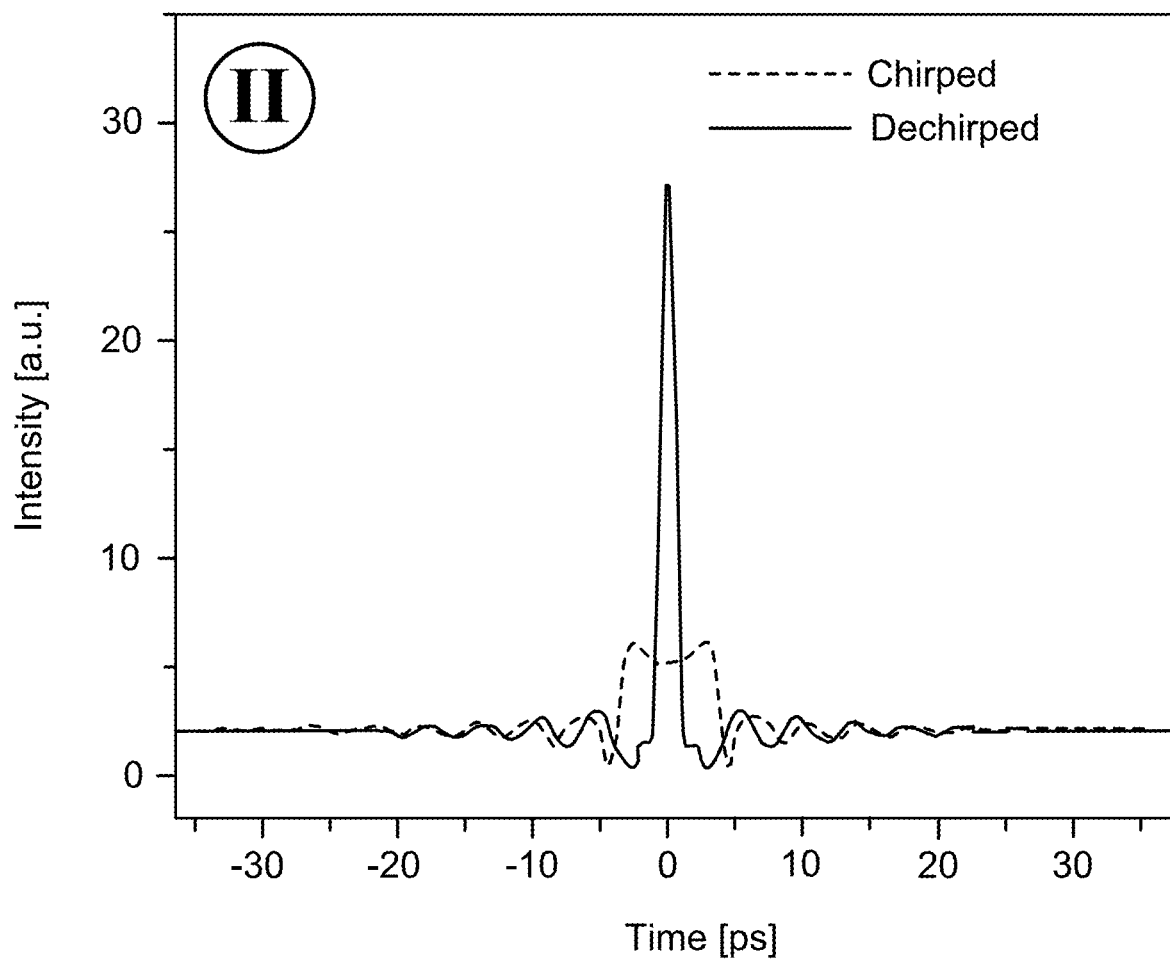
FIG. 6F shows exemplary chirped and dechirped pulses from Region II in FIG. 6B, according to some embodiments.

In some embodiments, chirped pulses may be observed with the appropriate combination of fiber dispersion and spectral filtering, as is the case with mode-locked lasers. For example, stable chirped pulses may be observed at high drive powers with a cavity comprising 50 m of dispersion-shifted fiber and a 4-nm spectral filter. However, to find chirped pulses with lower, more experimentally accessible drive powers in at least some implementations, the total cavity length may be increased (by ~100 m), while maintaining the same large net normal dispersion and the 4-nm spectral filter. This extended length may reduce the drive threshold by increasing the nonlinearity, and enable larger quasi-CW pump powers when pulse pumping. A wide range of stable solutions may be observed as a function of drive and frequency detuning, as illustrated in FIG. 6B. In a representation of the solutions vs. the number of intensity peaks, for example, periodic structures can be identified in the large dark region, and dark solitons and switching waves in the low drive regions. The chirped pulses, identified by the localized dark and circled regions in parameter space, feature a long pulse on a continuous-wave background that can be compressed with the application of anomalous group-velocity dispersion, as illustrated in FIGS. 6C-6F. The compression factor of the dechirped pulse may vary between solutions, with a factor of two difference between the solutions illustrated. The magnitude of dispersion required to dechirp the pulses may be three times the normal dispersion in the cavity, suggesting that the positive chirp may be the result of nonlinear processes, as it is for chirped pulses in mode-locked lasers.

The bandwidth of the spectral filter 620 may be approximately centered on the drive wavelength, and may be relative to the total positive dispersion (which may be equal to fiber dispersion per unit length times the length of fiber) of the driven resonator. (The term total dispersion may also be referred to herein as net dispersion.)

Experimental Results

Figure 7A:
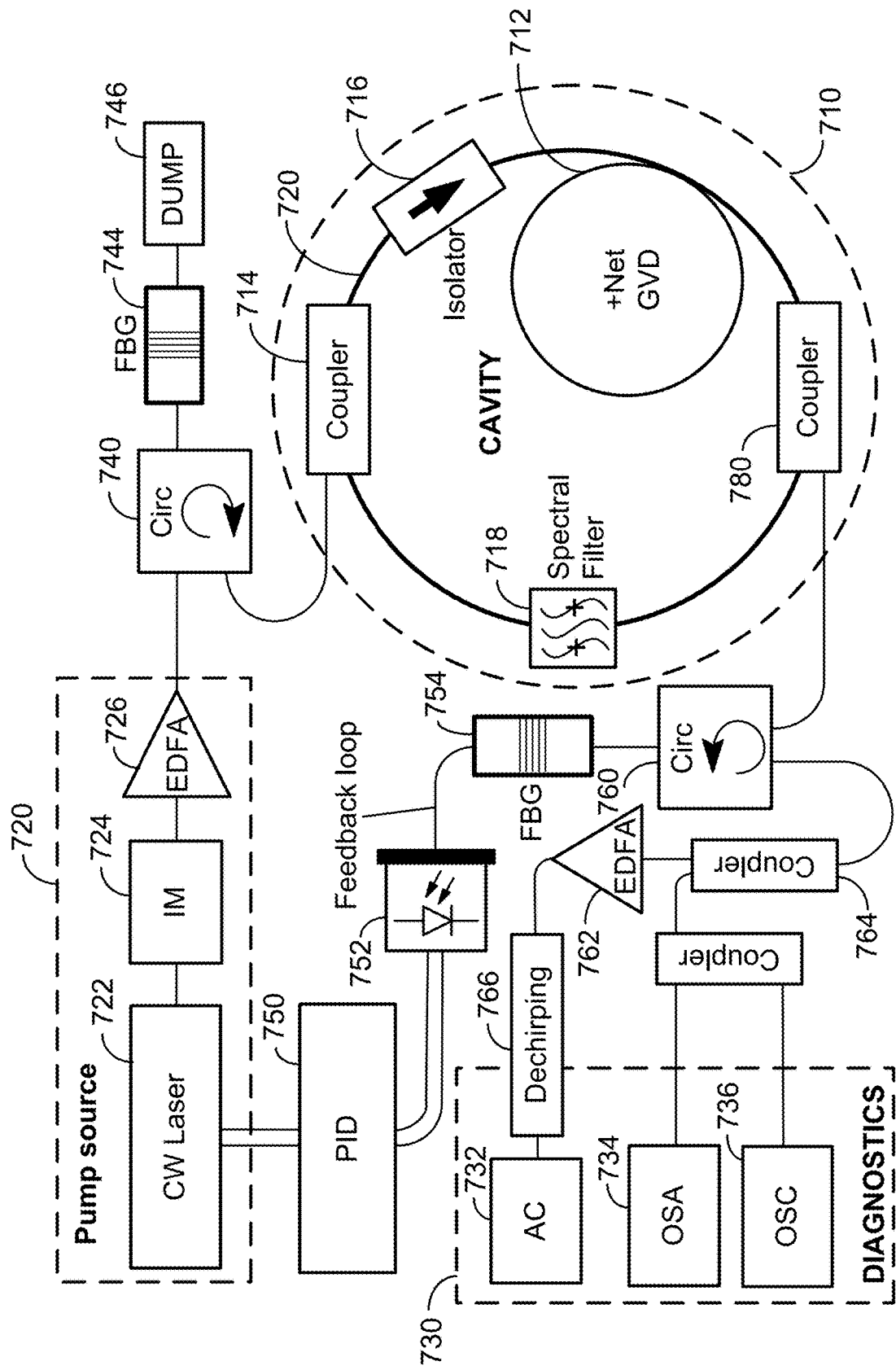
FIG. 7A shows a simplified block diagram of an optical pulse source according to some embodiments.

Optical pulse sources may be designed with parameters guided by numerical simulations. FIG. 7A shows a simplified block diagram of an optical pulse source according to some embodiments. The optical pulse source includes a cavity 710 (also referred to as resonator), a drive 720, and diagnostics 730. The cavity 710 may include one or more fiber segments with a net positive GVD (net normal dispersion). The cavity 710 also includes a spectral filter 718. The cavity 710 may include an optical isolator 716 to ensure unidirectional operation. The drive 720 includes a pump source 722. In some embodiments, the spectral filter may comprise a fiber-format super-Gaussian spectral filter with 4-nm bandwidth.

The drive 720 may also include an intensity modulator (IM) 724 and an optical amplifier 726 (e.g., an erbium-doped fiber amplifier or EDFA). The pump source 722 may comprise a narrow-line CW laser. CW light emitted by the pump source 722 may be converted into a pulse train (e.g., 10-ns pulses with the repetition rate of the fiber cavity) by the intensity modulator 724, before being amplified into a high power pulse train by the optical amplifier 726 [11]. For example, this may enable a 80 W of quasi-CW pump power with a 2-W EDFA. Residual amplified spontaneous emission may be removed with a spectral filter 744 (e.g., a fiber-Bragg-grating or FBG), before the pump light is coupled into the cavity 710 via an optical circulator 740 and an optical coupler 714.

The frequency of the drive 720 may be locked to the resonance frequency of the cavity 710 with a feedback control circuit 750 (e.g., a PID controller). The feedback control circuit 750 and the locking frequency set-point may give experimental control over the frequency detuning parameter. A portion of the output of the cavity 710 may be coupled into the feedback control circuit 750 via an optical coupler 780 and a circulator 760. In some embodiments, a spectral filter 754 (e.g., an FBG) may be inserted in the feedback loop. The feedback loop may also include a photodiode 752 for converting optical signals into electrical signals for the feedback control circuit 750.

The diagnostics 730 may include an optical spectral analyzer (OSA) 734 for frequency domain analysis, and an oscilloscope (OSC) 736 for time domain analysis. The diagnostics 730 may also include an autocorrelator (AC) 732. A portion of the output may be coupled to an optical amplifier 762 (e.g., an EDFA) via an optical coupler 764, subsequently dechirped by the dechirping circuitry 766, and then analyzed by the AC 732.

Figure 7B:
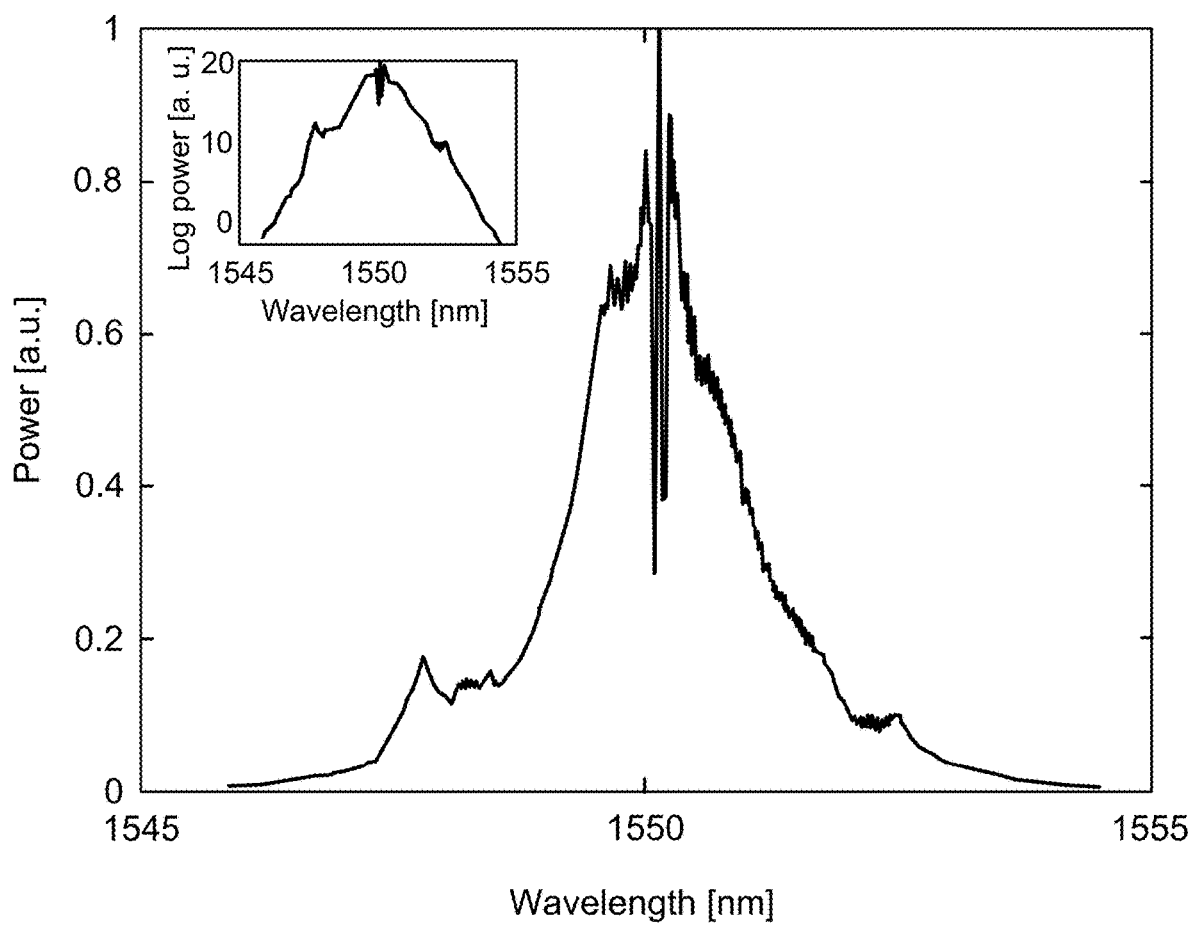
FIG. 7B shows a chirped-pulse output spectrum in linear scale, and in log-scale in the inset, according to some embodiments.
Figure 7C:
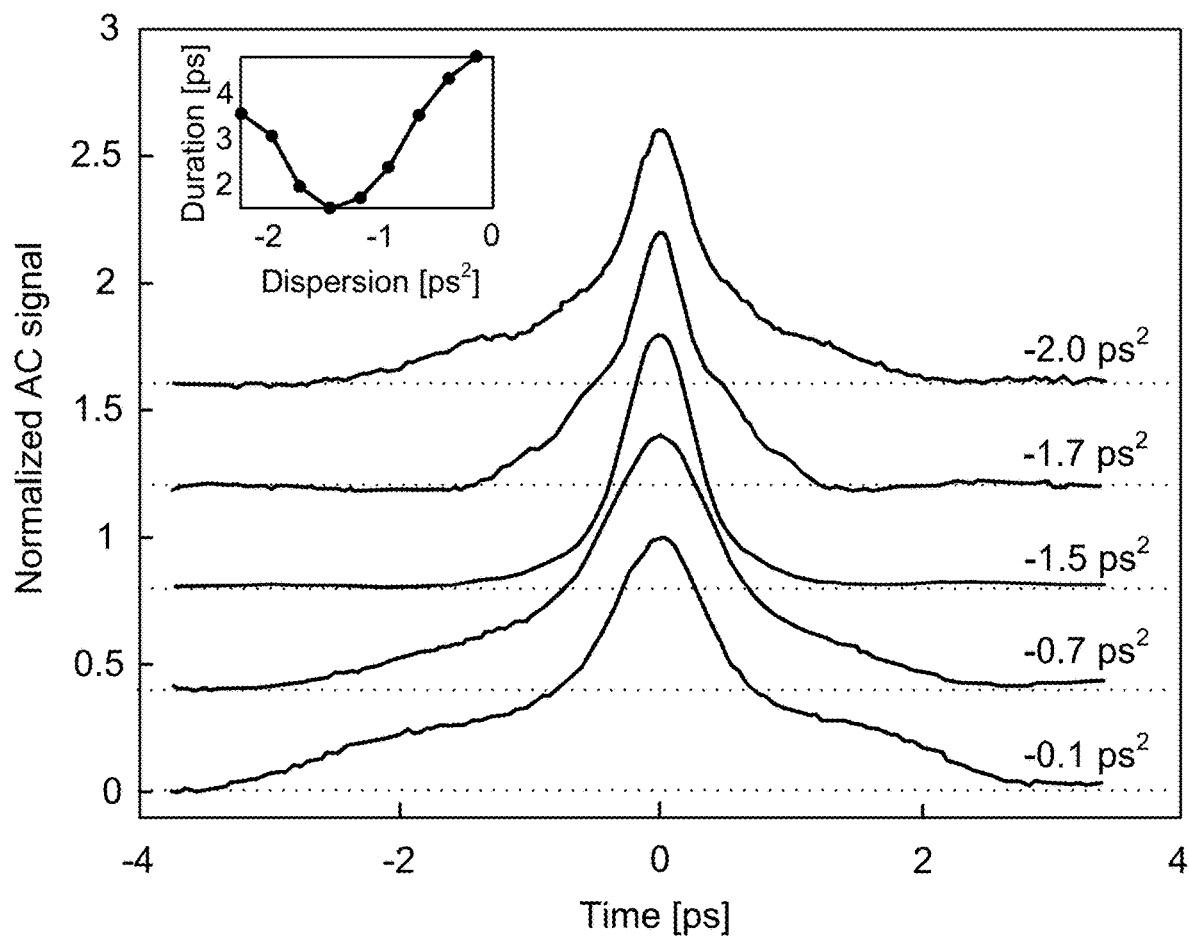
FIG. 7C shows exemplary pulse measurements with various amounts of compression applied to the output according to some embodiments. The inset of FIG. 7C shows a plot of pulse duration (e.g., full-width at half-maximum) as a function of applied compression dispersion.

According to some embodiments, chirped pulses may be observed near the highest pump powers with specific settings of the pump polarization and detuning. FIG. 7B shows an exemplary pulse spectrum featuring a broad pedestal structure on the linear scale (the inset of FIG. 7B shows the pulse spectrum in the logarithm scale). FIG. 7C shows exemplary temporal spectra with various magnitudes of external pulse compression. The inset of FIG. 7C shows a plot of pulse duration (e.g., full-width at half-maximum) as a function of dispersion of external pulse compression. As illustrated, the pulse compresses to a clear minimum duration with an optical compression component (e.g., similar to the optical compression component 598 illustrated in FIG. 5A). The optical compression component may comprise a pair of gratings, a pair of prisms, an optical fiber compressor, or the like. The pulse dechirps close to the transform-limited 1-ps duration. The magnitude of the pulse chirp is significant and corresponds to three times the total normal dispersion in the cavity, in excellent agreement with simulations.

Thus, it has been demonstrated that highly-chirped pulses can be observed in a driven fiber resonator with large net normal dispersion and a narrowband spectral filter. This system supports a wide range of stable optical patterns which may be attractive for frequency-comb and short-pulse applications.

Example III—Chirped Temporal Solitons in Driven Fiber Resonators

Temporal solitons in driven microresonator, fiber-resonator, and bulk enhancement cavities may enable attractive optical sources for spectroscopy, communications, and metrology. Embodiments described in this disclosure provide theoretical and experimental observations of a new class of temporal optical solitons characterized by pulses with large and positive chirp in net normal dispersion resonators with strong spectral filtering. Numerical simulations reveal stable waveforms over a wide new range of parameters including highly chirped pulses at large drive powers. Chirped temporal solitons matching predictions are observed in experiments with net normal dispersion fiber resonators strongly driven with nanosecond pulses. Scaling laws are developed and provide simple design guidelines for generating chirped temporal solitons in bulk- and micro-resonator, in addition to fiber-resonator platforms. The relationship between the chirped solutions and other stable waveforms in normal and anomalous dispersion resonators is examined. Chirped temporal solitons represent a promising new resource for frequency-comb and ultrashort-pulse generation.

Frequency combs can be generated in optical resonators driven by a continuous-wave (CW) laser. In these systems, bandwidth may be generated through Kerr-mediated parametric four-wave mixing and stability may be achieved through nonlinear self-organizing processes. In driven fiber cavities, early studies of modulation instability demonstrated evidence of pattern formation [17-19], and more recent studies have focused on long-range interactions [17], spatiotemporal instabilities [21], temporal tweezing [22], and applications such as all-optical buffering [23, 24]. In parallel, researchers have established micron-scale resonators as compact, simple, and low-power sources of frequency combs with large frequency spacings. Microresonator source development has attracted considerable interest for applications in waveform synthesis, high-capacity telecommunications, astrophysical spectrometer calibration, atomic clocks, and dual-comb spectroscopy [25, 26]. Microresonator frequency combs have been demonstrated in whispering gallery [27, 28] and on-chip [29, 30] cavities, with high performance combs spanning an octave or more [31-33]. Low noise and broadband coherence are important for frequency-comb applications and require specific consideration for driven-resonator sources [34, 35]. Specifically, it may be important that the phases between the cavity modes have a well-defined relationship, i.e., the driven cavity is mode-locked.

In laser cavities, with an active gain medium, mode-locking occurs through the formation of optical solitons, which are pulses that self-stabilize in the presence of Kerr optical nonlinearity and anomalous group-delay dispersion (GDD) [36]. Optical solitons are an attractive mechanism for stabilizing broadband frequency combs in driven passive cavities as well. Solitons in these systems also ensure that broadband cavity losses are counter-balanced by the single-frequency drive source. Driven-cavity solitons were first observed in fiber resonators [23], shortly thereafter in microresonators [37], and most recently in bulk enhancement cavities [38]. The close relationship between driven-cavity soliton mode-locking and laser-cavity soliton mode-locking [39] suggests new potential mechanisms for stable pulse and frequency-comb generation in driven-cavity systems. For example, in mode-locked lasers featuring normal dispersion and a spectral filter, a distinct class of highly-chirped soliton can be generated [40-43]. In addition to the scientific importance of novel highly dissipative soliton formation, the chirped-pulse laser soliton has benefited applications by extending pulse generation to normal dispersion systems, enabling large pulse energies [44], and simplifying amplifier setups [45]. The impact that chirped solitons have had for mode-locked lasers motivates the search for analogous solutions in driven-resonator systems. While several nonlinear solutions have been analyzed in driven-cavities, including Turing patterns [46], breathing pulses [46], and soliton crystals [47] in anomalous dispersion cavities and dark solitons [48-51], bright solitons [52], platicons [51, 53, 54], and switching waves [48, 55] in normal dispersion cavities [56], an analogous chirped temporal soliton has not been observed.

This disclosure describes observation of chirped temporal solitons in driven resonators theoretically and experimentally in normal dispersion fiber cavities with a spectral filter. A driven normal-dispersion resonator with effective spectral filtering has been examined previously [57], but the filter was not specifically designed and chirped pulses were not observed. Numerically simulated resonators with suitable spectral filtering are found to support stable pulses with chirp that corresponds to more than twice the linear dispersion of the cavity, which indicates that the spectral phase is the result of nonlinear pulse formation. Chirped solitons, in agreement with predications, are observed experimentally in long net normal dispersion fiber cavities driven with nanosecond pulses. General scaling laws are developed for chirped temporal solitons in driven resonator systems. Chirped temporal solitons enable a broad new range of system and performance parameters that complement currently available techniques for ultrashort pulse and frequency-comb generation.

Theory

According to some embodiments, a passive fiber resonator may be designed to support chirped temporal solitons. The cavity may be designed based on an analogous chirped-pulse mode-locked laser in which the laser amplifier is replaced with a continuous-wave (CW) drive source.

Figure 8A:
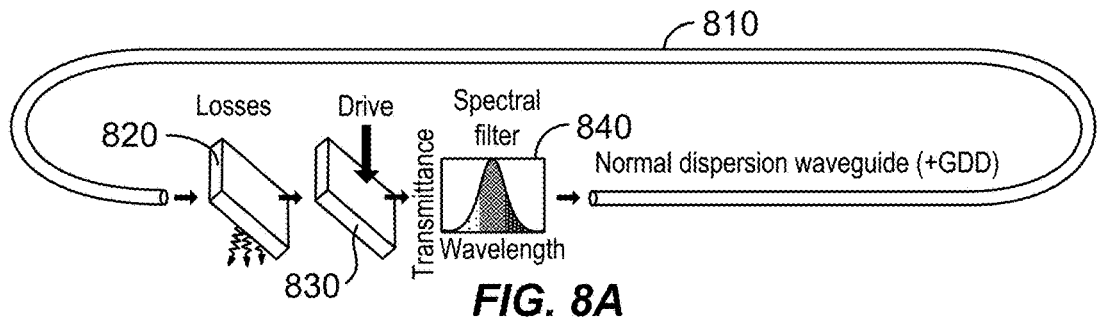
FIG. 8A shows a simplified block diagram of a passive fiber resonator according to some embodiments.

FIG. 8A shows a simplified block diagram of a passive fiber resonator according to some embodiments. The passive cavity may comprise net normal dispersion fiber 810, losses 820, a drive source 830, and a spectral filter 840, as illustrated in FIG. 8A.

Figure 8B:
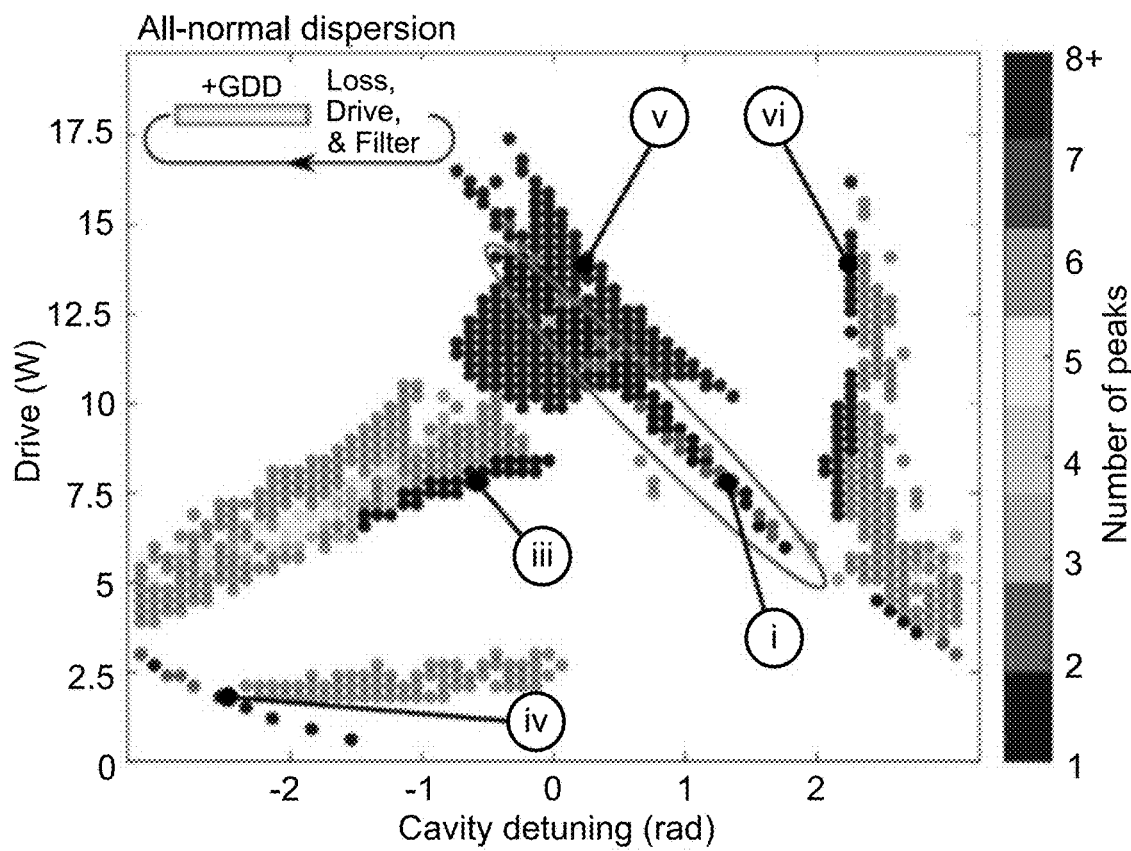
FIG. 8B shows converged solutions as a function of drive power and detuning for an all-normal dispersion cavity according to some embodiments. The color map represents the number of prominent peaks on the stable waveform.

FIG. 8B shows converged solutions as a function of drive power and detuning for an all-normal dispersion cavity according to some embodiments. The grey-scale map represents the number of prominent peaks on the stable waveform. Specific solutions are indicated with Roman numerals. For example, regions i and ii (see FIG. 8D) represent chirped pulse observed in a well-defined region of parameter space, region iii represents dark pulses, region iv represents switching waves, and regions v and vi represent Turing waves.

Figure 8C:
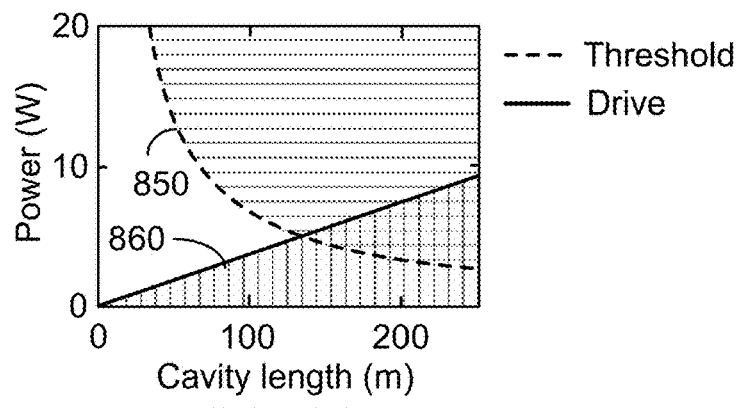
FIG. 8C shows a diagram in the parameter space of drive power and cavity length to illustrate the minimum cavity length required for observing chirped solitons according to some embodiments.

FIG. 8C shows a diagram in the parameter space of drive power and cavity length to illustrate that the minimum cavity length required for observing chirped solitons may be determined by the decreasing threshold power (line 850) and the increasing peak drive power (line 860) as a function of length, according to some embodiments.

Figure 8D:
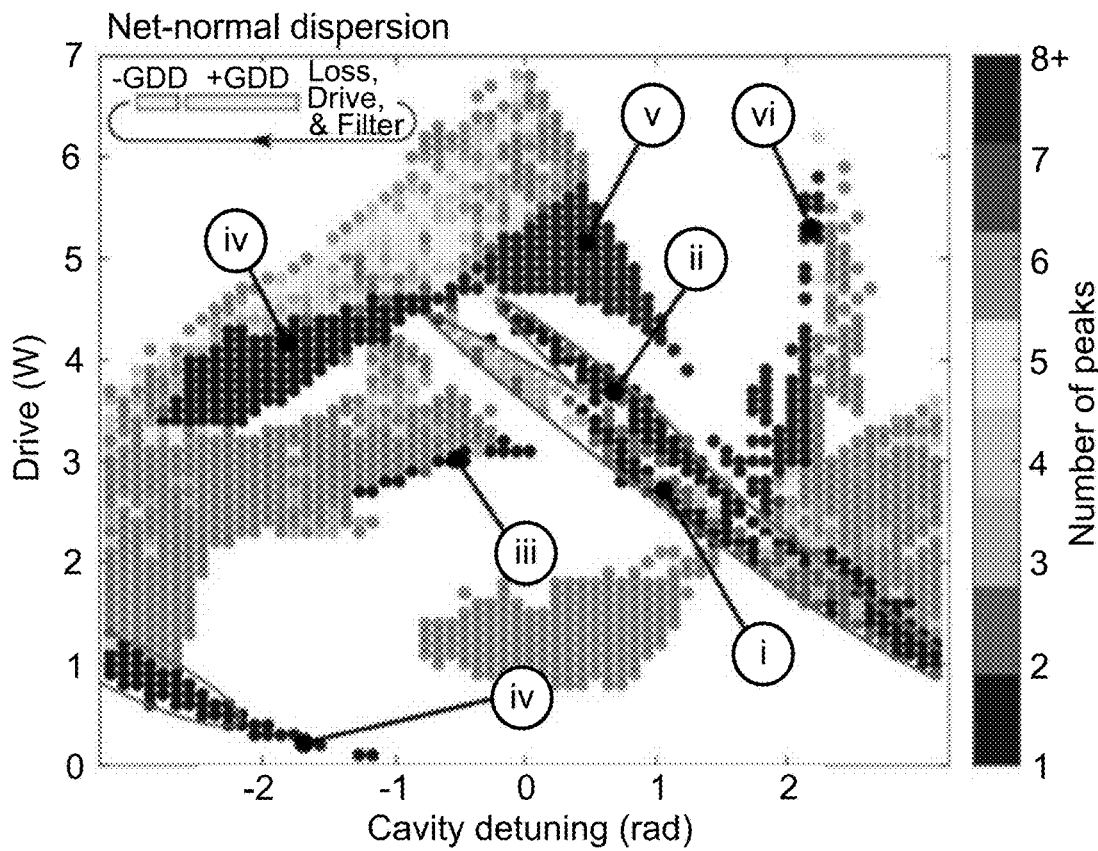
FIG. 8D shows converged solutions as a function of drive power and detuning comparable to FIG. 8B for the cavity with large net-normal dispersion developed experimentally according to some embodiments.

FIG. 8D shows converged solutions as a function of drive power and detuning comparable to FIG. 8B for the cavity with large net-normal dispersion developed experimentally, according to some embodiments.

Numerical simulations are developed to determine if this design can support chirped temporal solitons (as discussed in more detail below). The spectral filter 840 (e.g., with a Gaussian profile with 4-nm bandwidth) may be chosen based on the requirements for a mode-locked fiber laser with the same cavity length (e.g., 52.5 m) [42, 58]. After fixing the filter 840, cavity length (e.g., the length of the normal dispersion fiber 810), and losses 820, the simulations are examined as a function of the remaining variables: the incident drive power and frequency (cavity detuning).

FIG. 8B shows some exemplary numerical simulation results in the parameter space of drive power and detuning frequency according to some embodiments. First, the trivial continuous-wave solutions and solutions that do not converge are indicated by white regions in FIG. 8B. To identify non-trivial solutions, multiple characteristics are examined, including the spectral bandwidth, peak power, chirp, and number of prominent intensity peaks. As illustrated in FIG. 8B, the number of peaks in the converged waveform provides particularly good contrast between different solution types. A variety of stable non-trivial solutions are observed, including chirped pulses, dark pulses, switching-waves, and Turing patterns. In FIG. 8B, the Turing patterns, with more than eight intensity peaks, are indicated by Regions v and vi, and the dark pulses, switching waves, and chirped pulses, which can occur with a single peak, are indicated by Regions iii, iv, and i/ii, respectively. The different nonlinear solutions can also coexist. The chirped temporal solitons of interest exist over a broad range of detuning and drive values, including both signs of detuning. In some embodiments, the minimum (threshold) intracavity drive power for which chirped pulses are observed is 5 W. The dynamics and stability regions of all of the solutions change significantly when the spectral filter bandwidth changes. For example, for chirped pulses, the threshold drive power decreases with narrower filter bandwidths (see discussions below). Moreover, the chirped pulses are not observed at all with broadband or without spectral filtering (see discussions below).

Figure 9A:
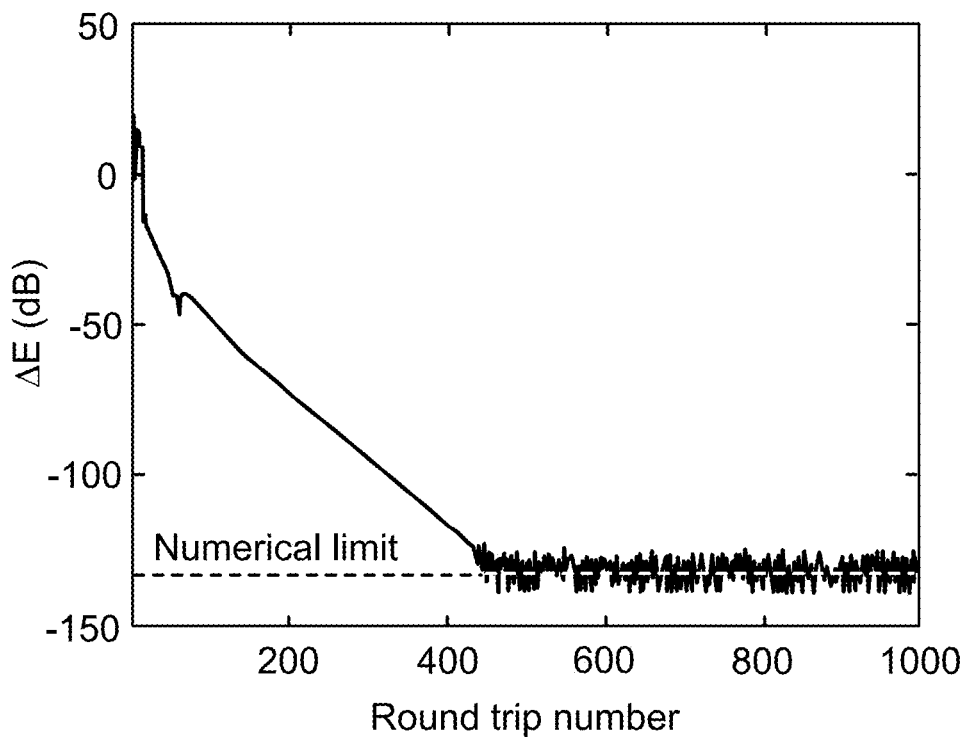
FIGS. 9A-9E illustrate characteristics of chirped temporal solitons in driven optical cavities according to some embodiments.
Figure 9B:
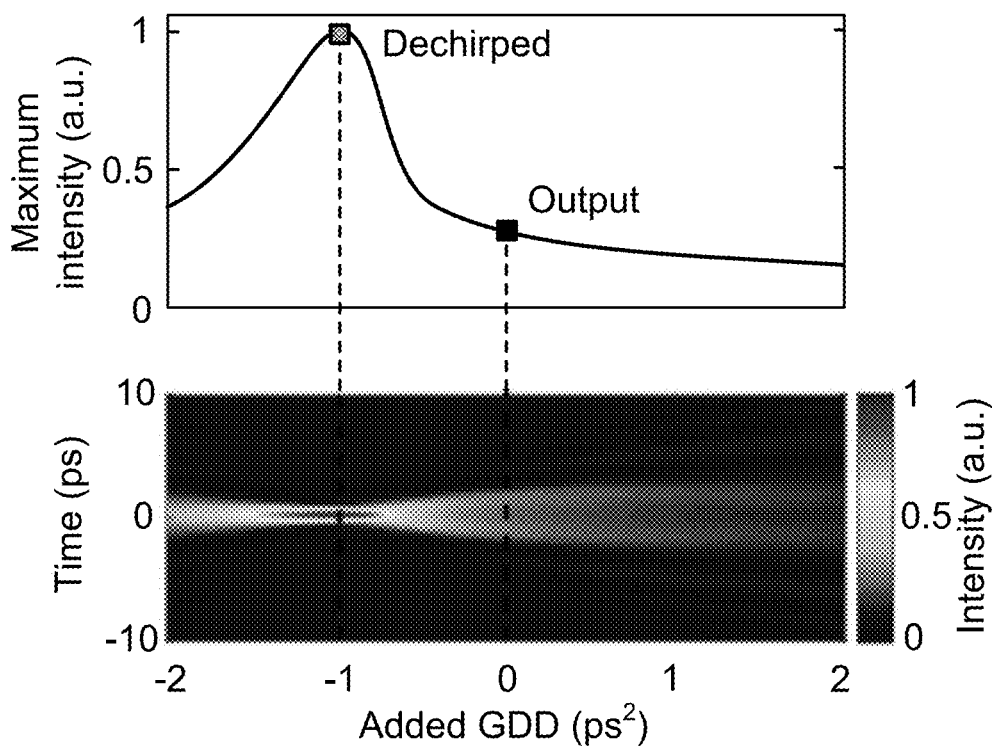
Figure 9C:
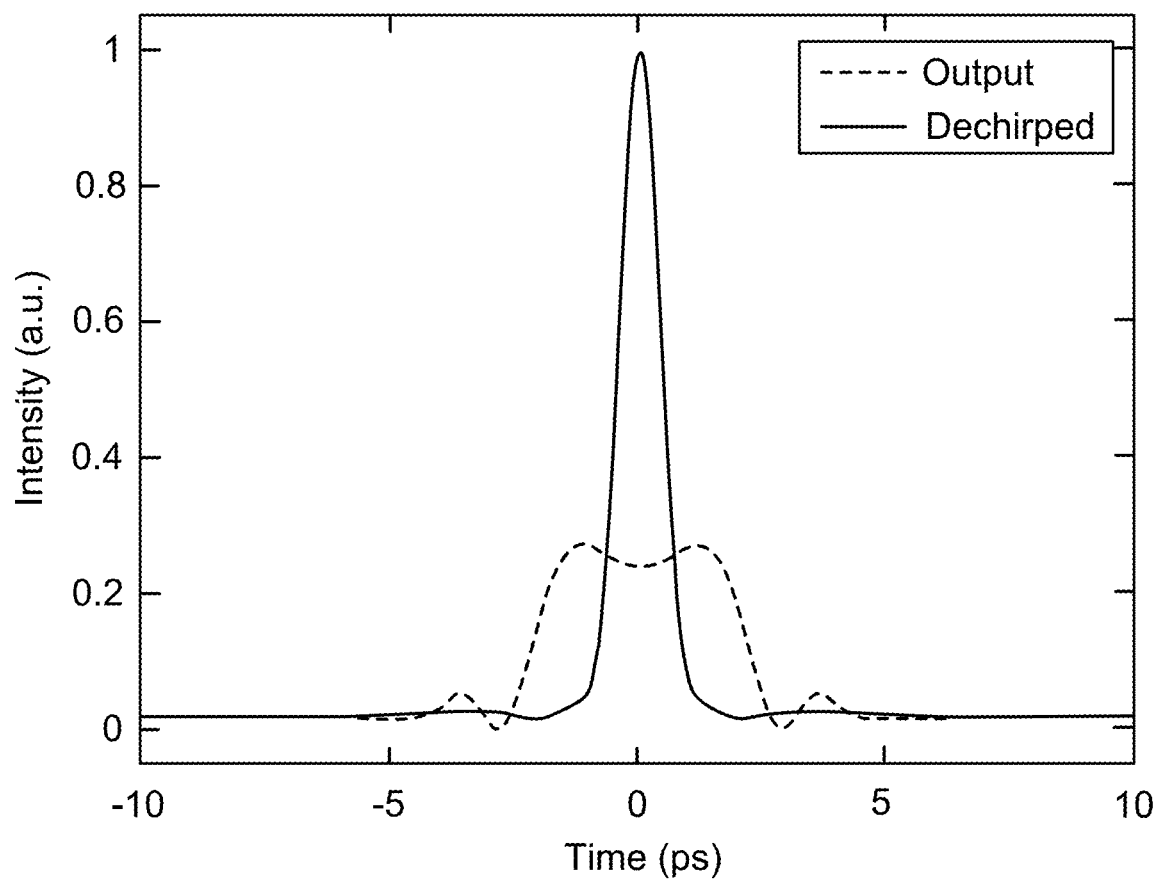
Figures 9D, 9E:
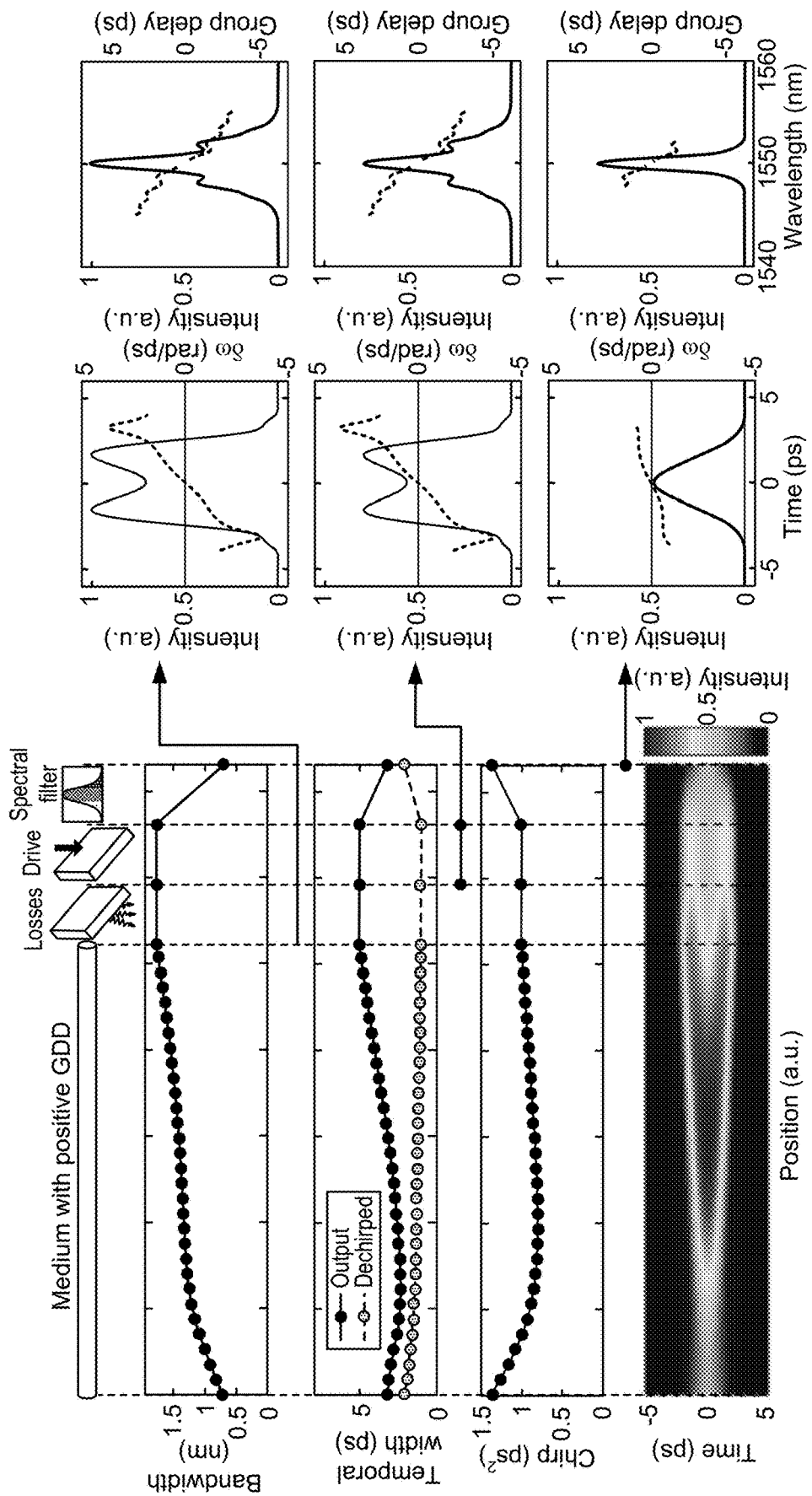

FIGS. 9A-9E illustrate characteristics of chirped temporal solitons in driven optical cavities according to some embodiments. FIG. 9A shows numerical convergence of the pulse energy difference between subsequent round trips, ΔE, to a stable numerically-limited steady-state value. FIG. 9B illustrates the change in the pulse and peak intensity as a function of group-delay dispersion applied after the cavity, indicating continuous compression with anomalous dispersion with a maximum at GDD=−1 ps². FIG. 9C shows the chirped cavity output (dashed line) and dechirped (solid line) pulses from FIG. 9B. FIG. 9D shows evolution of steady-state chirped temporal soliton bandwidth (full width at half the maximum, FWHM), temporal width (FWHM), chirp (defined by the GDD required to maximize the pulse intensity, with the opposite sign), and pulse intensity in the cavity. The FWHM of the pulse after dechirping the pulse at each position of the cavity is plotted in blue. The associated pulse intensity, instantaneous frequency, power spectrum, and group delay from the indicated locations in the cavity are plotted on the right. The positive slope of the instantaneous frequency, &n, and the negative slope of the spectral group delay correspond to the soliton chirp.

As illustrated in FIG. 9A, the chirped pulse solitons rapidly converge to a steady-state in the cavity. In this example, the picosecond pulses exhibit a positive chirp corresponding to 1 ps² of group-delay dispersion (FIG. 9B, and as discussed below). This corresponds to more than double the group-delay dispersion of the net normal dispersion fiber in the cavity, which indicates that the chirp is the result of nonlinear pulse formation. The dechirped pulse peak power may be enhanced by a factor of about 4 from its value directly out of the cavity (FIG. 9C). The pulses can be compressed to 0.9 ps, which is close to the transform-limited pulse duration of 0.82 ps and indicates that the chirp is nearly linear. The duration and chirp of chirped temporal solitons vary depending on the bandwidth of the spectral filter.

Figure 8E:
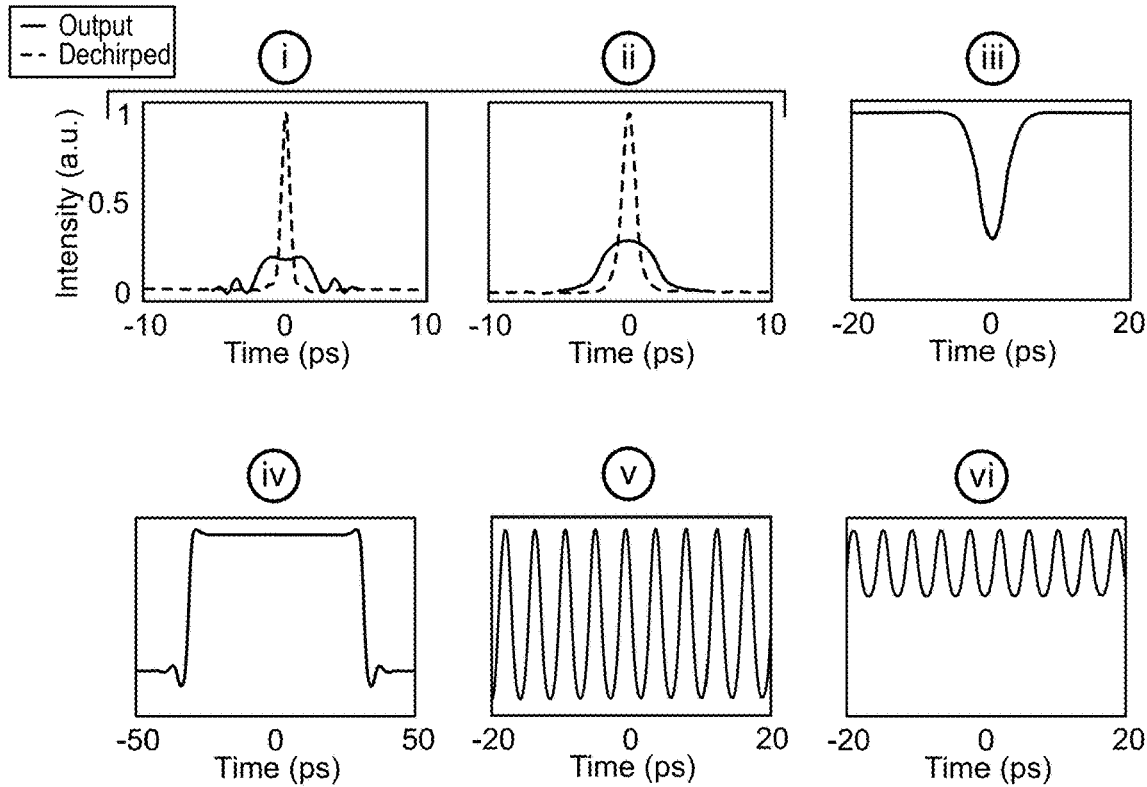

The spectral bandwidth, temporal duration, and chirp magnitude evolve nonlinearly in the cavity (FIG. 9D). In the normal dispersion waveguide, the spectrum experiences a net broadening due to Kerr self-phase modulation. The temporal width increases primarily owing to dispersive propagation in the normal dispersion waveguide. The spectral filter reduces the spectral bandwidth and the pulse duration is also reduced when the high and low frequencies in the leading and trailing edges of the pulse are attenuated. The pulse is highly chirped at every point in the cavity. This can also be seen from the positive slope of the instantaneous frequency in FIG. 8E. The dissipative drive and losses have a negligible effect on the pulse, spectrum, and chirp. Overall, the qualitative balance of physical effects is similar to that in chirped-pulse mode-locked lasers, in which pulse and spectral broadening are also counteracted by spectral filtering [42, 58]. However, it is noted that the continuous-wave background (absent in mode-locked lasers) has a time dependent phase relationship with the chirped pulse, which results in an oscillatory structure in the time domain that can complicate the interpretation of the evolution.

Simple scaling laws can be developed to identify the cavity parameters necessary to obtain chirped pulse solutions in driven cavity systems. This is achieved starting with the well-established mean-field model for the driven-cavity system, the Lugiato-Lefever equation (LLE). To account for additional spectral filtering a term that represents a distributed Gaussian spectral filter is added. The normalized equation can be defined by the following three unitless coefficients related to the drive power, spectral filter bandwidth, and drive detuning:

$$D_0 = D\frac{\gamma L}{\alpha^3}, \ f_0 = f\sqrt{L|\beta_2|}, \text{ and } \delta_0 = \frac{\delta}{\alpha}, \quad (1)$$

The spectral bandwidth, temporal duration, and chirp magnitude evolve nonlinearly in the cavity (FIG. 9D). In the normal dispersion waveguide, the spectrum experiences a net broadening due to Kerr self-phase modulation. The temporal width increases primarily owing to dispersive propagation in the normal dispersion waveguide. The spectral filter reduces the spectral bandwidth and the pulse duration is also reduced when the high and low frequencies in the leading and trailing edges of the pulse are attenuated. The pulse is highly chirped at every point in the cavity. This can also be seen from the positive slope of the instantaneous frequency in FIG. 8E. The dissipative drive and losses have a negligible effect on the pulse, spectrum, and chirp. Overall, the qualitative balance of physical effects is similar to that in chirped-pulse mode-locked lasers, in which pulse and spectral broadening are also counteracted by spectral filtering [42, 58]. However, it is noted that the continuous-wave background (absent in mode-locked lasers) has a time dependent phase relationship with the chirped pulse, which results in an oscillatory structure in the time domain that can complicate the interpretation of the evolution.

Simple scaling laws can be developed to identify the cavity parameters necessary to obtain chirped pulse solutions in driven cavity systems. This is achieved starting with the well-established mean-field model for the driven-cavity system, the Lugiato-Lefever equation (LLE). To account for additional spectral filtering a term that represents a distributed Gaussian spectral filter is added. The normalized equation can be defined by the following three unitless coefficients related to the drive power, spectral filter bandwidth, and drive detuning:

The chirped temporal solitons observed numerically require drive powers that are challenging to obtain experimentally (FIG. 8B). Numerically, at higher drive powers, chirped pulses are stable over a large range of detuning values, increasing the range of stability. This is the case, for example, in the all-normal dispersion cavity simulated in FIG. 8B, with 10-W of intra-cavity drive power. However, since one may be experimentally limited to 0.1 W of intra-cavity drive power, an advance is needed. Therefore, to experimentally observe chirped solitons the cavity is designed to have a reduced drive threshold and achieve higher drive powers with a pulsed drive source. Driving passive cavities with pulses is a recently established technique for achieving higher peak drive powers [21, 59, 60]. For this technique, the continuous-wave drive is modulated into a nanosecond pulse with the repetition rate of the cavity, and then amplified. This enhances the drive power by an amount that corresponds to the duty cycle of the drive pulse train (drive pulse duration divided by the cavity round trip time). For a fixed minimum drive pulse duration, this results in linear enhancement in drive power with cavity length. In addition, Eq. (1) reveals that the required drive power can be reduced linearly with an increase in the total cavity length. Considering both the reduced threshold and the increased drive, it is found that stable chirped pulses should be observable for cavity lengths longer than 150 m, which corresponds to a three-fold increase in drive power and a three-fold decrease in drive threshold (FIG. 8C). However, an increased cavity length would also increase the total dispersion, with a corresponding reduction in the bandwidth of the output pulse. To avoid this loss of bandwidth, the length of the cavity is increased without changing the total dispersion with a dispersion-map including two fibers with opposite signs of dispersion (dispersion management). A dispersion-managed approach allows for independent control of the drive threshold in driven fiber resonators.

A suitable dispersion-managed fiber cavity is numerically modeled to confirm that chirped temporal solitons are stable in an experimentally compatible system according to some embodiments. To more accurately represent experimental parameters, the exact super-Gaussian profile of the bandpass spectral filter and the third-order dispersion of the fibers are incorporated in the model. Simulations are run for a 150-m cavity with the same total dispersion as in the all-normal dispersion cavity from FIG. 8B. With only subtle differences from the all-normal dispersion system, the drive threshold scales as expected, and stable chirped temporal solitons are observed with experimentally accessible drive powers of ~3 W (FIG. 8D). The numerical results validate the dispersion-managed cavity approach and motivate experimental investigation.

Experiment

Figure 10A:
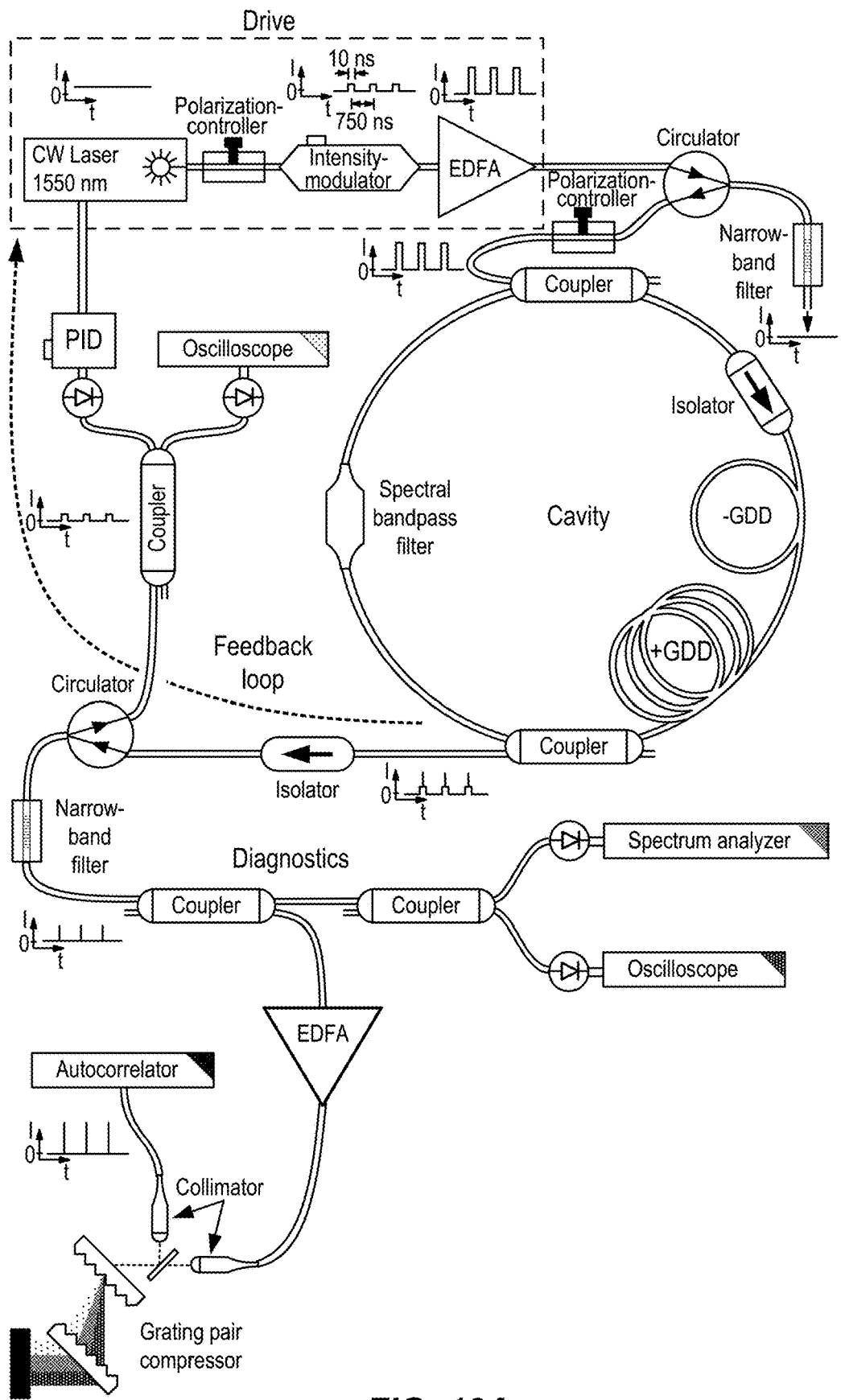
FIGS. 10A-10J show experimental schematic and observations of chirped temporal solitons according to some embodiments.
Figure 10B:
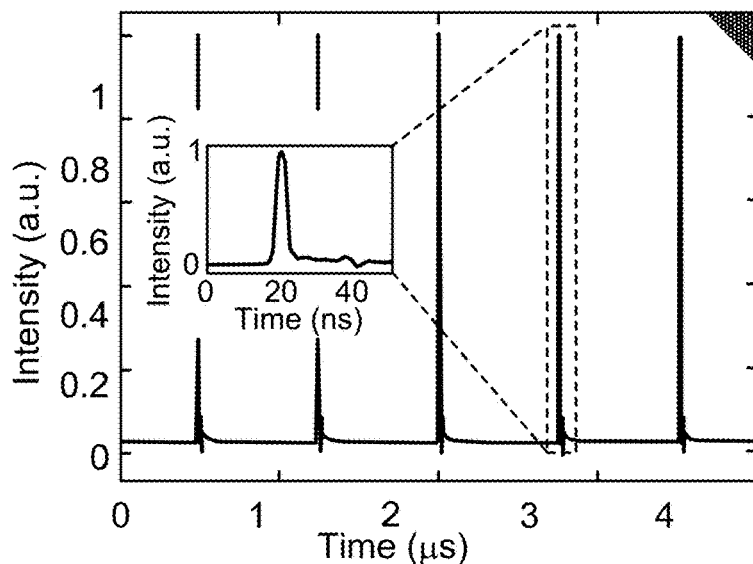
Figure 10C:
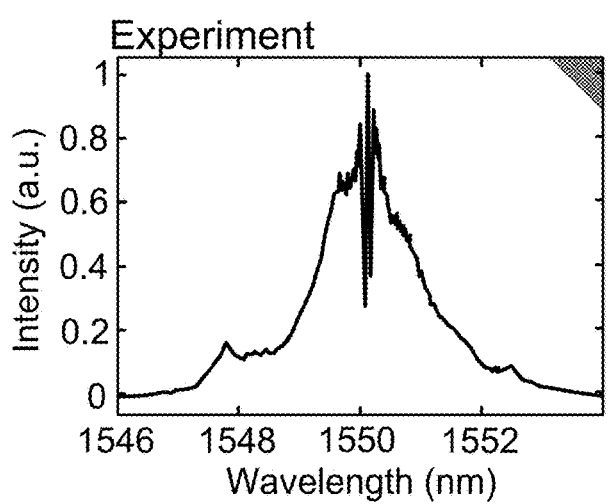
Figure 10G:
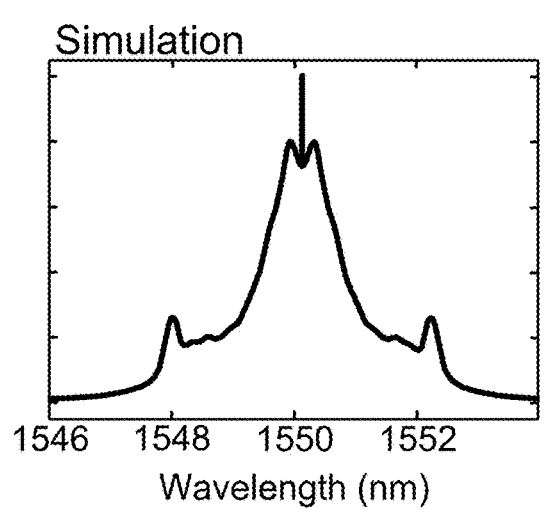
Figure 10D:
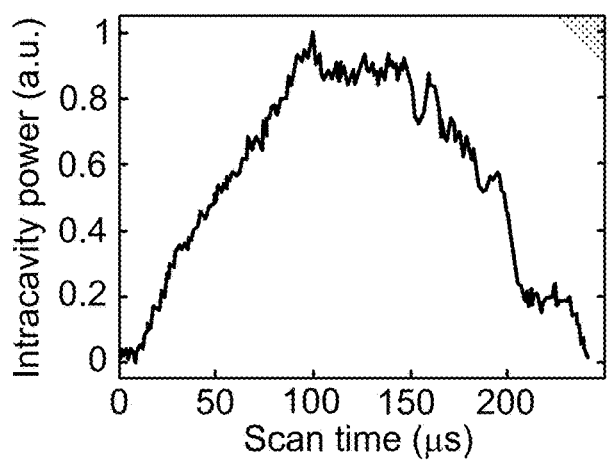
Figure 10H:
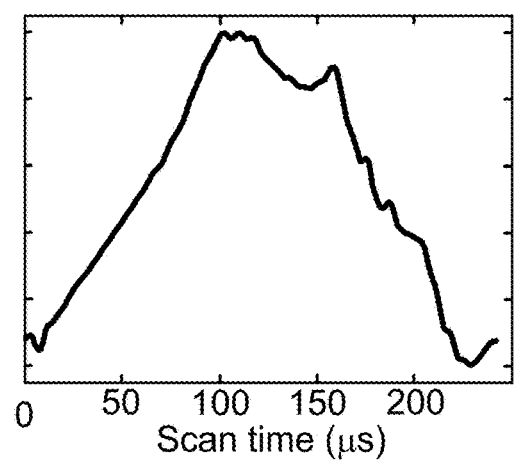
Figure 10E:
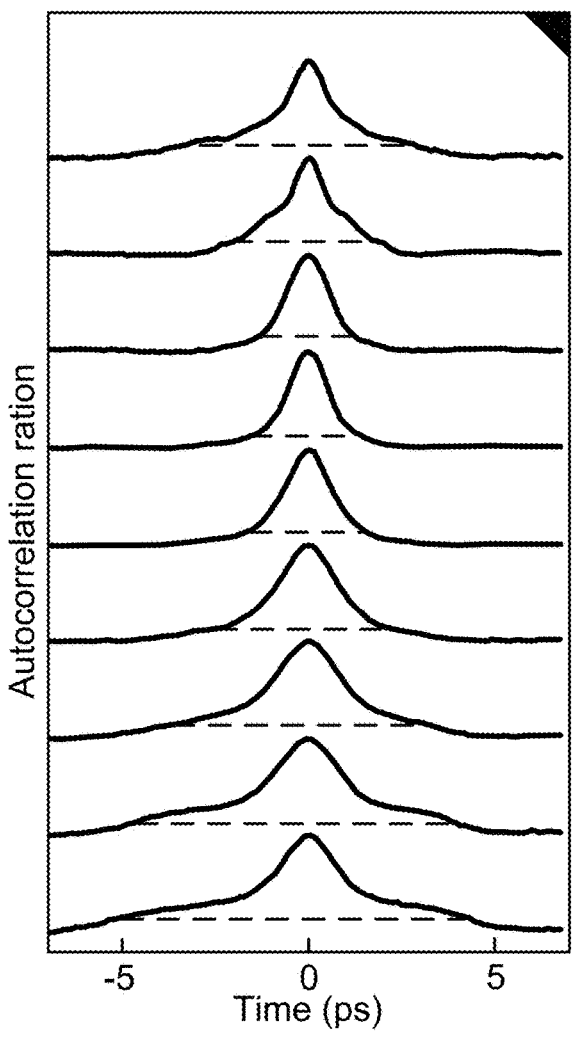
Figure 10I:
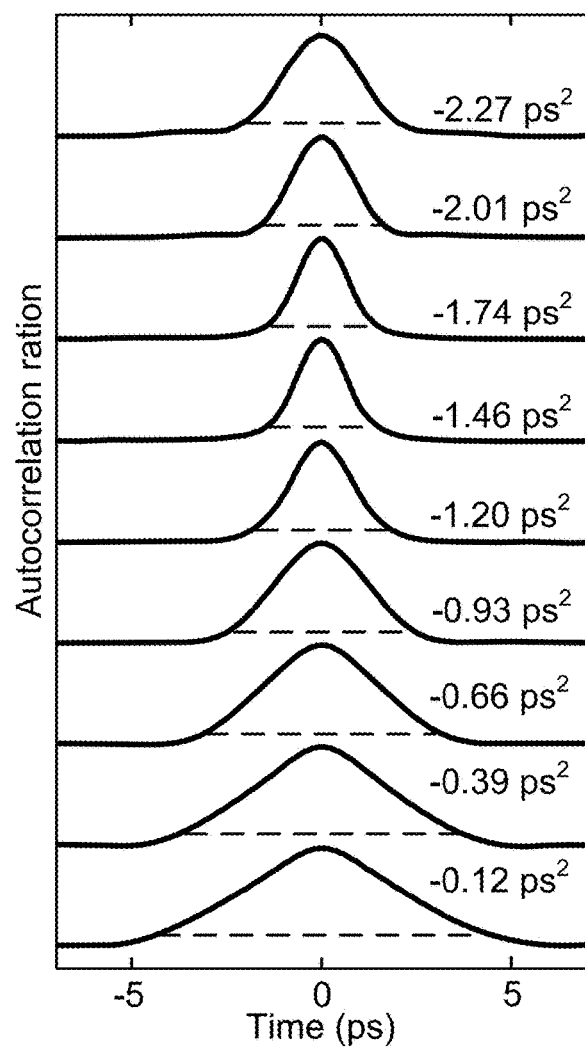
Figure 10F:
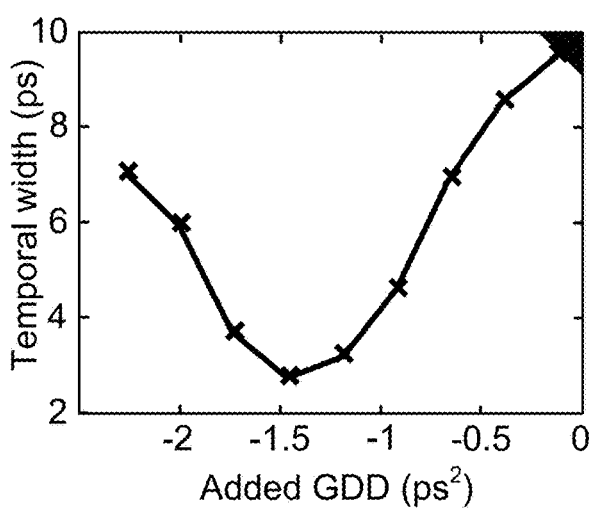

FIGS. 10A-10J show experimental schematic and observations of chirped temporal solitons according to some embodiments. FIG. 10A shows an experimental schematic depicting the modulated and amplified drive, the fiber cavity, the drive feedback loop, and diagnostics. The temporal waveform intensity is indicated throughout in green. FIG. 10B shows experimentally observed pulse train. FIG. 10C shows an exemplary spectrum. FIG. 10D illustrates a cavity resonance at 1.8-W average power. FIGS. 10E-10F show autocorrelation measurements according to some embodiments. The resonance sweep is measured after a narrow passband filter and the spectrum, pulse train, and autocorrelations are measured after a corresponding narrow notch filter. Autocorrelations are measured after amplification as a function of the GDD from a grating pair compressor with the temporal pulse-width (at 15% of the maximum) plotted in FIG. 10F. A triangle in the upper right corner of the experimental data indicates the location and type of equipment used to obtain it with a matching triangle in the schematic. Comparable results from numerical simulations are plotted for the spectrum in FIG. 10G, the resonance sweep in FIG. 10H, and autocorrelation measurements in FIGS. 10I and 10J.

Following the results of numerical simulations, a fiber resonator is designed to support chirped temporal solitons according to some embodiments (see FIG. 10A-10J, and as discussed below). The cavity comprises 150-m total length of single-mode fiber with large net-normal dispersion and a 4.25-nm fiber-format spectral filter. The drive is pulsed to enable access to high intra-cavity powers. The cavity resonance deviates significantly from a Lorentzian profile at average drive powers larger than 0.3 W, indicating the nonlinear nature of the resonance (FIG. 10D). The equivalent numerical resonance agrees well with the experiment (FIG. 10H), as discussed in more detail below. (See more discussions below.)

Figure 10J:
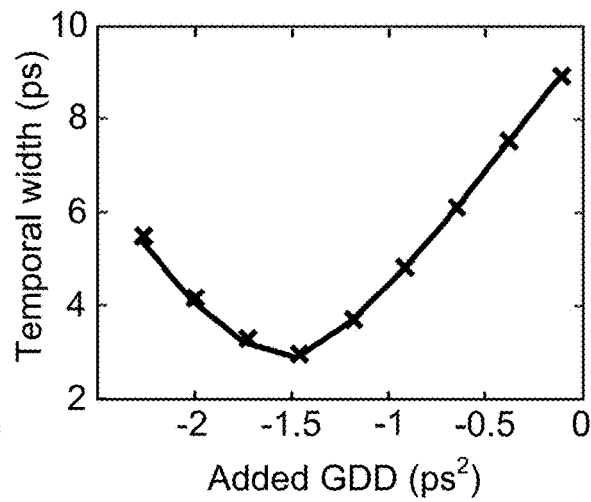

Stable and reproducible chirped-pulse solutions are observed with appropriate adjustment of the drive frequency, power, polarization, and pulse period. The output optical spectrum features a unique profile characteristic of the simulated chirped pulses from Region ii in FIG. 8D (FIG. 10C). The spectra quantitatively agree with theory including small sidebands 2-nm shifted from the center wavelength and an rms-bandwidth of 1.2 nm (FIG. 10G). Small variations of these values can also be observed. The spectrum is measured after a fiber Bragg filter, resulting in the modulation in the center of the spectrum. The pulse train, observed with an oscilloscope, includes pulses regularly spaced in time with the cavity round-trip period and energy fluctuations of less than 1% (FIG. 10B). To evaluate the output pulse chirp, the pulses are amplified and dechirped by a grating-pair compressor and measured with a collinear intensity autocorrelator. The autocorrelation width reduces to a minimum value before increasing again with further application of anomalous dispersion, which indicates positive chirp (FIGS. 10E and 10F). The minimum duration (1.08 ps FWHM) corresponds to a group-delay dispersion of 1.5 $ps^2$, which is three times the cavity group-delay dispersion and indicates that the chirp is the result of nonlinear pulse formation. Comparable autocorrelations of numerically simulated chirped temporal solitons agree well with the experimental observations (FIGS. 10I and 10J).

Broad bandwidth is important for frequency-comb as well as for ultrashort pulse applications. The chirped pulses observed here have bandwidth corresponding to picosecond pulse durations. The soliton bandwidth can be increased by decreasing the total dispersion and by applying a correspondingly larger bandwidth spectral filter (see more discussions below). The scaling laws predict that the soliton bandwidth increases in proportion to the inverse of the square root of the cavity group delay dispersion if the spectral filter bandwidth is increased with the same proportion. In other words, ten times broader soliton bandwidth should be possible with a cavity group delay dispersion that is one hundred times smaller and a spectral filter with ten times broader bandwidth than the present configuration.

For a given bandwidth, the energy of the pulse determines important parameters for applications, including the pulse peak power, the frequency comb power-per-comb line, and the conversion efficiency. Since chirped solitons in mode-locked lasers have higher energies than solitons in anomalous dispersion laser cavities, it will be important to determine if a similar benefit can be achieved for passive cavities. In passive cavities the pulse energy is challenging to measure accurately because it is difficult to accurately determine the total number of pulses and residual continuous-wave background complicates the interpretation of average power measurements. These challenges can potentially be addressed through seeding the cavity with an external source and with background management techniques; this is the subject of on-going research. In addition, numerical simulations can provide important information about the pulse energy, including the potential enhancements compared to traditional solitons and opportunities for further increases (see more discussions below). For example, the energy of the simulated chirped solitons corresponding to experimental observations is 25 pJ. In a controlled numerical comparison between traditional solitons in anomalous dispersion cavities and chirped solitons in normal dispersion cavities it is found that chirped pulses can have at least seven times more energy (see more discussions below, and FIG. 12). By driving normal dispersion resonators with higher powers, the energy of stable chirped temporal solitons can be increased by at least two times more. Alternatively, optimizing for peak power instead of energy, it is found that chirped-temporal solitons can support at least an order of magnitude higher peak powers than traditional solitons given an equivalent magnitude of group-delay dispersion. The simulated results are encouraging, highlight the promise of chirped temporal solitons for applications, and motivate further research.

In passive resonators, the resonance frequencies are sensitive to environmental perturbations including vibrations and temperature. Moreover, the drive laser frequency may be locked with respect to these resonances. Therefore, the stability of frequency-comb generation is proportional to the strength of environmental perturbations and the quality of the frequency locking mechanism. The resonator investigated in this study features minimal temperature and vibration control, a limited laser frequency tuning range, a free-running drive repetition rate, and a single-stage side-lock PID feedback loop. Stable frequency-comb generation in this nonideal configuration lasts for several minutes. However, with several improvements, including temperature and vibration control, an additional feedback loop to control for large frequency changes by thermally tuning the laser, locking the drive repetition rate to the cavity, and peak-locking techniques, stable frequency combs should be generated over significantly longer periods, with minimal variation.

Chirped temporal solitons represent a new class of stable nonlinear waveforms in driven resonator systems. The present study focuses specifically on fiber resonators, but the results are general and can be applied to any passive resonator platform using the scaling laws given by Eq. 1. Passive resonators enable femtosecond pulse generation at wavelengths not accessible by traditional mode-locked lasers and may complement these systems. The chirped temporal soliton extends ultrashort pulse generation to normal dispersion systems, enables new performance regimes, and represents a valuable new solution for frequency comb and ultrashort pulse generation and associated applications.

Methods

Numerical Simulations

According to some embodiments, numerical simulations are developed to determine if a cavity including normal dispersion fiber, losses, a drive source, and a spectral filter can support chirped temporal solitons. The fiber is modeled by a detuned nonlinear Schrödinger equation incorporating dispersive and nonlinear phase modulations in addition to a term corresponding to the frequency detuning of the drive from the peak of the cavity resonance [63]. The fiber section is simulated with the standard split-step Fourier technique with the dispersive effects calculated in the Fourier domain and the nonlinear effects solved with a $4^{th}$ order Runge-Kutta method. After the fiber section, the loss, drive, and spectral filter are added as lumped elements. The initial cavity under consideration includes 52.5 m of fiber with $$n_2 = 3.2 \times 10^{-20} \frac{m^2}{W}, \beta_2 = 9688 \frac{fs^2}{m},$$

and mode-field diameter of d=8.1 µm, total losses of 1.05 dB (as predicted for a typical experimental cavity), and a Gaussian spectral filter with 4-nm spectral bandwidth.

Solutions are identified as stable if the field converges to a steady-state after a finite number of iterations around the cavity. For example, the chirped pulse solutions from FIGS. 9A-9E are stable, and the mean intensity of the electric field converges to a constant numerically limited value after 500 round-trips, which corresponds to 125 µs for the 50-m cavity with a 4-MHz repetition rate (FIG. 9A). The cavity is seeded by Gaussian or random electric field initial conditions and multiple round trips are simulated. The combination of 9 noisy and 6 Gaussian initial fields results in a sufficient number of stable solutions to establish clear boundaries between different solution types.

The chirp is evaluated through the application of anomalous GDD to the pulse, in keeping with the experimental practice of 'dechirping' the pulse with a grating pair dispersive compressor. The chirp magnitude in units of $ps^2$ is determined by the GDD required to maximize the pulse peak intensity (FIG. 9B). In the example from FIG. 9B, with a cavity with a 2-nm spectral filter (drive 11.4 W and detuning 1.36 rad), the intensity is smoothly maximized and indicates a positive chirp that corresponds to a GDD of 1 $ps^2$.

For the dispersion-managed simulations the normal dispersion fiber is modeled as above, the anomalous dispersion fiber is modeled with $$n_2 = 3.2 \times 10^{-20} \frac{m^2}{W}, \beta_2 = -22946 \frac{fs^2}{m},$$

and mode-field diameter of d=10.4 µm, and the third-order dispersion for both fibers is given by $$\beta_3 = 0.1 \times 10^6 \frac{fs^3}{m}.$$

The spectral filter has a $12^{th}$ order super-Gaussian response with a full-width at half-maximum bandwidth of 4.25 nm.

To numerically model the resonance as a function of frequency for comparison with experiments a noise-seeded simulation is used, in which the detuning is varied after each round trip at a rate determined by the experimental sweep time. The continuous-wave intensity is averaged over 10 different random-intensity initial fields and plotted at each value of detuning (FIG. 10H).

Experimental Setup and Parameters

According to some embodiments, experimentally, following the results of numerical simulations, a fiber resonator is designed to support chirped temporal solitons. The cavity includes a total length of 150-m single-mode fiber with a net-dispersion that corresponds to 52.5-m of normal dispersion fiber (with $$\beta_2 = 9688 \frac{fs^2}{m}).$$

An isolator ensures unidirectional operation and suppresses Brillouin scattering. The drive is coupled into the cavity with a 5% fiber-format coupler, and the output is coupled out from a distinct 2% fiber coupler. A 4.25-nm $12^{th}$ order super-Gaussian fiber-format spectral filter is spliced into the cavity after the output coupler. The drive includes an intensity-modulated narrow-line fiber laser. The intensity-modulator is driven with 10-ns pulses with a 750-ns period matching that of the fiber cavity. The modulated drive is amplified, and residual amplified spontaneous emission is filtered out with a 20-GHz fiber-Bragg notch filter. 2 W of average power is available before the input fiber coupler. Polarization controllers are used to control the polarization state separately before the intensity modulator and before the fiber cavity. The drive frequency is locked to the cavity resonance with a PID control circuit using the output continuous-wave power as an error signal. The PID circuit enables control of the frequency offset, or detuning, from the cavity resonance. To measure the cavity resonance, the continuous-wave output power is measured as the laser frequency is swept through the cavity resonance. The laser frequency is periodically swept through the cavity resonance by a piezo-based tuning mechanism driven with a triangle-wave voltage source.

Dependence on the Filter Bandwidth

The filter bandwidth may be chosen appropriately to stabilize chirped pulses in the cavity. To evaluate the dependence of the regions of existence on the spectral filter bandwidth, numerical simulations are performed with the same parameters as the all-normal dispersion cavity (52.5 m length, Gaussian filter), but with varying filter bandwidths. Changes to the stable chirped pulses over a range of drive and detuning values can be identified with the dechirping factor.

Figure 11:
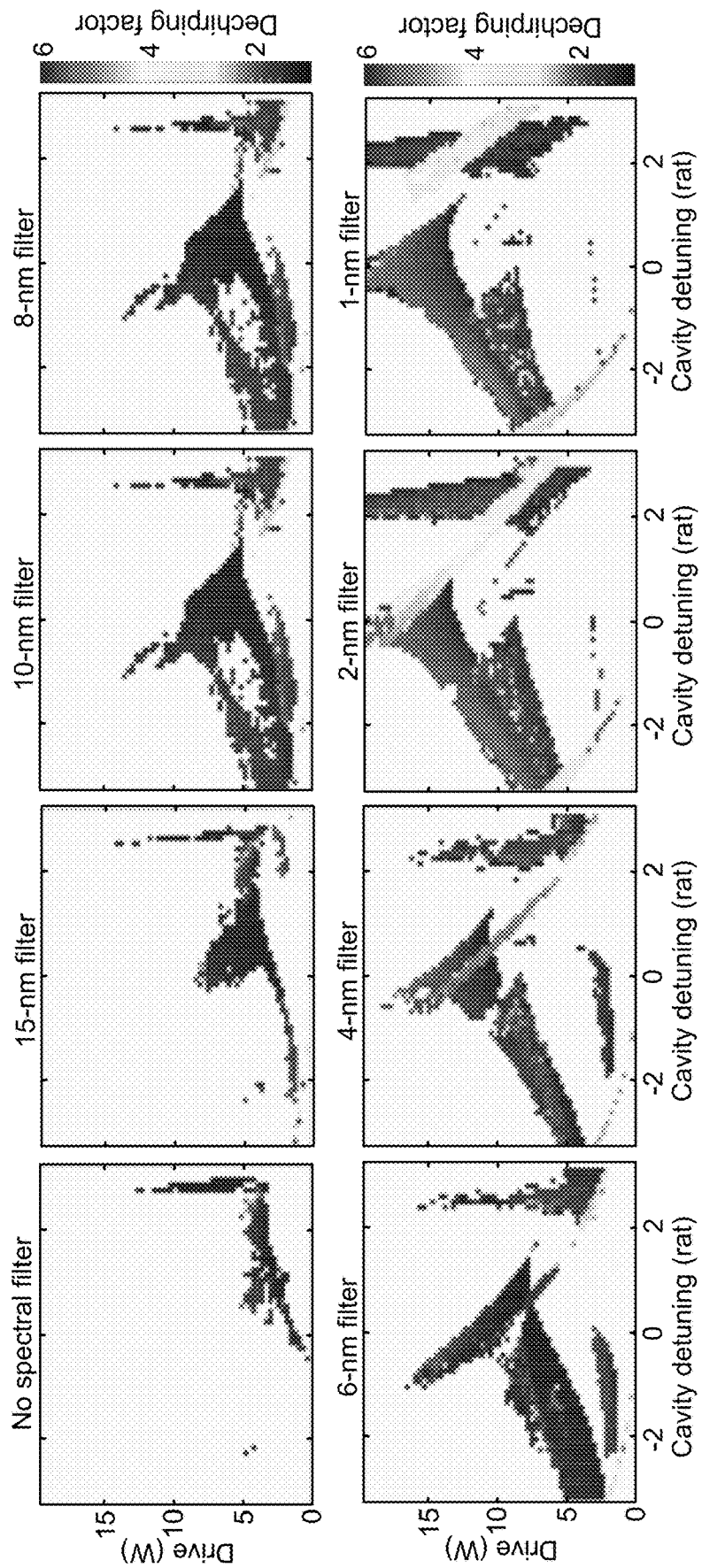
FIG. 11 illustrates chirped temporal soliton existence vs. spectral filter bandwidth according to some embodiments.
Figure 12A:
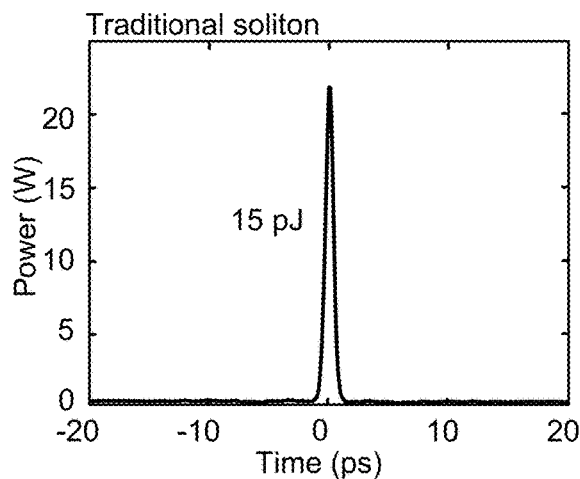
FIG. 12 illustrates chirped temporal soliton energy and peak power in comparison to traditional solitons according to some embodiments.
Figure 12B:
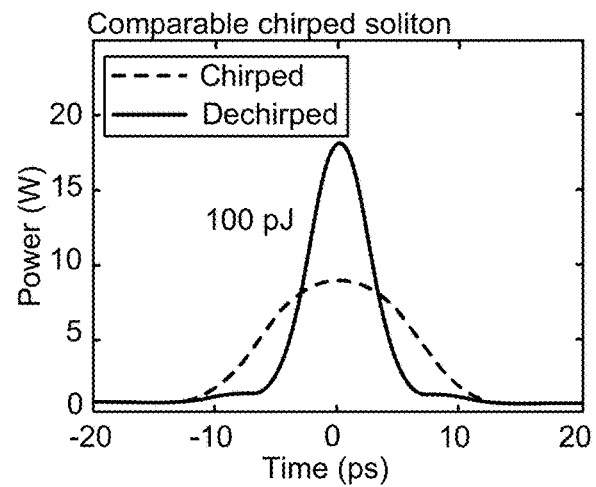
Figure 12C:
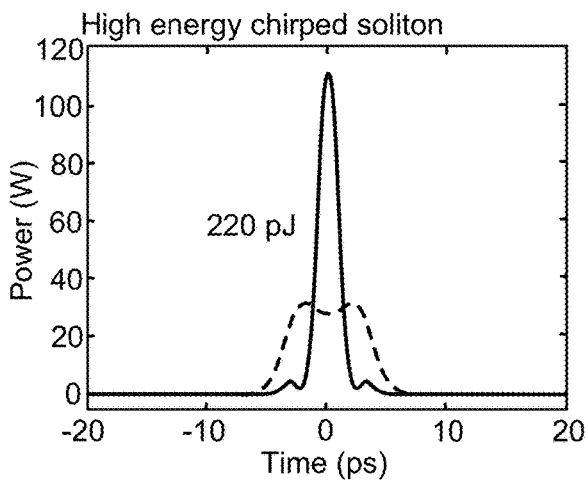
Figure 12D:
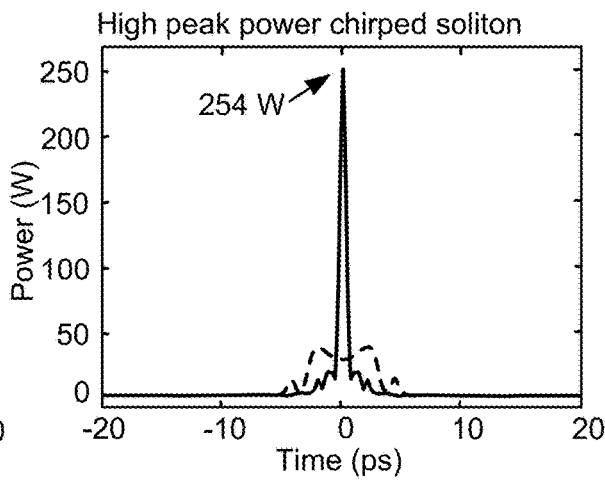
Figure 13A:
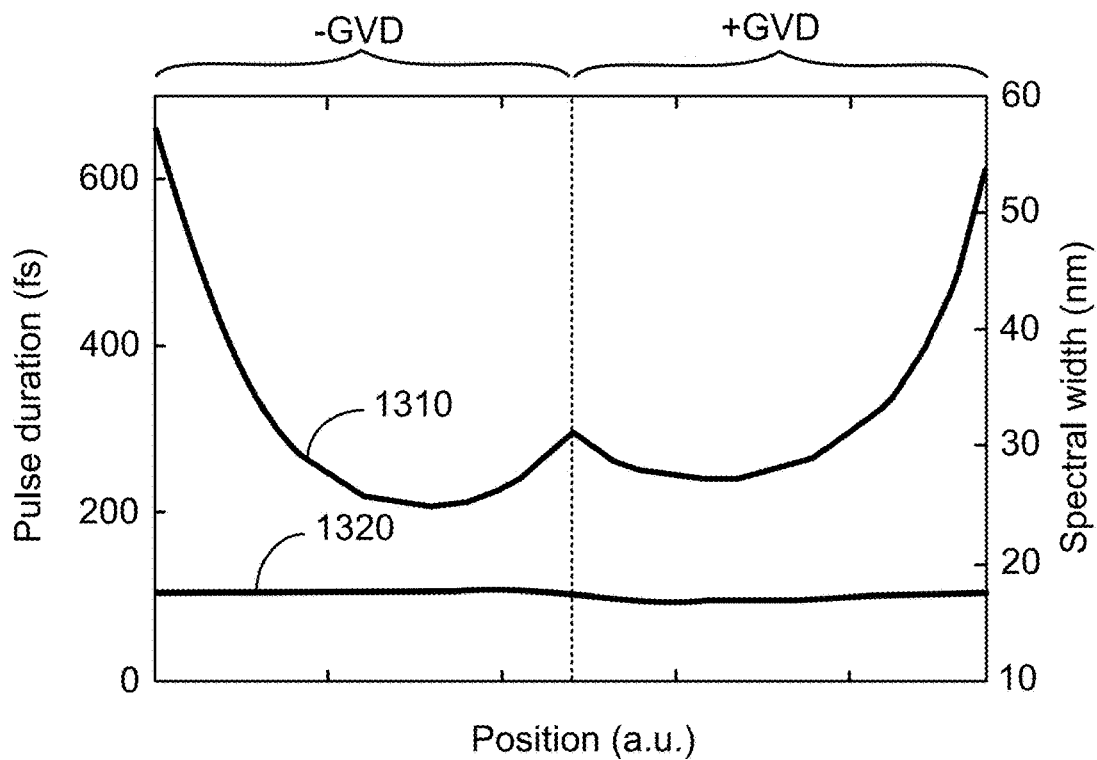
FIG. 13 illustrates numerical simulations of stretched-pulse solitons according to some embodiments.
Figure 13B:
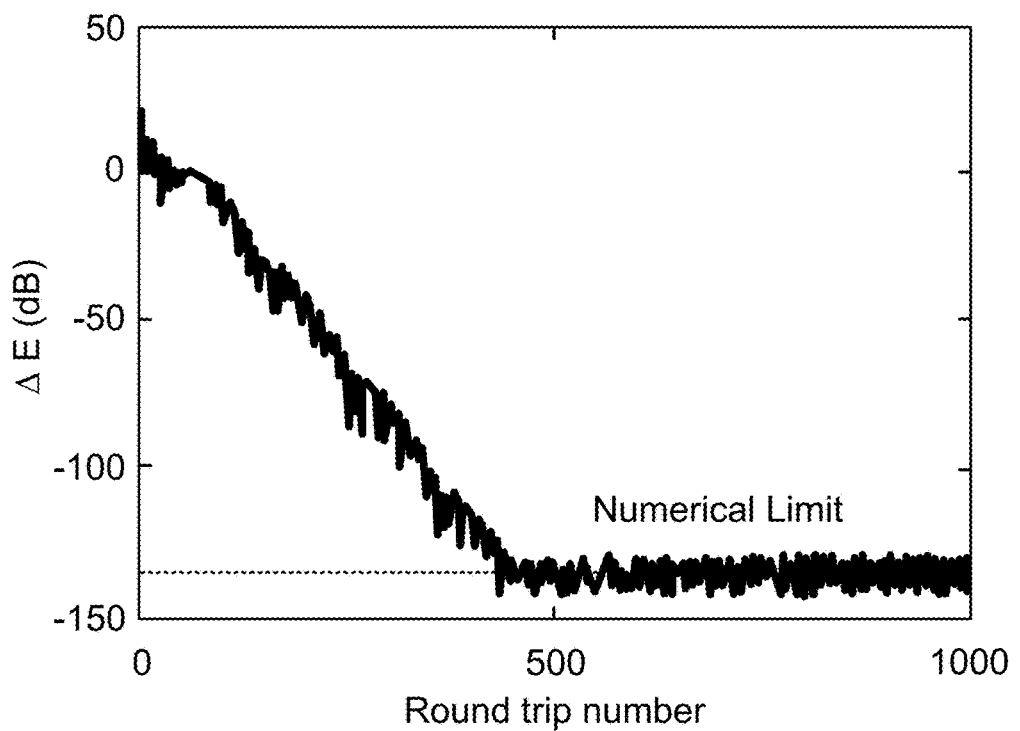
Figure 13C:
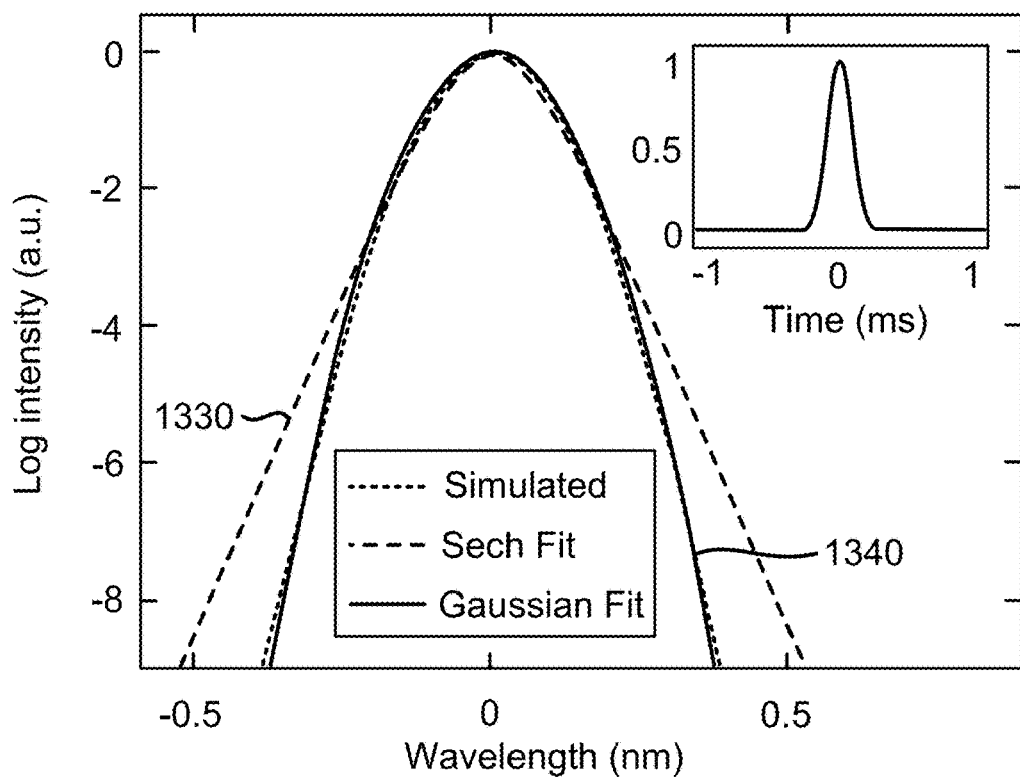
Figure 13D:
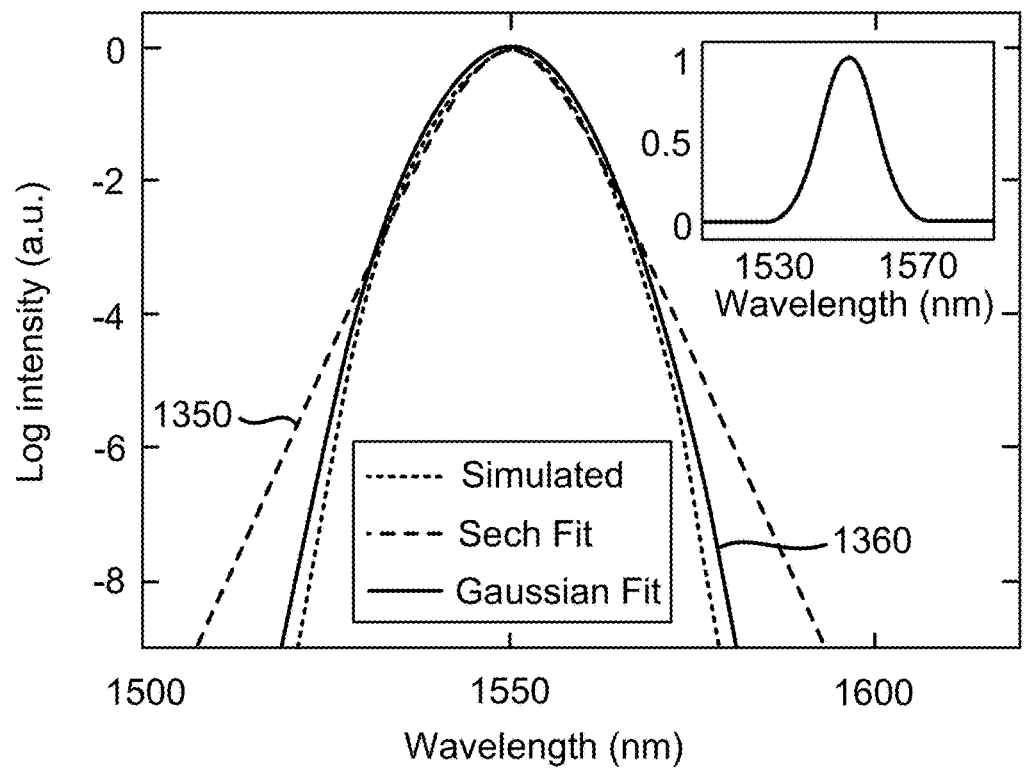

FIG. 11 illustrates chirped temporal soliton existence vs. spectral filter bandwidth according to some embodiments. The dechirping factor for converged solutions vs. drive power and detuning for different bandwidths, $\Delta\lambda$ (full width at half the maximum), of a Gaussian spectral filter for a cavity length of 52.5 m. Stable chirped pulses appear for filter bandwidths less than 8 nm. Higher compression factors may be observed with broader filter bandwidths.

Chirped pulses may not be observed without a spectral filter in the cavity. Chirped pulses begin to appear for Gaussian filters with full-width at half maximum bandwidths of 8 nm or narrower. Full width at half maximum bandwidths between 6 and 4 nm enable chirped pulses with high dechirping factors over a broad range of detuning values. This range therefore defines the optimum filter bandwidths for this cavity. The threshold for chirped pulses is approximately 5 W with a 6-nm filter bandwidth. With smaller drive powers, switching waves are observed instead. The threshold decreases with narrower spectral filter bandwidths. For example, the threshold is 2.5 W with a 2-nm filter, where the switching waves obtained with the broader filter become chirped pulses. Narrower filter bandwidths reduce the threshold further but with a corresponding decrease in the bandwidth and the chirped-pulse compression ratio. From Eq. 1, the stability regions obtained for a given filter (e.g. 6 nm) can be recovered with a different filter bandwidth (e.g. 8 nm) by making a corresponding change in the total group delay dispersion (e.g. with (%)$^2$ times less dispersion).

Comparison of Chirped Solitons to Solitons in Anomalous-Dispersion Cavities

FIG. 12 illustrates chirped temporal soliton energy and peak power in comparison to traditional solitons according to some embodiments. Inset (a) illustrates stable soliton solution from numerical simulations of an all-anomalous dispersion cavity without a filter. Inset (b) illustrates stable soliton solution from numerical simulations of an all-normal dispersion cavity with a 1-nm filter. The chirped-pulse soliton has around seven times higher pulse energy than the traditional soliton with the same drive power and magnitude of dispersion. Inset (c) illustrates that, at higher drive powers, chirped temporal solitons can support another two times higher energy than the traditional soliton. Inset (d) illustrates that high peak powers can be achieved after dechirping chirped temporal solitons obtained with a spectral filter with a larger 6-nm bandwidth.

In mode-locked lasers, chirped solitons stabilize high pulse energies. In general, when the pulse is chirped, its peak power remains low, which reduces the destabilizing effects of nonlinearity. In normal dispersion resonators, chirped pulse mode-locked lasers have enabled pulse energies that are as much as two orders of magnitude larger than what can be achieved with traditional solitons [43-45]. Numerical simulations can help determine the relative energy of chirped-pulse solitons in passive resonators. One may begin with the chirped-soliton resonator parameters for a 52.5-m normal dispersion fiber and a 4-nm bandwidth spectral filter. To examine comparable traditional solitons, one may change the sign of the dispersion and remove the spectral filter. Stable solitons may be found over a well-defined region of drive powers and detuning values. As the drive power increases, the continuous-wave-background, and consequently the solitons, begin to destabilize. One may select the soliton that is noise-free and stable with the largest drive power as the high-performance representative for traditional solitons. The energy of the resultant pulse corresponds to 15 pJ inside the resonator with a drive power of 0.3 W and a detuning of −1.34 radians (see inset (a) of FIG. 12). In the normal dispersion cavity, chirped pulses exist over a wide range of drive powers and detuning values. However, the chirped pulses have a drive power threshold below which chirped pulses are not stable. For the 4-nm filter, chirped pulses are not stable at the 0.3-W drive power of the noise-free, stable traditional soliton. However, with a narrower 1-nm spectral filter, it is possible to stabilize chirped pulses with only 0.3-W of drive power. The resultant chirped pulses have pulse energies of 100 pJ, or about seven times more energy than the solitons (see inset (b) of FIG. 12). This result suggests that chirped pulses also carry a significant energy benefit in Kerr resonator systems.

In the previous result, the chirped-pulse drive power was constrained for direct comparison between the two types of solitons. However, higher energies may be possible for the chirped-pulses with higher drive powers. To investigate, simulations are run for all possible drive detuning values as well as for much larger drive powers. Stable solutions are found for powers as much as fifty times higher than for the comparable anomalous dispersion cavity. The chirped-pulse energy is found to increase with increasing drive. The bandwidth also increases with the drive power. Clean, noise-free pulses with energies of at least 220 pJ are observed in this cavity (see inset (c) of FIG. 12). This corresponds to more than ten times the energy of traditional solitons. However, the bandwidth of this chirped pulse is narrower than that of the soliton. By increasing the spectral filter, the bandwidth can be increase. For example, with a 6-nm spectral filter, stable chirped pulses can be observed with a peak power enhancement that is greater than ten compared to traditional solitons (see inset (d) of FIG. 12). Numerical simulations therefore strongly suggest that much higher pulse energies and peak powers are achievable with chirped solitons than with the traditional solitons. Higher energy pulses for frequency combs corresponds to a higher power per comb line, which is an important performance parameter.

Example IV—Stretched-Pulse Soliton Kerr Resonators

Kerr resonators support novel nonlinear wave phenomena including technologically important optical solitons. Fiber Kerr resonator solitons enable wavelength and repetition-rate versatile femtosecond-pulse and frequency-comb generation. However, key performance parameters, such as pulse duration, lag behind those from traditional mode-locked laser-based sources. Embodiments described in this disclosure provide new pulse generation in dispersion-managed Kerr resonators based on stretched-pulse solitons, which support the shortest pulses to date from a fiber Kerr resonator. In contrast to established Kerr resonator solitons, stretched-pulse solitons feature Gaussian temporal profiles that stretch and compress each round trip. Experimental results are in excellent agreement with numerical simulations. The dependence on dispersion and drive power are detailed theoretically and experimentally and design guidelines are presented for optimizing performance. Kerr resonator stretched-pulse solitons represent a new stable nonlinear waveform and a promising technique for femtosecond pulse generation.

Kerr resonators may be one of the simplest systems supporting complex nonlinear optical phenomena. They have attracted considerable attention recently for their practical value in generating ultrashort optical pulses and frequency combs. Frequency combs are desirable for several applications, including spectroscopy, frequency synthesis, distance ranging, attosecond pulse generation, as well as astronomical spectrograph calibration [62-70]. Kerr resonators can be made very compact, including on chip [71, 72] for frequency-comb generation with a small form factor, simple processing, low drive powers, as well as gigahertz to terahertz line spacing [73, 74]. At the macro-scale, in bulk Kerr enhancement cavities, reduced nonlinear material enables new performance for pulse compression at much higher energy levels [75]. The earliest demonstrations of Kerr resonator pulse generation was in fiber-based cavities, with sizes in between the micro and bulk regimes [76]. Initial demonstrations in fiber were motivated by all-optical buffering [76, 77], and more recent research illustrates fascinating long-range interactions [78], spatiotemporal instabilities [79], and a new platform for temporal tweezing [80]. In comparison with other Kerr resonator platforms, fiber offers excellent thermal management, strict single-mode operation, very low waveguide loss, and commercially available high-quality optical components.

Kerr resonators are driven by a continuous-wave laser and generate a broad bandwidth of cavity modes through parametric frequency conversion. To establish temporal coherence and a regular phase relationship between the cavity modes, the Kerr resonator may be mode locked. As with laser systems with an active gain medium, Kerr resonators are mode-locked through the formation of optical solitons in the cavity [81, 82]. The most common soliton-mode-locking in Kerr resonators is related to that in laser systems: the pulse is formed through a balance between the effects of anomalous group-velocity dispersion (GVD) and the Kerr nonlinear phase, with a subtle difference in the pulse parameters [83, 84]. However, while related, the difference between a broadband laser gain and the single-frequency drive in Kerr resonators is highly nontrivial and important questions are unanswered. For example, could the advanced soliton techniques used for mode-locking lasers be applicable to Kerr resonators as well? While Kerr resonators can support wavelength and repetition-rate versatile pulses, the duration of these pulses is much longer than that from mode-locked lasers. This limitation may be avoided if the novel mode-locking techniques from lasers could be applied to Kerr resonators.

Stretched-pulse mode-locking enables shorter femtosecond pulses to be generated from dispersion-managed lasers than from soliton mode-locking in all-anomalous dispersion lasers [85-87]. The pulses stretch and compress while traversing the cavity, reaching a Fourier-transform-limited duration twice per round trip. The pulses in these systems also feature a Gaussian profile, in contrast to the hyperbolic secant shape observed in anomalous dispersion systems. Stretched-pulse mode-locking is now a common technique for mode-locking laser systems because it enables the shortest pulses from these systems, with durations now reaching a few optical cycles [85]. For Kerr resonators, while some progress has been made, stretched-pulse mode-locking has not been demonstrated to date. Stretched-pulse solitons have been analyzed theoretically [88] and dispersion-managed Kerr resonators have been investigated experimentally with a focus on mechanisms for temporal binding [89] and the emission of resonant radiation [90], but only a single spectral measurement corresponding to longer pulses is observed.

This disclosure reports on the observation and analysis of stretched-pulse solitons in Kerr resonators. In strongly driven dispersion-managed fiber resonators with small and anomalous total dispersion, stable stretched-pulse solitons are generated. The pulses feature a broad spectral bandwidth and a compressed pulse duration of 210 fs, which is the shortest pulse duration observed to date from a fiber Kerr resonator. Numerical simulations, in agreement with experiments, reveal that the pulses stretch and compress twice per round trip in the cavity, with an overall stretching ratio that is larger than three. The pulse and spectral intensity are well fit to Gaussian profiles as they are in stretched-pulse mode-locked fiber lasers. The transform-limited pulse duration is strongly dependent on the total cavity dispersion and drive power. Improved performance is anticipated with larger drive powers and by compensating for the residual higher order dispersion. Stretched-pulse mode-locking is a promising new technique for generating femtosecond pulses from fiber Kerr resonators, and may be applicable to other important platforms, including micro-resonators and bulk enhancement cavities.

FIG. 13 illustrates numerical simulations of stretched-pulse solitons according to some embodiments. Inset (a) shows steady-state evolution of the pulse duration (1310) and spectral bandwidth (1320) in the −GVD and +GVD segments of one cavity round trip. Inset (b) shows pulse convergence represented by the energy difference between pulses of successive round trips. Inset (c) shows the log-scale simulated temporal intensity of the pulse when it is shortest with Gaussian (1340) and hyperbolic secant (1330)

fits. The linear-scale pulse is shown in the inset of inset (c). Inset (d) shows the corresponding log-scale simulated spectral intensity and Gaussian (1360) and hyperbolic secant (1350) fits. The linear-scale spectrum is shown in the inset of inset (d).

According to some embodiments, Stretched-pulse soliton generation may be investigated theoretically using finite-difference time-domain numerical simulations. The cavity includes one segment of anomalous (−) GVD fiber, one segment of normal (+) GVD fiber, an external drive, and additional fiber component losses (see inset (a) of FIG. 13). The fiber sections are modeled with a Ginzburg Landau equation with parameters corresponding to commercially available fibers. The external drive and coupler losses are implemented as discrete elements one time per round trip (see descriptions below). The choice of fiber lengths is instructed by related stretched-pulse laser cavities and modified until the desired operation is obtained. Stable representative stretched-pulse solitons are obtained in a cavity featuring a total dispersion that is slightly anomalous. The pulse energy converges to a steady-state value in fewer than 500 round trips (see inset (b) of FIG. 13). Both the spectral and temporal intensity profiles are well fit to a Gaussian profile, in contrast to the hyperbolic secant profiles characteristic of Kerr resonator solitons (see inset (c) and (d) of FIG. 13). The spectral bandwidth is 18-nm broad and changes minimally within the cavity. The pulse duration stretches and compresses twice per round trip in the cavity, with a maximum chirped pulse duration of 660 fs and a minimum dechirped duration of 210 fs (see inset (a) of FIG. 13). This corresponds to a stretching ratio of >3. This large intracavity evolution illustrates that the nonlinearity and dispersion are not balanced locally throughout the resonator, in contrast to traditional Kerr resonator solitons in anomalous dispersion cavities. However, the effects of the total dispersion, nonlinearity, as well as the drive and loss balance overall such that the evolution repeats every round trip.

Figure 14:
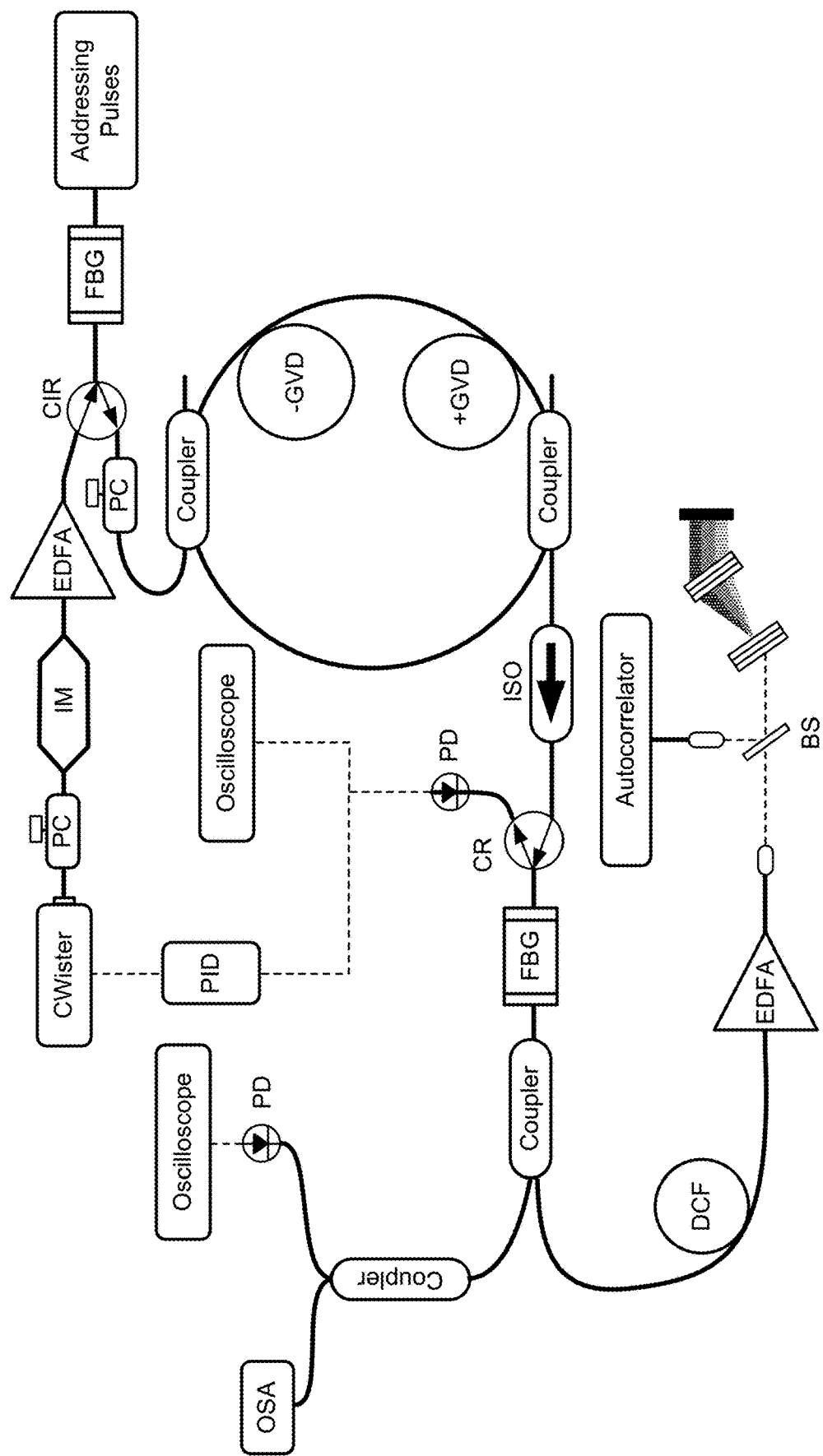
FIG. 14 shows a schematic block diagram of an experimental setup according to some embodiments.
Figure 15A:
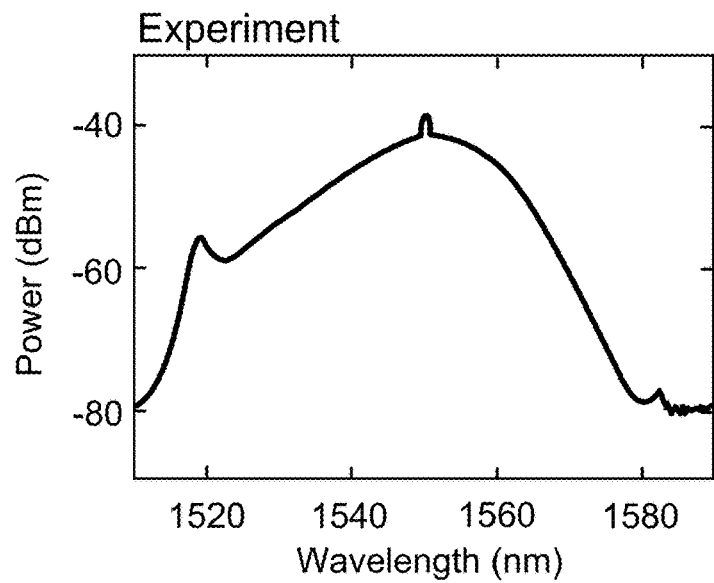
FIG. 15 shows experimental observations of stretched-pulse temporal solitons with matching theoretical predictions, according to some embodiments.
Figure 15B:
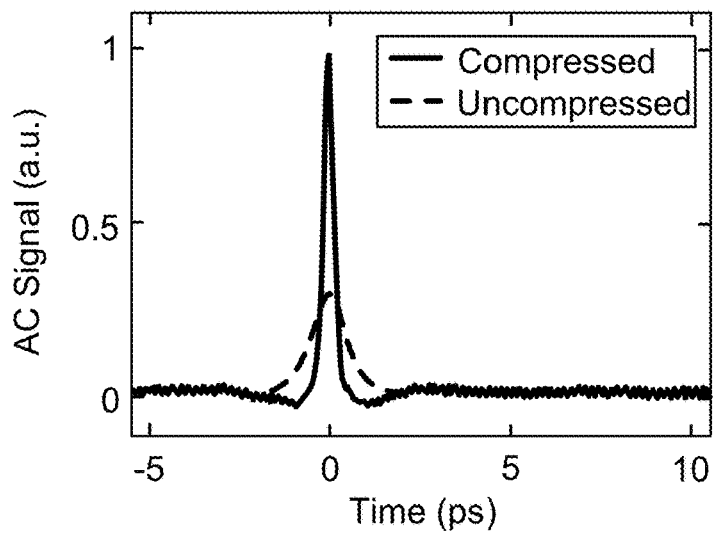
Figure 15C:
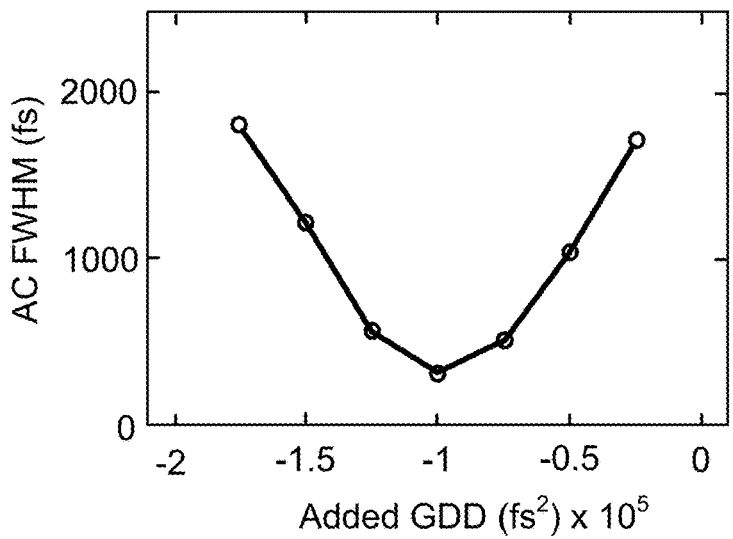
Figure 15D:
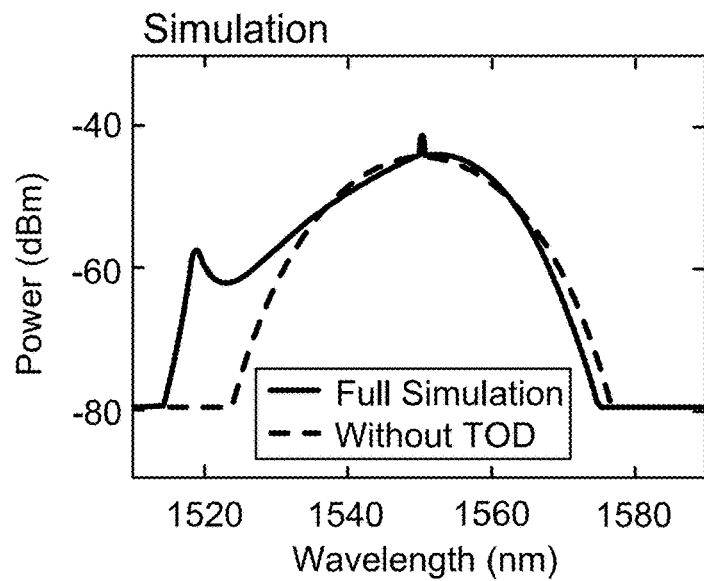
Figure 15E:
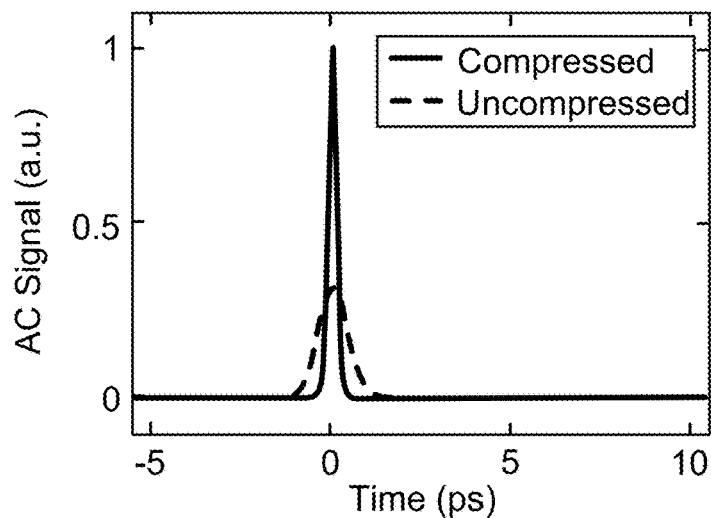
Figure 15F:
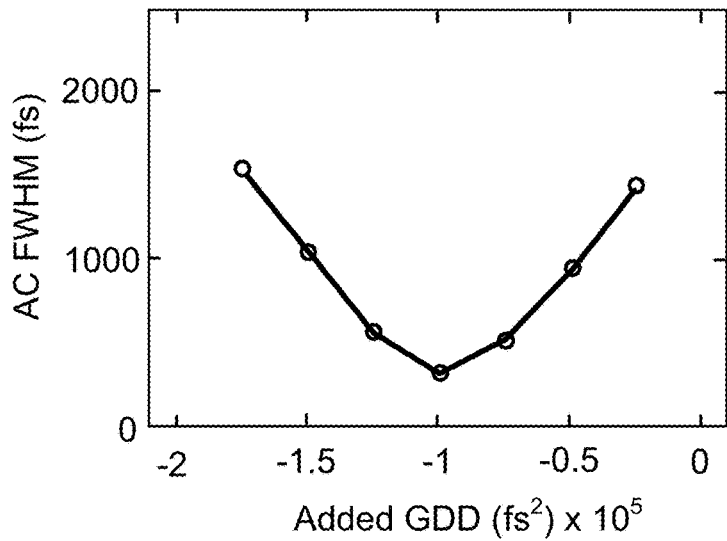
Figure 16A:
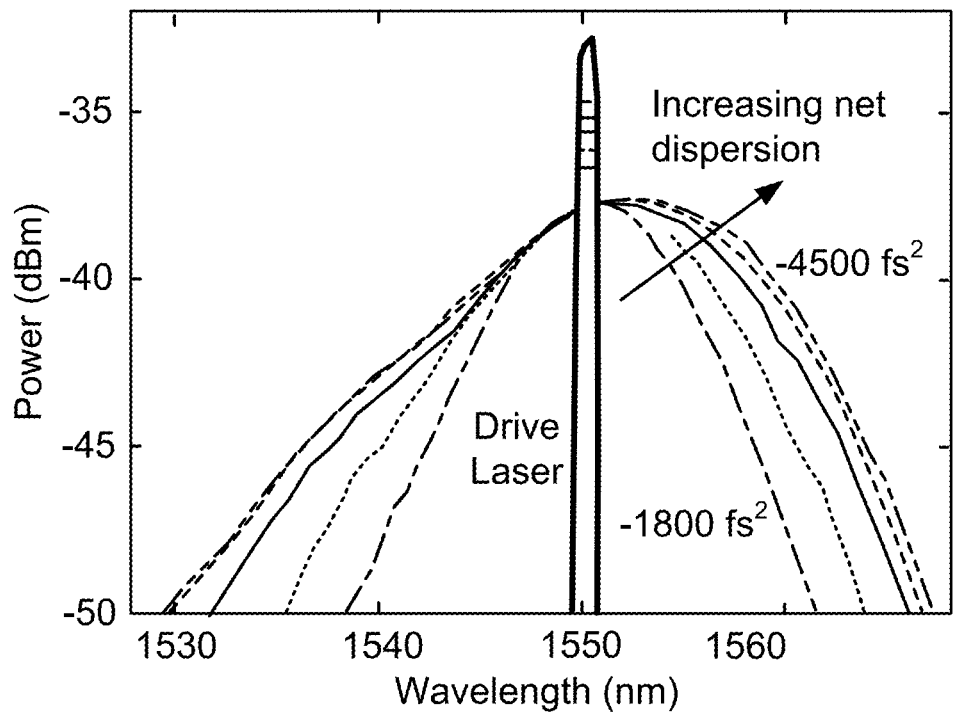
FIG. 16 illustrates stretched-pulse soliton dependence on dispersion and drive power according to some embodiments.
Figure 16B:
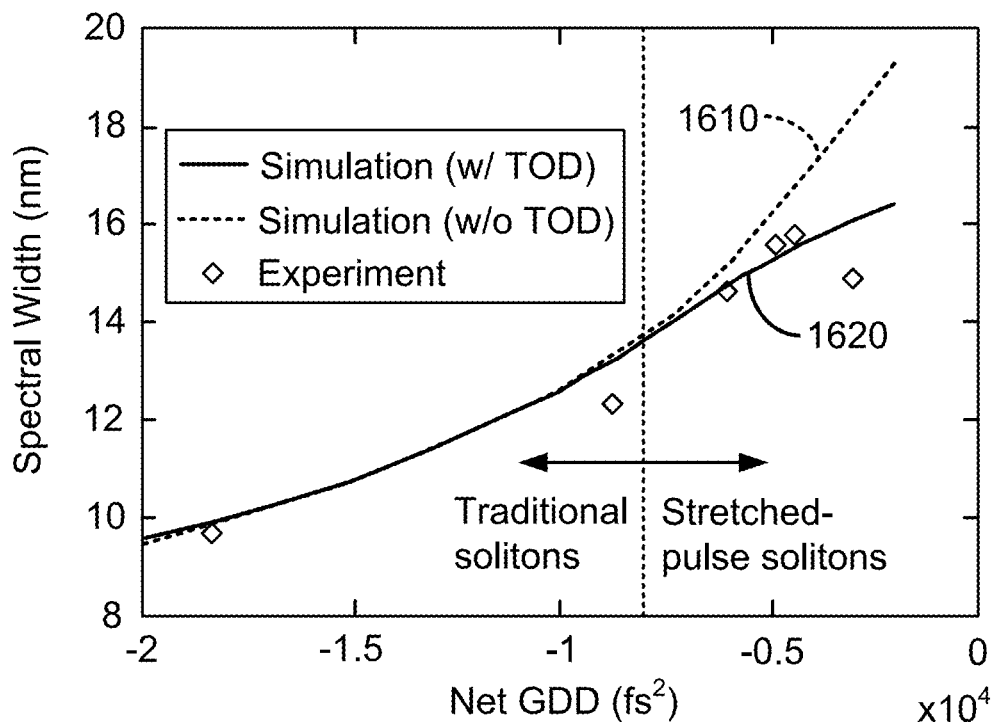
Figure 16C:
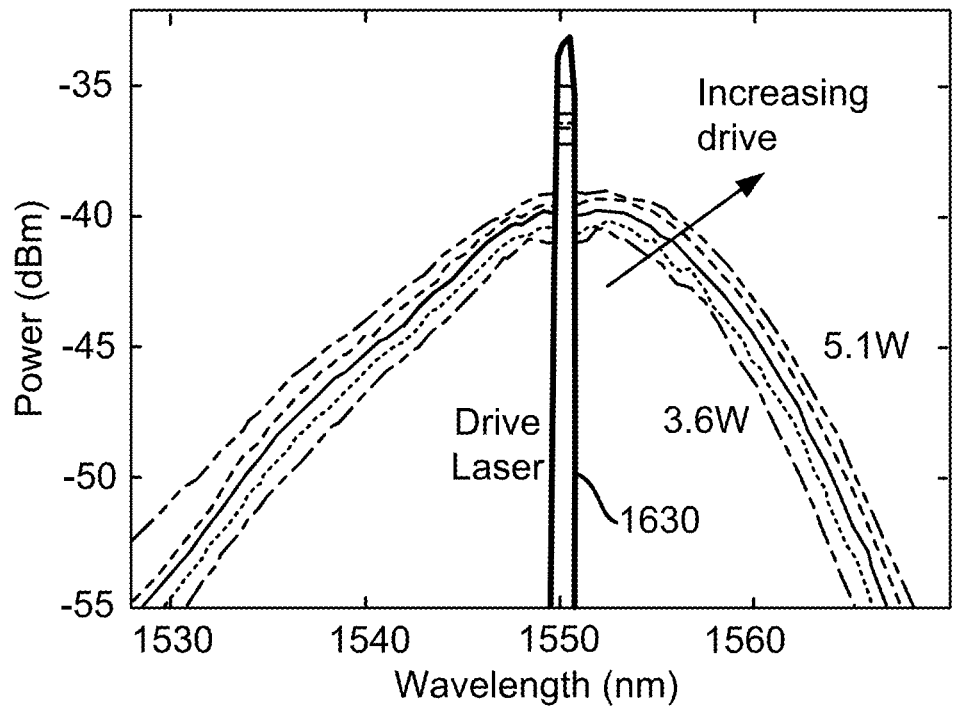
Figure 16D:
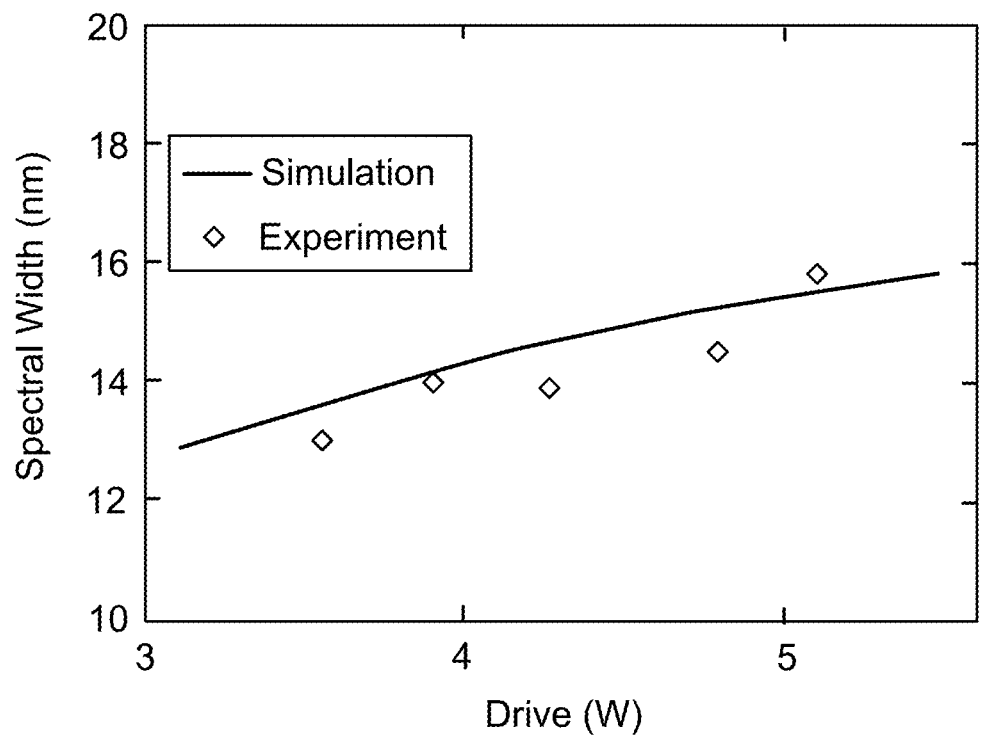

FIG. 14 shows a schematic block diagram of an experimental setup according to some embodiments. It may include an intensity modulator (IM), one or more erbium-doped fiber amplifiers (EDFAs), one or more fiber Bragg gratings (FBGs), an optical spectrum analyzer (OSA), a dispersion compensating fiber (DCF), a polarization controller (PC), an optical isolator (ISO), one or more optical circulators (CIRs), and an optical beam splitter (BS), Guided by the results of the numerical simulations, a fiber cavity may be designed to generate stretched-pulse solitons experimentally (see FIG. 14 and descriptions below). The dispersion-managed cavity includes two commercially available fibers with opposite signs of GVD and lengths chosen such that the total magnitude of dispersion is small and anomalous. The 1550-nm drive is comprised of a narrow-linewidth tunable laser that is intensity modulated and then amplified by an erbium-doped amplifier [79, 91, 92]. The peak power of the pump is enhanced to a maximum of 5.1 W before the cavity. A fiber-Bragg grating filter is applied to the amplified drive to remove any unwanted amplified spontaneous emission from the amplifier. The polarization of the drive is adjusted with a fiber-format polarization controller to align with one of the principal polarizations of the cavity. The drive frequency is controlled electrically by the output of a PID control circuit using the cavity output power as an error signal. In this way, the cavity detuning can be controlled through the offset setting of the PID circuit. The cavity is addressed with an external mode-locked laser to periodically excite excitations through cross-phase modulation, as in previous fiber Kerr resonator studies [76, 89] (see descriptions below). After the cavity, an additional fiber filter is used to filter out most of the residual continuous-wave drive light from the pulsed output. The filtered output spectrum is measured with an optical spectrum analyzer and the pulse train is measured with a photodiode and oscilloscope. Before the temporal autocorrelator (AC), a commercially available normal dispersion fiber with negative third-order dispersion is used to reduce the residual third-order dispersion from the fiber cavity and the pulses are amplified with an erbium-doped fiber amplifier. A grating pair is used to remove the residual group-velocity dispersion (chirp) from the output pulses.

FIG. 15 shows experimental (a) spectrum, (b) uncompressed output (gray) and compressed output (black) autocorrelation, and (c) autocorrelation duration as a function of the grating-pair dispersion applied; and corresponding simulated (d) spectrum (solid), (e) uncompressed output (light grey) and compressed output (dark grey) autocorrelation, and (f) autocorrelation duration as a function of the grating-pair dispersion applied, according to some embodiments. The spectrum from simulations without TOD is plotted with a blue dashed line in (d) for comparison. AC, autocorrelation and FWHM, full width at half the maximum.

By scanning through available settings for the drive power, polarization, frequency, and pump period, stable reproducible stretched-pulse solitons are observed experimentally (see FIG. 15, insets (a)-(c)). The output spectrum has a 3-dB bandwidth of ~16 nm, with a small residual signature from the drive at the center frequency (see FIG. 15, inset (a)). The pulse is analyzed with a two-photon autocorrelator as a function of the dispersion applied by a grating pair compressor (see FIG. 15, insets (b) and (c)). The minimum compressed pulse duration corresponds to a pulse with a duration of 210 fs. This is the shortest pulse observed to date from a fiber Kerr resonator. The pulse duration varies smoothly as a function of the grating pair spacing, indicating coherence and a regular temporal phase (see FIG. 15, inset (c)). The experimental results are reproduced with numerical simulations using matching parameter values. The simulations differ from those in FIG. 13 by including additional third-order dispersion consistent with experiments. Third order dispersion has the effect of slightly reducing the half-max bandwidth from 18 to 16 nm as well as introducing a resonant radiation sideband at 1520 nm (see FIG. 15, inset (d)). The energy of the pulse in the cavity, in agreement with simulations, is measured to be ~13 pJ. The overall agreement between theory and experiment is excellent for this highly nonlinear system.

FIG. 16 illustrates stretched-pulse soliton dependence on dispersion and drive power according to some embodiments. Inset (a) shows broadest measured spectrum as a function of net GDD. The drive laser frequency is plotted in black. Inset (b) shows the broadest spectral bandwidth vs. net dispersion from experiments (points) and simulations with (1610) and without (1620) TOD. The dashed line indicates the approximate minimum stretching ratio (2) corresponding to stretched pulse solitons. More complicated behavior is found in the grey shaded region. Inset (c) shows broadest measured spectrum as a function of drive power. The drive laser frequency is plotted as 1630. Inset (d) shows the broadest spectral bandwidth vs. drive power from experiments (points) and corresponding simulations (the solid line).

The dependence of stretched-pulses solitons on key system parameters is analyzed theoretically and experimentally. The bandwidth of the stretched-pulse solitons has a strong dependence on the net dispersion of the cavity. Experimentally, when the cavity has large net anomalous dispersion, it supports traditional solitons that do not stretch. When the cavity dispersion increases toward zero with the total length held constant, the bandwidth and stretching ratio increase. The broadest spectrum observed experimentally for each value of dispersion is shown in inset (a) of FIG. 16, with the corresponding bandwidth indicated by a point in inset (b) of FIG. 16. TOD-induced asymmetry is more pronounced when the net group-velocity dispersion is closer to zero. The spectral bandwidth increases inversely with the net dispersion, with the maximum bandwidth obtained close to zero. As the bandwidth increases, the stretching ratio increases until qualitative changes occur in the stretched-pulse soliton regime with stretching ratios greater than 2. The experimental trends are compared to the results from numerical simulations with and without TOD (see FIG. 16, inset (b)). TOD has the effect of decreasing the maximum supported bandwidth near zero net dispersion. Very close to zero net dispersion, distinct solutions are observed. Near zero dispersion, the solutions feature spectral bandwidths below 10 nm, stretching ratios larger than six, and prominent side lobe features in the time and spectral domains. This more complicated behavior near zero dispersion may be a subject of interest for future investigations. The spectral bandwidth also has a noticeable dependence on the power of the drive (see insets (c) and (d) of FIG. 16). The spectral bandwidth varies linearly with the drive power with a slope in this case of ~1 nm/W.

The dependence of stretched-pulse solitons on dispersion and drive power suggests opportunities for improved performance. Focusing on reducing the pulse duration (increasing the bandwidth), improvements can be made separately for the drive and the dispersion. The experimentally observed spectra are well-matched to the broadest bandwidth spectrum obtained as a function of dispersion in the cavity. However, this is assuming the TOD of typical commercial fibers. If the higher order dispersion can be removed or compensated, from inset (a) of FIG. 16, the bandwidth dependence could be exponential, allowing for broader bandwidths. The bandwidth is also limited by the maximum drive power currently available. The drive power can be improved in three ways. First, a higher power amplifier could be used. This, however, will introduce new average-power damage issues and is not preferable. The other two ways are enabled by the pulsed drive technique. The drive power is determined by the peak power of the drive pulses after amplification. This peak power scales inversely with the duty cycle of the pulses, which can be improved by either shortening the pulses or increasing the period of the pulses. The pulses can be shortened using higher frequency control electronics. 100-ps pulses, and a corresponding two orders of magnitude higher drive powers should be achievable in this way. The period can also be increased, but since this period may match that of the cavity, it will require an increase in the cavity length. However, increasing the length of the fiber increases the effect of Raman scattering, which is known to limit the performance of Kerr solitons [93]. Further studies are needed on the dependence of stretched-pulse soliton Kerr resonators on Raman scattering.

Stable stretched-pulsed soliton generation requires a drive laser that is locked to the resonance frequency of the cavity. This resonance is subject to environmental perturbations including from vibrations and temperature changes. The present resonator is not isolated from environmental perturbations. In addition, the drive period is freely running with respect to the cavity period which results in the solitons eventually becoming out of temporal alignment with the drive. From these combined effects the solitons are present for several minutes before needing to be readdressed. Environmental isolation, improved frequency locking, and locking the drive pulse period to the cavity period will significantly improve the lifetime of the solitons.

In this disclosure, experimental and theoretical observations of stretched-pulse solitons are presented. In dispersion-managed fiber resonators, stretched-pulse solitons are observed, characterized by Gaussian spectral and temporal profiles and temporal stretching ratios greater than three. The bandwidth, and corresponding transform-limited duration, is found to depend strongly on the drive power and the dispersion of the cavity. By optimizing these parameters, 210-fs pulses are observed, which corresponds to the shortest pulses observed to date from fiber Kerr resonators. With modest improvements to the drive and dispersion the performance is expected to improve further. Stretched pulse Kerr resonators represent a promising new technique for femtosecond pulse generation in wavelength-independent fiber resonators. These results may also enable new opportunities for microresonator and bulk enhancement cavity platforms.

Numerical Model

The fiber cavity may comprise the fiber sections, a drive source, and losses from both the fiber and the fiber components, according to some embodiments. Numerically, the fiber sections are modeled by a nonlinear Schrodinger equation including loss, second and third order dispersion, Kerr nonlinearity, and detuning given by:

$$\frac{\partial A}{\partial z} = -\frac{\alpha}{2}A - i\frac{\beta_2}{2}\frac{\partial^2 A}{\partial t^2} + i\frac{\beta_3}{6}\frac{\partial^3 A}{\partial t^3} + i\gamma|A|^2 A + i\delta A,$$

where A is the slowly varying envelope of the electric field, $\alpha$ is loss per unit length, $\delta$ is detuning per unit length, $\beta_2$ is group-velocity dispersion, $\beta_3$ is third-order dispersion, $\gamma$ is the nonlinearity coefficient, and a single polarization state is assumed. The fiber section is implemented with the standard split-step Fourier technique with the dispersive effects calculated in the Fourier domain and the nonlinear effects solved with a $4^{th}$ order Runge-Kutta method. The periodic boundary conditions are modeled using:

$$A^{n+1}(0,t) = \sqrt{TD} + A^n e^{-\alpha_0},$$

where n represents the round trip number, D is the drive power per roundtrip, T is the input coupling coefficient, and $\alpha_0$ is the total additional length independent component loss per roundtrip [94, 95].

The numerical model is seeded with either a Gaussian pulse or a random intensity distribution. For a given set of cavity parameters, the simulations are run as a function of the drive and detuning parameters. For a typical cavity, such as that used to produce the results in FIG. 15, the parameters correspond to the experimental parameters listed below. Solution stability and convergence are determined by evaluating the pulse energy after each round trip. The change in energy per round trip converges to a numerical limited value for stable solutions.

Experimental Design

Experimentally, the dispersion-managed fiber resonator used to produce the results from FIG. 15 comprises two fiber sections. The anomalous dispersion fiber is SMF28 (modeled using $\beta_2=-22942$ fs$^2$/m, $\beta_3=100$ fs$^3$/mm, $\gamma=0.0013$ W$^{-1}$m$^{-1}$, and $\alpha=0.18$ dB/km) and the normal dispersion fiber is Metrocor fiber (modeled using $\beta_2=9687$ fs$^2$/m, $\beta_3=100$ fs$^3$/mm, $\gamma=0.0021$ W$^{-1}$m$^{-1}$, and $\alpha=0.25$ dB/km).

With a total length of 7 m, the relative lengths of the two fiber sections are arranged such that the total GDD is −4500 $fs^2$. A 5% fiber coupler is used to couple in the pump light and a 2% fiber coupler is used as the output coupler. The total loss in the cavity is measured to be 0.72 dB.

The drive is generated through intensity modulation of a narrow-line tunable fiber laser. 10-ns pulses with a period matched to the free-spectral-range of the fiber cavity is amplified and residual amplified spontaneous emission is filtered out with a 20-GHz fiber-Bragg grating notch filter. This technique enables a maximum drive power of 5.1 W before the input fiber coupler. A polarization controller before the cavity is used to align the drive polarization state to a principal polarization state in the cavity. If the polarization state is not properly aligned, two distinct free-spectral-ranges can be identified in a frequency dependent transmission measurement. The drive laser frequency is locked to the cavity resonance frequency with a PID control circuit with the cavity output continuous-wave power used as an error signal. This system provides direct control over the laser frequency detuning from the cavity resonance.

Before measuring the temporal autocorrelation, the cavity output is sent through a commercially available dispersion compensating fiber with normal group velocity dispersion (243804 $fs^2$/m) and negative third-order dispersion (−1063 $fs^3$/mm) to partially compensate the residual positive third-order dispersion imparted by the fiber cavity.

The experimental dependence on the net GDD plotted in FIG. 16 is obtained starting with a total cavity length of ~8 m. The anomalous dispersion fiber is then reduced in cm-scale increments until ~1-m of fiber is removed, at which point no stable mode-locking is obtained. The maximum stable bandwidth obtained for each fiber cavity examined is plotted in inset (a) of FIG. 16 with the full width at half maximum bandwidth plotted in inset (b) of FIG. 16.

Figure 17A:
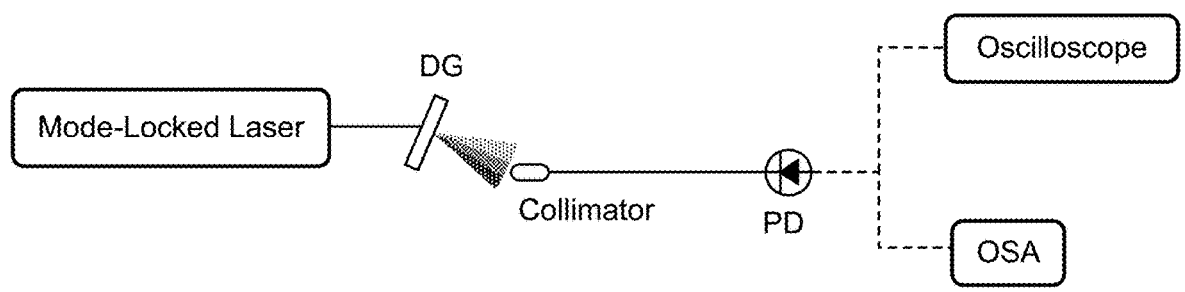
FIG. 17 illustrates external addressing source characterization according to some embodiments.
Figure 17B:
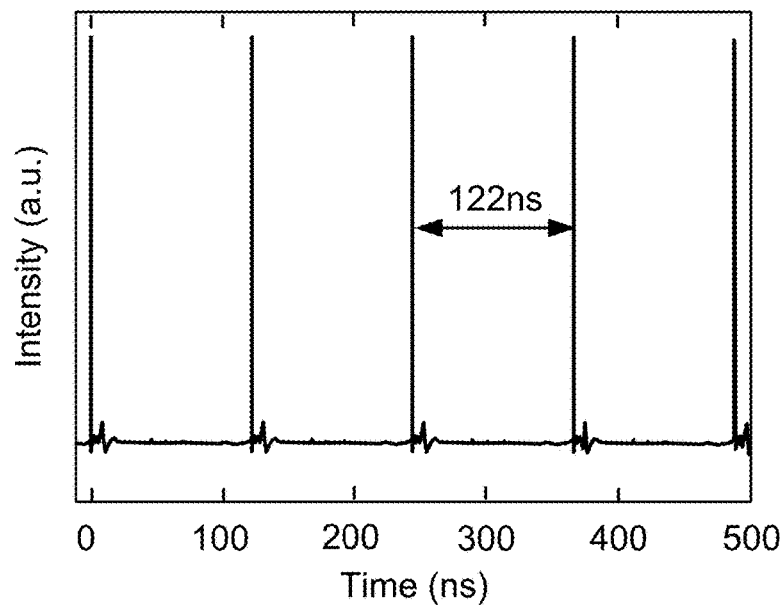
Figure 17C:
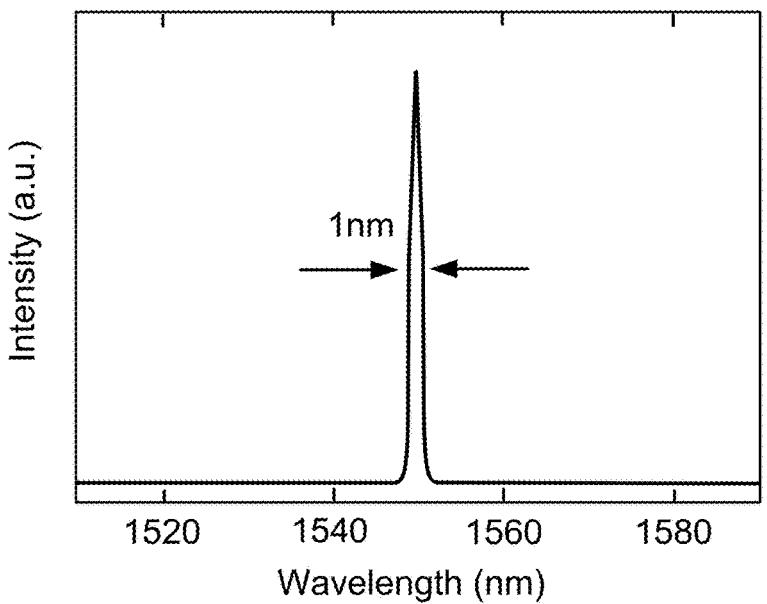

FIG. 17 illustrates external addressing source characterization according to some embodiments. Inset (a) shows a schematic block diagram of a system including a mode-locked laser, a diffraction grating (DG), a photodiode (PD), an oscilloscope, and an optical spectrum analyzer (OSA), according to some embodiments. Inset (b) shows the pulse train on an oscilloscope. Inset (c) shows the spectrum with an optical spectrum analyzer.

An external pulsed optical addressing source is used to periodically initiate stretched-pulse soliton formation in the dispersion-managed cavity. The addressing pulses originate from an all-normal dispersion fiber laser with an 8.2-MHz repetition rate (see FIG. 17). The free-space output of the mode-locked laser is sent through a 1-nm Gaussian spectral filter produced when the frequency-dependent angular spread of the transmission through a diffraction grating is input into a fiber collimator. The filtered pulses are amplified with a single-mode erbium doped fiber amplifier. The total fiber is designed to include the appropriate proportion of anomalous and normal dispersion fibers such that the pulse incident on the Kerr resonator cavity is transform-limited.

The energy of the stretched pulse solitons is estimated by the average power divided by the repetition rate divided again by the number of pulses. The average power and repetition rate are measured directly and the number of pulses is estimated by the pulse pump width divided by the pulse to pulse separation as measured by a long-range autocorrelator. For the measured power and repetition rate and an estimated 80 pulses, the energy for a single stretched pulse is given by 13±3 pJ, which is close to the predicted value.

A recitation of "a", "an" or "the" is intended to mean "one or more" unless specifically indicated to the contrary.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

It is also understood that the examples and embodiments described herein are for illustrative purposes only and that various modifications or changes in light thereof will be suggested to persons skilled in the art and are to be included within the spirit and purview of this application and scope of the appended claims.

REFERENCES

[1] Pasquazi, A., Peccianti, M., Razzari, L., Moss, D. J., Coen, S., et al. Micro-combs: A novel generation of optical sources. Phys. Rep. (2017). doi:10.1016/j.physrep.2017.08.004

[2] Jang, J. K., Erkintalo, M., Coen, S. and Murdoch, S. G. Temporal tweezing of light through the trapping and manipulation of temporal cavity solitons: Nat. Commun. 6, 1-7 (2015).

[3] Leo, F., Coen, S., Kockaert, P., Gorza, S.-P., Emplit, P., et al. Temporal cavity solitons in one-dimensional Kerr media as bits in an all-optical buffer. Nat. Photon. 4, 471-476 (2010).

[4] Renninger, W. H., Chong, A. and Wise, F. W. Dissipative solitons in normal-dispersion fiber lasers. Phys. Rev. A—At. Mol. Opt. Phys. 77, (2008).

[5] Renninger, W. H., Chong, A. and Wise, F. W. Self-similar pulse evolution in an allnormal-dispersion laser. Phys. Rev. A—At. Mol. Opt. Phys. 82, (2010).

[6] Renninger, W. H. and Wise, F. W. Dissipative soliton fiber lasers. in Fiber Lasers 97-133 (Wiley-VCH Verlag GmbH & Co. KGaA, 2012). doi: 10.1002/9783527648641.ch4

[7] T. J. Kippenberg, A. L. Gaeta, M. Lipson, and M. L. Gorodetsky, "Dissipative Kerr solitons in optical microresonators," Science, vol. 361, no. 6402, 2018.

[8] K. Tamura, E. P. Ippen, H. A. Haus, and L. E. Nelson, "77-fs pulse generation from a stretched-pulse mode-locked all-fiber ring laser," Optics Letters, vol. 18, no. 13, p. 1080, January 1993.

[9] C. Bao and C. Yang, "Stretched cavity soliton in dispersion-managed Kerr resonators," Physical Review A, vol. 92, no. 2, March 2015.

[10] Y. Wang, F. Leo, J. Fatome, M. Erkintalo, S. G. Murdoch, and S. Coen, "Universal mechanism for the binding of temporal cavity solitons," Optica, vol. 4, no. 8, p. 855, 2017.

[11] M. Anderson, F. Leo, S. Coen, M. Erkintalo, and S. G. Murdoch, "Observations of spatiotemporal instabilities of temporal cavity solitons," Optica, vol. 3, no. 1071, 2016.

[12] D. C. Cole, E. S. Lamb, P. Del Haye, S. A. Diddams, and S. B. Papp, Soliton crystals in Kerr resonators, Nat. Photonics, 11, 1 (2017).

[13] A. Fernandez, T. Fuji, A. Poppe, A. Furbach, F. Krausz, A. Apolonski, and A. Furbach, Chirped-pulse oscillators: a route to high-power femtosecond pulses without external amplification, Opt. Lett., 29, 1366 (2004).

[14] A. Chong, J. Buckley, W. Renninger, and F. Wise, All-normal-dispersion femtosecond fiber laser, Opt. Express, 14, 10095 (2006).

[15] X. Xue, M. Qi, and A. M. Weiner, Normal-dispersion microresonator Kerr frequency combs, Nanophotonics, 5, 244 (2016).

[16] S. W. Huang, H. Zhou, J. Yang, J. F. McMillan, A. Matsko, M. Yu, D. L. Kwong, L. Maleki, and C. W. Wong, Mode-locked ultrashort pulse generation from on-chip normal dispersion microresonators, Phys. Rev. Lett., 114, 1 (2015).

[17] Nakazawa, M., Suzuki, K. and Haus, H. Modulational instability oscillation in nonlinear dispersive ring cavity. Phys. Rev. A 38, 5193-5196 (1988).

[18] Haelterman, M., Trillo, S. and Wabnitz, S. Additive-modulation-instability ring laser in the normal dispersion regime of a fiber. Opt. Lett. 17, 745-7 (1992).

[19] Haelterman, M., Trillo, S. and Wabnitz, S. Dissipative modulation instability in a nonlinear dispersive ring cavity. Opt. Commun. 91, 401-407 (1992).

[20] Jang, J. K., Erkintalo, M., Murdoch, S. G. and Coen, S. Ultraweak long-range interactions of solitons observed over astronomical distances. Nat. Photonics 7, 657-663 (2013).

[21] Anderson, M., Leo, F., Coen, S., Erkintalo, M. and Murdoch, S. G. Observations of spatiotemporal instabilities of temporal cavity solitons. Optica 3, 1071 (2016).

[22] Jang, J. K., Erkintalo, M., Coen, S. and Murdoch, S. G. Temporal tweezing of light through the trapping and manipulation of temporal cavity solitons. Nat. Commun. 6, 1-7 (2015).

[23] Leo, F., Coen, S., Kockaert, P., Gorza, S. P., Emplit, P. and Haelterman, M. Temporal cavity solitons in one-dimensional Kerr media as bits in an all-optical buffer. Nat. Photonics 4, 471-476 (2010).

[24] Jang, J. K., Erkintalo, M., Schroder, J., Eggleton, B. J., Murdoch, S. G. and Coen, S. All-optical buffer based on temporal cavity solitons operating at 10 Gb/s. Opt. Lett. 41, 4526-4529 (2016).

[25] Kippenberg, T. J., Gaeta, A. L., Lipson, M. and Gorodetsky, M. L. Dissipative Kerr Solitons in Optical Microresonators. Science (80-.). 361, (2018).

[26] Gaeta, A. L., Lipson, M. and Kippenberg, T. J. Photonic-chip-based frequency combs. Nat. Photonics 13, 158-169 (2019).

[27] Del'Haye, P., Schliesser, A., Arcizet, O., Wilken, T., Holzwarth, R. and Kippenberg, T. J. Optical frequency comb generation from a monolithic microresonator. Nature 450, 1214-1217 (2007).

[28] Savchenkov, A., Matsko, A., Ilchenko, V., Solomatine, I., Seidel, D. and Maleki, L. Tunable Optical Frequency Comb with a Crystalline Whispering Gallery Mode Resonator. Phys. Rev. Lett. 101, 093902 (2008).

[29] Levy, J. S., Gondarenko, A., Foster, M. a., Turner-Foster, A. C., Gaeta, A. L. and Lipson, M. CMOS-compatible multiple-wavelength oscillator for on-chip optical interconnects. Nat. Photon. 4, 37-40 (2009).

[30] Razzari, L., Duchesne, D., Ferrera, M., Morandotti, R., Chu, S., Little, B. E. and Moss, D. J. CMOS-compatible integrated optical hyper-parametric oscillator. Nat. Photon. 4, 41-45 (2009).

[31] Del'Haye, P., Herr, T., Gavartin, E., Gorodetsky, M. L., Holzwarth, R. and Kippenberg, T. J. Octave Spanning Tunable Frequency Comb from a Microresonator. Phys. Rev. Lett. 107, 063901 (2011).

[32] Chembo, Y. K. and Yu, N. On the generation of octave-spanning optical frequency combs using monolithic whispering-gallery-mode microresonators. Opt. Lett. 35, 2696-8 (2010).

[33] Okawachi, Y., Saha, K., Levy, J. S., Wen, Y. H., Lipson, M. and Gaeta, A. L. Octave-spanning frequency comb generation in a silicon nitride chip. Opt. Lett. 36, 3398-400 (2011).

[34] Ferdous, F., Miao, H., Leaird, D. E., Srinivasan, K., Wang, J., Chen, L., Varghese, L. T. and Weiner, A. M. Spectral line-by-line pulse shaping of on-chip microresonator frequency combs. Nat. Photonics 5, 770-776 (2011).

[35] Loh, W., Del'Haye, P., Papp, S. B. and Diddams, S. A. Phase and coherence of optical microresonator frequency combs. Phys. Rev. A 89, 053810 (2014).

[36] Mollenauer, L. F. and Stolen, R. H. The soliton laser. Opt. Lett. 9, 13-15 (1984).

[37] Herr, T., Brasch, V., Jost, J. D., Wang, C. Y., Kondratiev, N. M., Gorodetsky, M. L. and Kippenberg, T. J. Temporal solitons in optical microresonators. Nat. Photon. 8, 145-152 (2013).

[38] Lilienfein, N., Hofer, C., Hogner, M., Saule, T., Trubetskov, M., Pervak, V., Fill, E., Riek, C., Leitenstorfer, A., Limpert, J., Krausz, F. and Pupeza, I. Temporal solitons in free-space femtosecond enhancement cavities. Nat. Photonics 13, 214-218 (2019).

[39] Renninger, W. H. and Rakich, P. T. Closed-form solutions and scaling laws for Kerr frequency combs. Sci. Rep. 24742 (2016). doi: 10.1038/srep24742

[40] Chong, A., Buckley, J., Renninger, W. and Wise, F. All-normal-dispersion femtosecond fiber laser. Opt. Express 14, 10095-10100 (2006).

[41] Renninger, W., Chong, A. and Wise, F. Dissipative solitons in normal-dispersion fiber lasers. Phys. Rev. A 77, (2008).

[42] Chong, A., Renninger, W. H. and Wise, F. W. Properties of normal-dispersion femtosecond fiber lasers. J. Opt. Soc. Am. B 25, 140-148 (2008).

[43] Renninger, W. H., Chong, A. and Wise, F. W. Pulse shaping and evolution in normal-dispersion mode-locked fiber lasers. IEEE J. Sel. Top. Quantum Electron. 18, 389-398 (2012).

[44] Chong, A., Renninger, W. H. and Wise, F. W. All-normal-dispersion femtosecond fiber laser with pulse energy above 20 nJ. Opt. Lett. 32, 2408-2410 (2007).

[45] Renninger, W. H., Chong, A. and Wise, F. W. Giant-chirp oscillators for short-pulse fiber amplifiers. Opt. Lett. 33, 3025-3027 (2008).

[46] Godey, C., Balakireva, I. V., Coillet, A. and Chembo, Y. K. Stability analysis of the spatiotemporal Lugiato-Lefever model for Kerr optical frequency combs in the anomalous and normal dispersion regimes. Phys. Rev. A 89, 063814 (2014).

[47] Cole, D. C., Lamb, E. S., Haye, P. Del, Diddams, S. A. and Papp, S. B. Soliton crystals in Kerr resonators. Nat. Photonics 11, 1-7 (2017).

[48] Parra-Rivas, P., Gomila, D., Knobloch, E., Coen, S. and Gelens, L. Origin and stability of dark pulse Kerr combs in normal dispersion resonators. Opt. Lett. 41, 2-6 (2016).

[49] Liang, W., Savchenkov, A. A., Ilchenko, V. S., Eliyahu, D., Seidel, D., Matsko, A. B. and Maleki, L. Generation of a coherent near-infrared Kerr frequency comb in a monolithic microresonator with normal GVD. 39, 2920-2923 (2014).

[50] Xue, X., Xuan, Y., Liu, Y., Wang, P. H., Chen, S., Wang, J., Leaird, D. E., Qi, M. and Weiner, A. M. Mode-locked dark pulse Kerr combs in normal-dispersion microresonators. Nat. Photonics 9, 594-600 (2015).

[51] Jang, J. K., Okawachi, Y., Yu, M., Luke, K., Ji, X., Lipson, M. and Gaeta, A. L. Dynamics of Mode-Coupling-Assisted Microresonator Frequency Combs. 24, FM2A.6 (2016).

[52] Xue, X., Xuan, Y., Wang, P. H., Liu, Y., Leaird, D. E., Qi, M. and Weiner, A. M. Normal-dispersion microcombs enabled by controllable mode interactions. Laser Photonics Rev. 9, L23-L28 (2015).

[53] Lobanov, V. E., Lihachev, G., Kippenberg, T. J. and Gorodetsky, M. L. Frequency combs and platicons in optical microresonators with normal GVD. Opt. Express 23, 7713-7721 (2015).

[54] Fülöp, A., Mazur, M., Lorences-Riesgo, A., Eriksson, T. A., Wang, P.-H., Xuan, Y., Leaird, D. E., Qi, M., Andrekson, P. A., Weiner, A. M. and Torres-Company, V. Long-haul coherent communications using microresonator-based frequency combs. Opt. Express 25, 26678 (2017).

[55] Garbin, B., Wang, Y., Murdoch, S. G., Oppo, G.-L., Coen, S. and Erkintalo, M. Experimental and numerical investigations of switching wave dynamics in a normally dispersive fiber ring resonator. (2017).

[56] Xue, X., Qi, M. and Weiner, A. M. Normal-dispersion microresonator Kerr frequency combs. Nanophotonics 5, 244-262 (2016).

[57] Huang, S. W., Zhou, H., Yang, J., McMillan, J. F., Matsko, A., Yu, M., Kwong, D. L., Maleki, L. and Wong, C. W. Mode-locked ultrashort pulse generation from on-chip normal dispersion microresonators. Phys. Rev. Lett. 114, 1-5 (2015).

[58] Renninger, W. H. and Wise, F. W. Dissipative soliton fiber lasers. in Fiber Lasers 97-133 (Wiley-VCH Verlag GmbH & Co. KGaA, 2012). doi: 10.1002/9783527648641.ch4

[59] Obrzud, E., Lecomte, S. and Herr, T. Temporal solitons in microresonators driven by optical pulses. Nat Phot. 11, 600-607 (2017).

[60] You, A., Be, M. A. Y. and In, I. Optical frequency comb generation by pulsed pumping. 066101, (2017).

[61] Chembo, Y. K. and Menyuk, C. R. Spatiotemporal Lugiato-Lefever formalism for Kerr-comb generation in whispering-gallery-mode resonators. Phys. Rev. A 87, 53852 (2013).

[62] Diddams S A 2010 The evolving optical frequency comb [Invited] J. Opt. Soc. Am. B 27 B51.

[63] Kippenberg T J, Holzwarth R and Diddams S A 2011 Microresonator-based optical frequency combs Science 332 555-9.

[64] Yang Q F, Suh M G, Yang K Y, Yi X and Vahala K J 2017 Microresonator soliton dual-comb spectroscopy Science 354 600-3.

[65] Spencer D T, Lee S H, Oh D Y, Suh M-G, Yang K Y and Vahala K 2018 An optical-frequency synthesizer using integrated photonics Nature 557 81-5.

[66] Udem T, Holzwarth R and Hansch T W 2002 Optical frequency metrology Nature 416 233-7.

[67] Del'Haye P, Schliesser A, Arcizet O, Wilken T, Holzwarth R and Kippenberg T J 2007 Optical frequency comb generation from a monolithic microresonator Nature 450 1214-7.

[68] Steinmetz T, Wilken T, Araujo-Hauck C, Holzwarth R, Hansch T W, Pasquini L, Manescau A, D'Odorico S, Murphy M T, Kentischer T, Schmidt W and Udem T 2008 Laser frequency combs for astronomical observations Science 321 1335-7.

[69] Trocha P, Karpov M, Ganin D, Pfeiffer M H P, Kordts A, Wolf S, Krockenberger J, Marin-Palomo P, Weimann C, Randel S, Freude W, Kippenberg T J and Koos C 2018 Ultrafast optical ranging using microresonator soliton frequency combs Science 359 887-91.

[70] Herr T, Brasch V, Jost J D, Wang C Y, Kondratiev N M, Gorodetsky M L and Kippenberg T J 2014 Temporal solitons in optical microresonators Nat. Photonics 8 145-52.

[71] Gaeta A L, Lipson M and Kippenberg T J 2019 Photonic-chip-based frequency combs Nat. Photonics 13 158-69.

[72] Okawachi Y, Saha K, Levy J S, Wen Y H, Lipson M and Gaeta A L 2011 Octave-spanning frequency comb generation in a silicon nitride chip Opt. Lett. 36 3398.

[73] Del'Haye P, Herr T, Gavartin E, Gorodetsky M L, Holzwarth R and Kippenberg T J 2011 Octave spanning tunable frequency comb from a microresonator Phys. Rev. Lett. 107 1-4.

[74] Chembo Y K and Yu N 2010 On the generation of octave-spanning optical frequency combs using monolithic whispering-gallery-mode microresonators Opt. Lett. 35 2696.

[75] Lilienfein N, Hofer C, Hogner M, Saule T, Trubetskov M, Pervak V, Fill E, Riek C, Leitenstorfer A, Limpert J, Krausz F and Pupeza I 2019 Temporal solitons in free-space femtosecond enhancement cavities Nat. Photonics 13 214-8.

[76] Leo F, Coen S, Kockaert P, Gorza S P, Emplit P and Haelterman M 2010 Temporal cavity solitons in one-dimensional Kerr media as bits in an all-optical buffer Nat. Photonics 4 471-6.

[77] Jang J K, Erkintalo M, Schroder J, Eggleton B J, Murdoch S G and Coen S 2016 All-optical buffer based on temporal cavity solitons operating at 10 Gb/s Opt. Lett. 41 4526.

[78] Jang J K, Erkintalo M, Murdoch S G and Coen S 2013 Ultraweak long-range interactions of solitons observed over astronomical distances Nat. Photonics 7 657-63.

[79] Anderson M, Leo F, Coen S, Erkintalo M and Murdoch S G 2016 Observations of spatiotemporal instabilities of temporal cavity solitons Optica 3 1071.

[80] Jang J K, Erkintalo M, Coen S and Murdoch S G 2015 Temporal tweezing of light through the trapping and manipulation of temporal cavity solitons Nat. Commun. 6 1-7.

[81] Renninger W H and Rakich P T 2015 Exact solutions and scaling laws for kerr frequency combs scientific reports 2267.

[82] Mollenauer L F and Stolen R H 1984 The soliton laser: erratum Opt. Lett. 9 105.

[83] Lugiato L A and Lefever R 1987 Spatial dissipative structures in passive optical systems Phys. Rev. Lett. 58 2209-11.

[84] Godey C, Balakireva I V., Coillet A and Chembo Y K 2014 Stability analysis of the spatiotemporal Lugiato- Lefever model for Kerr optical frequency combs in the anomalous and normal dispersion regimes Phys. Rev. A 89 063814.
[85] Morgner U, Cho S H, Haus H A, Ippen E P, Fujimoto J G, Chen Y and Ka F X 1999 Dispersion-managed mode locking J. Opt. Soc. Am. B 16 1999-2004.
[86] Tamura K, Ippen E P, Haus H A and Nelson L E 1993 77-fs pulse generation from a stretched-pulse mode-locked all-fiber ring laser Opt. Lett. 18 1080-2.
[87] Pawliszewska M, Martynkien T, Przewloka A and Sotor J 2018 Dispersion-managed Ho-doped fiber laser mode-locked with a graphene saturable absorber Opt. Lett. 43 38.
[88] Bao C and Yang C 2015 Stretched cavity soliton in dispersion-managed Kerr resonators Phys. Rev. A 92 1-7.
[89] Wang Y, Leo F, Fatome J, Erkintalo M, Murdoch S G and Coen S 2017 Universal mechanism for the binding of temporal cavity solitons Optica 4 855.
[90] Nielsen A U, Garbin B, Coen S, Murdoch S G and Erkintalo M 2018 Invited Article: Emission of intense resonant radiation by dispersion-managed Kerr cavity solitons APL
Photonics 3 120804.
[91] Malinowski M, Rao A, Delfyett P and Fathpour S 2017 Optical frequency comb generation by pulsed pumping APL Photonics 2 066101.
[92] Obrzud E, Lecomte S and Herr T 2017 Temporal solitons in microresonators driven by optical pulses Nat. Photonics 11 600-7.
[93] Wang Y, Anderson M, Coen S, Murdoch S G and Erkintalo M 2018 Stimulated Raman Scattering Imposes Fundamental Limits to the Duration and Bandwidth of Temporal Cavity Solitons Phys. Rev. Lett. 120 1-6.
[94] Lugiato L A and Lefever R 1987 Spatial dissipative structures in passive optical systems Phys. Rev. Lett. 58 2209-11.
[95] Bao C and Yang C 2015 Stretched cavity soliton in dispersion-managed Kerr resonators Phys. Rev. A 92 1-7.

What is claimed is:

1. An optical pulse source comprising:
a drive unit configured to provide pump light at a drive power;
a passive optical fiber ring resonator optically coupled to the drive unit for receiving the pump light, the optical fiber ring resonator comprising:
at least one normal dispersion fiber segment characterized by a positive group velocity dispersion (GVD) per unit length; and
at least one anomalous dispersion fiber segment characterized by a negative GVD per unit length;
wherein the drive power, a net GVD of the optical fiber ring resonator, and a frequency detuning parameter of the optical fiber ring resonator are configured to generate one or more optical solitons in the optical fiber ring resonator, and wherein the one or more optical solitons each has a temporal duration from about 50 fs to about 500 fs, measured at full-width half-maximum; and
an output optically coupled to the optical fiber ring resonator for out-coupling a portion of each of the one or more optical solitons.

2. The optical pulse source of claim 1, further comprising a feedback control circuit coupled to the drive unit and the optical fiber ring resonator, wherein the feedback control circuit is configured to cause a frequency of the pump light to be locked with respect to a resonance frequency of the optical fiber ring resonator.

3. The optical pulse source of claim 1, further comprising a feedback control circuit coupled to the drive unit and the optical fiber ring resonator, wherein the feedback control circuit is configured to cause a resonance frequency of the optical fiber ring resonator to be locked with respect to a frequency of the pump light.

4. The optical pulse source of claim 1, a length of the at least one normal dispersion fiber segment and a length of the at least one anomalous dispersion fiber segment are configured to provide the net GVD of the optical fiber ring resonator.

5. The optical pulse source of claim 4, wherein the net GVD ranges from about $-1000$ fs$^2$ to about $-10,000$ fs$^2$.

6. The optical pulse source of claim 1, wherein each of the one or more optical solitons has a full-width half-maximum temporal duration ranging from about 50 fs to about 210 fs.

7. The optical pulse source of claim 1, wherein the optical fiber ring resonator further comprises an optical isolator.

8. The optical pulse source of claim 7, wherein the optical isolator comprises an optical fiber isolator or a free-space isolator.

9. The optical pulse source of claim 1, wherein the drive unit comprises a pump light source.

10. The optical pulse source of claim 9, wherein the pump light source comprises a continuous-wave (CW) laser source.

11. The optical pulse source of claim 9, the drive unit further comprises an optical amplifier configured to amplify optically coupled to the pump light source.

12. The optical pulse source of claim 11, wherein the optical amplifier comprises an erbium-doped fiber amplifier (EDFA).

13. The optical pulse source of claim 9, wherein the drive unit further comprises an intensity modulator optically coupled to the pump light source and configured to modulate an intensity of the pump light into a pulse train.

14. The optical pulse source of claim 13, further comprising a spectral filter optically coupled to the output.

15. The optical pulse source of claim 14, wherein the spectral filter comprises a fiber Bragg grating (FBG), or a birefringence-based spectral filter, or an interference-based spectral filter.

16. The optical pulse source of claim 1, wherein the optical fiber ring resonator comprises at least one free-space air gap.

17. The optical pulse source of claim 1, wherein the at least one normal dispersion fiber segment and the at least one anomalous dispersion fiber segment comprise polarization-maintaining optical fibers.

18. The optical pulse source of claim 1, further comprising an optical compression component coupled to the output and configured to compress the portion of each of the one or more optical solitons temporally.

19. The optical pulse source of claim 18, wherein the optical compression component comprises a pair of gratings, or a pair of prisms, or an optical fiber compression component.

20. The optical pulse source of claim 1, wherein the negative GVD per unit length of the at least one anomalous dispersion fiber segment ranges from about $-1000$ fs$^2$ to $-50,000$ fs$^2$, or from about $-1000$ fs$^2$ to $-10,000$ fs$^2$, or from about $-1000$ fs$^2$ to $-5,000$ fs$^2$.

21. The optical pulse source of claim 1, wherein the drive power ranges from about 10 mW to about 1 kW.

22. The optical pulse source of claim 1, wherein the frequency detuning parameter ranges from about −0.5 radians to about −3 radians per roundtrip.

\* \* \* \* \*